(12) United States Patent
Harigaya et al.

(10) Patent No.: US 7,260,053 B2
(45) Date of Patent: Aug. 21, 2007

(54) OPTICAL RECORDING MEDIUM, PROCESS FOR MANUFACTURING THE SAME, SPUTTERING TARGET FOR MANUFACTURING THE SAME, AND OPTICAL RECORDING PROCESS USING THE SAME

(75) Inventors: Makoto Harigaya, Kanagawa (JP); Kazunori Ito, Kanagawa (JP); Hiroko Tashiro, Kanagawa (JP); Miku Mizutani, Kanagawa (JP); Michiaki Shinotsuka, Kanagawa (JP); Hiroyuki Iwasa, Kanagawa (JP); Masaru Shinkai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 649 days.

(21) Appl. No.: 10/453,551

(22) Filed: Jun. 4, 2003

(65) Prior Publication Data

US 2004/0037203 A1  Feb. 26, 2004

(30) Foreign Application Priority Data

| Jun. 5, 2002 | (JP) | ............................. 2002-163793 |
| Jun. 28, 2002 | (JP) | ............................. 2002-189628 |
| Jul. 8, 2002 | (JP) | ............................. 2002-198114 |
| Jul. 23, 2002 | (JP) | ............................. 2002-214500 |
| Sep. 4, 2002 | (JP) | ............................. 2002-258638 |
| Nov. 27, 2002 | (JP) | ............................. 2002-344719 |

(51) Int. Cl.
*G11B 7/004* (2006.01)
(52) U.S. Cl. ...................................... 369/288; 369/283
(58) Field of Classification Search ............... 369/288, 369/283
See application file for complete search history.

(56) References Cited

U.S. PATENT DOCUMENTS

| 5,072,423 A | * | 12/1991 | Koshino et al. ............ 365/106 |
| 5,314,734 A | | 5/1994 | Nishida et al. |
| 5,569,517 A | * | 10/1996 | Tominaga et al. ......... 428/64.1 |
| 5,848,043 A | | 12/1998 | Takada et al. |
| 5,912,104 A | * | 6/1999 | Hirotsune et al. ..... 430/270.13 |
| 6,018,510 A | | 1/2000 | Abe et al. |
| 6,096,398 A | | 8/2000 | Yuzurihara et al. |
| 6,177,167 B1 | | 1/2001 | Yuzurihara et al. |
| 6,383,595 B1 | | 5/2002 | Hirotsune et al. |
| 6,391,417 B1 | | 5/2002 | Yuzurihara et al. |
| 6,426,936 B1 | | 7/2002 | Shinotsuka et al. |
| 6,455,120 B1 | * | 9/2002 | Satoh ........................ 428/64.1 |
| 6,479,121 B1 | | 11/2002 | Miura et al. |
| 6,548,137 B2 | | 4/2003 | Ito et al. |
| 6,660,451 B1 | * | 12/2003 | Sakaue et al. ......... 430/270.13 |

(Continued)

FOREIGN PATENT DOCUMENTS

EP  0 354 528 A2  2/1990

(Continued)

*Primary Examiner*—Wayne Young
*Assistant Examiner*—Linh T. Nguyen
(74) *Attorney, Agent, or Firm*—Dickstein Shapiro LLP

(57) ABSTRACT

An optical recording medium which comprises a substrate and a recording layer disposed on the substrate, in which the recording layer comprises Ga and Sb, a content of the Sb is 80 atm % to 95 atm % relative to a total content of the Ga and the Sb in the recording layer, and recording and erasing are carried out by a reversible phase change between an amorphous phase and a crystalline phase in the recording layer.

39 Claims, 23 Drawing Sheets

Laser beam

U.S. PATENT DOCUMENTS

| | | |
|---|---|---|
| 2001/0041240 A1 | 11/2001 | Ito et al. |
| 2002/0021643 A1 | 2/2002 | Miura et al. |
| 2002/0098445 A1* | 7/2002 | Harigaya et al. ...... 430/270.13 |
| 2002/0110063 A1 | 8/2002 | Yamada et al. |
| 2002/0145963 A1 | 10/2002 | Narumi et al. |
| 2002/0155248 A1* | 10/2002 | Ito et al. .................... 428/66.4 |
| 2002/0160141 A1 | 10/2002 | Shinotsuka |
| 2002/0160306 A1* | 10/2002 | Hanaoka et al. ....... 430/270.13 |
| 2002/0163876 A1 | 11/2002 | Shinotsuka et al. |
| 2002/0196324 A1 | 12/2002 | Abe et al. |
| 2003/0003395 A1* | 1/2003 | Yuzurihara et al. .... 430/270.13 |
| 2003/0012917 A1* | 1/2003 | Harigaya et al. .......... 428/64.4 |
| 2003/0035360 A1 | 2/2003 | Shinotsuka et al. |
| 2003/0081537 A1 | 5/2003 | Shinotsuka |

FOREIGN PATENT DOCUMENTS

| | | |
|---|---|---|
| EP | 1 260 973 A2 | 11/2002 |
| WO | WO 02/084657 A1 | 10/2002 |

* cited by examiner

Laser beam

Laser beam

OPTICAL RECORDING MEDIUM, PROCESS FOR MANUFACTURING THE SAME, SPUTTERING TARGET FOR MANUFACTURING THE SAME, AND OPTICAL RECORDING PROCESS USING THE SAME

BACKGROUND OF THE INVENTION

1. Field of the Invention

The present invention relates to a phase change optical recording medium on which materials to be recorded are optically changed by irradiating electromagnetic wave, and which enables recording and reproducing and rewriting.

2. Description of the Related Art

As one of optical recording media which enables recording and reproducing and erasing by irradiating a light, there is known a so-called phase change optical disk. Such phase change optical disk utilizes a phase transition between a crystalline phase and an amorphous phase, or between a crystalline phase and other crystalline phase. Since overwriting on the phase change optical disk can be carried out by a single beam, and because of the simple optical system of driving, such optical disk is generally employed as AV-related recording media or as recording media for a computer.

Materials used for the recording media include Ge—Te, Ge—Te—Se, In—Sb, Ga—Sb, Ge—Sb—Te, and Ag—In—Sb—Te. In particular, Ag—In—Sb—Te is employed as a mark edge recording material, having features such as high sensitivity, and clear outline of amorphous part in a recording mark (see Japanese Patent Application Laid-Open (JP-A) No. 03-231889, JP-A No. 04-191089, JP-A No. 04-232779, JP-A No. 04-267192, and JP-A No. 05-345478, or the like).

However, these recording materials are to be used for an optical recording medium having relatively low recording density, such as CD-RW (Compact Disk-Rewritable). If it is used in DVD (Digital Versatile Disk) RAM or DVD-RW and the like, overwriting can be carried out when a recording linear velocity is around 3.5 m/s (×1 speed). However, when it becomes ×2 speed or faster, there is a problem that overwriting property may deteriorate. It is because speed for crystallization of the recording materials as described above is low, thus overwriting in high linear velocity becomes difficult.

It is possible to crystallize faster, by increasing the amount of Sb, but this may lead to fall in crystallization temperature due to increase of Sb, and then a storage property may be deteriorated.

To solve this problem, there is disclosed an approach to use Ag—In—Ge—Sb—Te system recording material in JP-A No. 2000-322740. It is possible to apply this approach when the recording linear velocity is 3.0 m/s to 20 m/s, but at a higher velocity, such as 20 m/s or more, it is not applicable.

In the meantime, GaSb has been proposed as a high-speed crystallization material ("Phase-change optical data storage in GaSb" *Applied optics.*/vol. 26, No. 22115, November 1987). It is reported that as for this alloy, crystallization speed is extremely high, however, since a crystallization temperature is as high as 350° C., crystallization at the initial stage is difficult. Furthermore, the U.S. Pat. Nos. 4,818,666 and 5,072,423 disclose that Mo, W, Ta, Ni, Pd, Pt, Cu, Ag, Au, Zn, Cd, Al, Tl, Si, Ge, Sn, Pb, As, Bi, S, Se, Te or the like are added to GaSb, so as to enhance its property. However, such disclosures do not satisfy an overwriting property at high speed recording, degree of modulation and archival stability at the same time. For instance, the optical recording medium disclosed in the U.S. Pat. No. 4,818,666 utilizes the phase change between the crystalline and crystalline phases for optical recording. The modulation is 0.29 at the best, which causes problems in the practical use. The U.S. Pat. No. 4,818,666 states that a layer or a film lifts up, which is presumably because of the bubble generated on a portion where a laser beam is irradiated, when a content of Ga is less than 20%. It also states that, because of the lift-up, the level, in which the reflectance differs, becomes unstable. The U.S. Pat. No. 4,818,666 states that the invention stated therein causes problems in practical use, accordingly. The phase change between the crystal and crystalline phases utilizes the difference in reflectance derived from the difference in the crystal particle diameters. Therefore, it is unfavorable for the high-density recording that requires fine marks. The optical recording medium disclosed in the U.S. Pat. No. 4,818,666 does not allow the same recording capacity as DVD-ROM. *Appl. Phys. Lett.* 60 (25), 22 Jun. 1992, pp. 3123-3125 states an optical recording medium that utilizes a GeSb thin film and that is capable of phase change at an extra-high speed. An electron diffraction shown in the FIG. 1 attached thereto does not describe the orientation of crystals. Furthermore, the modulation between a phase which serves as the crystalline phase and the amorphous phase is 0.15 to 0.2, which causes problems in practical use.

Japanese Patent Application Laid-Open (JP-A) No. 2001-39031 discloses an optical recording medium whose recording layer is mainly formed of alloy as (SbxGe1−x)1−yIny (herein, $0.65 \leq x \leq 0.95$, $0 \leq y \leq 0.2$). However, there is only one statement in initialization condition of the optical recording medium. It only states that the initialization condition is to crystallize at an initial phase with a laser power density of around 2.6 mW/μm². There is no statement about a high laser power density at an initial phase. The low laser power density as disclosed therein provides a medium having poorly oriented crystals and low reflectance. The recording linear velocity disclosed therein is as slow as 2.4 m/s to 9.6 m/s, which does not meet the present invention's a high recording linear velocity.

As described above, various kinds of phase change recording materials have been reported so far, but any of the materials has not been satisfactorily provided with the properties required by a rewritable phase change optical recoding medium. In particular, those have not been the materials such as having a high-density recording capacity equivalent of that of DVD-ROM's, being capable of handling a situation when recording linear velocity is further increased (−35 m/S), and simultaneously satisfying requirements as to overwriting property, degree of modulation, and archival stability.

SUMMARY OF THE INVENTION

The present invention has been proposed in view of the problems of the related arts as mentioned above.

It is therefore an object of the present invention to provide an optical recording medium which is capable of recording and erasing by a reversible phase change between an amorphous phase and a crystalline phase in the recording layer, and has a large degree of modulation and good stability in an amorphous mark. The optical recording medium is capable of recording and erasing by a reversible phase change between an amorphous phase and a crystalline phase, even at a high linear velocity of 10 m/s or more.

In order to solve the above problems, the inventors of the present invention have focused attention on materials in recording layer, and have dedicated to and pursued their studies, resulting in accomplishment of the present invention. The above problems can be solved by the following aspects of the present invention.

According to a first aspect of the present invention, the present invention provides an optical recording medium comprises a substrate and a recording layer disposed on the substrate, in which the recording layer comprises Ga and Sb, a content of the Sb is 80 atm % to 95 atm % relative to a total content of the Ga and the Sb in the recording layer, and recording and erasing are carried out by a reversible phase change between an amorphous phase and a crystalline phase in the recording layer.

According to a second aspect of the present invention, the recording and the erasing are carried out by the reversible phase change between the amorphous phase and the crystalline phase in the recording layer, when a laser beam having wavelength of 350 nm to 700 nm is irradiated at a linear velocity (V) one of between more than 3 m/s and 40 m/s or less.

According to a third aspect of the present invention, the recording and the erasing are carried out by the reversible phase change between the amorphous phase and the crystalline phase in the recording layer, at a linear velocity of 10 m/s or more.

According to a fourth aspect of the present invention, the total content of the Ga and the Sb is 90 atm % or more in the recording layer.

According to a fifth aspect of the present invention, the total content of the Ga and the Sb in the recording layer is 95 atm % or more.

According to a sixth aspect of the present invention, the content of the Sb is 85 atm % to 95 atm % relative to the total content of the Ga and the Sb in the recording layer.

According to a seventh aspect of the present invention, the optical recording medium comprises the substrate, a first protective layer, the recording layer, a second protective layer, and a reflection layer. In the optical recording medium of the seventh aspect, the first protective layer, the recording layer, the second protective layer, and the reflection layer are disposed on the substrate in this order, and a thickness of the reflection layer satisfies a relation of: $0.10\lambda$ or more, when the "$\lambda$" expresses the wavelength of the laser beam.

According to an eighth aspect of the present invention, the laser beam may have the wavelength of 630 nm to 700 nm.

According to a ninth aspect of the present invention, the optical recording medium comprises the substrate, a first protective layer, the recording layer, a second protective layer, and a reflection layer. In the optical recording medium of the ninth aspect, the first protective layer, the recording layer, the second protective layer, and the reflection layer are disposed on the substrate in this order, and each of a thickness of the first protective layer, a thickness of the recording layer, a thickness of the second protective layer, and a thickness of the reflection layer satisfies the following relations, when "$\lambda$" expresses the wavelength of the laser beam;

$$0.070\lambda \leq t_1 \leq 0.16\lambda$$

$$0.015\lambda \leq t_2 \leq 0.032\lambda$$

$$0.011\lambda \leq t_3 \leq 0.040\lambda$$

$$0.10\lambda \leq t_4;$$

wherein "$t_1$" expresses the thickness of the first protective layer, "$t_2$" expresses the thickness of the recording layer, "$t_3$" expresses the thickness of the second protective layer, and "$t_4$" expresses the thickness of the reflection layer.

According to a tenth aspect of the present invention, the thickness of the recording layer may be 5 nm to 25 nm.

According to an eleventh aspect of the present invention, the thickness of the recording layer may be 8 nm to 20 nm.

According to a twelfth aspect of the present invention, the laser beam may have wavelength of 350 nm to 450 nm.

According to a thirteenth aspect of the present invention, the optical recording medium comprises the substrate, a first protective layer, the recording layer, a second protective layer, and a reflection layer. In the optical recording medium of the thirteenth aspect, the first protective layer, the recording layer, the second protective layer, and the reflection layer are disposed on the substrate in this order, and each of a thickness of the first protective layer, a thickness of the recording layer, a thickness of the second protective layer, and a thickness of the reflection layer satisfies the following relations, when "$\lambda$" expresses the wavelength of the laser beam;

$$0.070\lambda \leq t_1 \leq 0.5\lambda$$

$$0.015\lambda \leq t_2 \leq 0.05\lambda$$

$$0.011\lambda \leq t_3 \leq 0.055\lambda$$

$$0.10\lambda \leq t_4;$$

wherein "$t_1$" expresses the thickness of the first protective layer, "$t_2$" expresses the thickness of the recording layer, "$t_3$" expresses the thickness of the second protective layer, and "$t_4$" expresses the thickness of the reflection layer.

According to a fourteenth aspect of the present invention, the optical recording medium comprises the substrate, a reflection layer, a second protective layer, the recording layer, a first protective layer, and a light transmittance layer. In the optical recording medium of the fourteenth aspect, the reflection layer, the second protective layer, the recording layer, the first protective layer, and the light transmittance layer are disposed on the substrate in this order, and each of a thickness of the reflection layer, a thickness of the second protective layer, a thickness of the recording layer, and a thickness of the first protective layer, and a thickness of the light transmittance layer satisfies the following relations, when "$\lambda$" expresses the wavelength of the laser beam;

$$0.10\lambda \leq t_4 \leq 0.75\lambda$$

$$0.011\lambda \leq t_3 \leq 0.055\lambda$$

$$0.015\lambda \leq t_2 \leq 0.05\lambda$$

$$0.070\lambda \leq t_1 \leq 0.5\lambda$$

$$0 \leq t_5 \leq 0.6 \text{ mm},$$

wherein "$t_4$" expresses the thickness of the reflection layer, "$t_3$" expresses the thickness of the second protective layer, "$t_2$" expresses the thickness of the recording layer, "$t_1$" expresses the thickness of the first protective layer, and "$t_5$" expresses the thickness of the light transmittance layer.

According to a fifteenth aspect of the present invention, the optical recording medium may further comprises one or more of the recording layers.

According to a sixteenth aspect of the present invention, the optical recording medium includes a first information layer which has one of the recording layers, and a second information layer which has other one of the recording layers in this order, from a direction that the laser beam is irradiated, and a light transmittance of the first information layer is 40% or more with the wavelength.

According to a seventeenth aspect of the present invention, the recording and the erasing are carried out by the reversible phase change between the amorphous phase and the crystalline phase in the recording layer, at a linear velocity of 14 m/s or more.

According to an eighteenth aspect of the present invention, the recording and the erasing are carried out by the reversible phase change between the amorphous phase and the crystalline phase in the recording layer, at a linear velocity of 28 m/s or more.

According to a nineteenth aspect of the present invention, a reflectance (Rg) at an unrecorded space part satisfies a relation of 12%≦Rg≦30%, when a laser beam having wavelength between 350 nm and 700 nm is irradiated.

According to a twentieth aspect of the present invention, the optical recording medium has a degree of modulation (M) of 0.4 or more, when the recording is carried out at a linear velocity (V) one of between more than 3 m/s and 40 m/s or less and at wavelength of a laser beam of between 350 nm and 700 nm, and the degree of modulation (M) satisfies a relation of:

$$M=(Rg-Rb)/Rg,$$

where "M" expresses the degree of modulation, "Rb" expresses a reflectance at a recording mark of the optical recording medium, and "Rg" expresses a reflectance at an unrecorded space part of the optical recording medium.

According to a twenty first aspect of the present invention, the optical recording medium has the degree of modulation (M) of 0.4 or more, when the recording is carried out by an optical lens having NA of 0.60 or more.

According to a twenty second aspect of the present invention, the optical recording medium has the degree of modulation (M) of 0.6 or more.

According to a twenty third aspect of the present invention, the optical recording medium has the degree of modulation (M) of 0.4 or more, when the recording is carried out at any linear velocity (V) between 10 m/s and 35 m/s.

According to a twenty fourth aspect of the present invention, the optical recording medium has the degree of modulation (M) of 0.6 or more, when the recording is carried out at any linear velocity (V) between 10 m/s and 35 m/s.

According to a twenty fifth aspect of the present invention, the recording layer further comprises at least one element selected from Ag, Au, Cu, Zn, B, Al, In, Si, Ge, Sn, Pb, N, P, Bi, La, Ce, Gd, Tb, Mg, Co, Mn, Zr, Rh, Se, Fe, and Ir.

According to a twenty sixth aspect of the present invention, the element is at least one selected from Ag, Au, Cu, B, Al, In, Mn, Sn, Zn, Bi, Pb, Ge, Si., and N.

According to a twenty seventh aspect of the present invention, the recording layer comprises an alloy expressed by the following Formula (1);

$$Ga_\alpha Sb_\beta X_\gamma \qquad \text{Formula (1)}$$

where "X" expresses one of an element and a mixture of elements excluding Ga and Sb, "α," "β," and "γ" are each expressed in atm %, and each satisfy relations of: "α+β+γ=100," "5≦α≦20," "80≦β≦95," and "0<γ≦10."

According to a twenty eighth aspect of the present invention, the "X" comprises one of a single element and a mixture selected from Ag, Au, Cu, Zn, B, Al, In, Si, Ge, Sn, Pb, N, P, Bi, La, Ce, Gd, Tb, Mg, Co, Mn, Zr, Rh, Se, Fe, and Ir.

According to a twenty ninth aspect of the present invention, the recording layer comprises Ga, Sb, Bi, and Rh.

According to a thirtieth aspect of the present invention, the recording layer further comprises one element selected from Cu, B, N, Ge, Fe, and Ir.

According to a thirty first aspect of the present invention, the recording layer comprises Ga, Sb, Zr, and Mg.

According to a thirty second aspect of the present invention, the recording layer further comprises one element selected from Al, C, N, Se, and Sn.

According to a thirty third aspect of the present invention, the optical recording medium comprises the substrate, a first protective layer, the recording layer, a second protective layer, a reflection layer, and a surrounding protective layer. In the optical recording medium of the thirty third aspect, the first protective layer, the recording layer, the second protective layer, and the reflection layer are disposed on the substrate in this order, and the surrounding protective layer is disposed on a surface of the reflection layer.

According to a thirty fourth aspect of the present invention, the present invention provides a process for manufacturing an optical recording medium which comprises the steps of: disposing a first protective layer, a recording layer, a second protective layer, a reflection layer in this order on a substrate, so as to manufacture an optical recording medium prior to initial crystallization; and irradiating a laser beam having a power density of 5 mW/μm² to 50 mW/μm² to the optical recording medium prior to initial crystallization, while rotating the optical recording medium prior to initial crystallization and radially moving the laser beam at a constant linear velocity for initial crystallization of 3 m/s to 18 m/s, so as to initially crystallize the optical recording medium prior to initial crystallization and manufacture the optical recording medium of the present invention.

According to a thirty fifth aspect of the present invention, the laser beam has the power density of 15 mW/μm² to 40 mW/μm², and the constant linear velocity for initial crystallization is 6 m/s to 14 m/s the laser beam has the power density of 15 mW/μm² to 40 mW/μm², and the constant linear velocity for initial crystallization is 6 m/s to 14 m/s.

According to a thirty sixth aspect of the present invention, the present invention provides a sputtering target for manufacturing an optical recording medium which comprises an alloy. In the sputtering target for manufacturing an optical recording medium of the thirty sixth aspect, the alloy is expressed by the following Formula (1);

$$Ga_\alpha Sb_\beta \qquad \text{Formula (1)}$$

where "α" and "β" are each expressed in atm %, and each satisfy relations of: "5≦α≦20" and "80≦β≦95."

According to a thirty seventh aspect of the present invention, the alloy is expressed by the following Formula (1);

$$Ga_\alpha Sb_\beta \qquad \text{Formula (1)}$$

where "α" and "β" are each expressed in atm %, and each satisfy relations of: "5≦α≦15" and "85≦β≦95."

According to a thirty eighth aspect of the present invention, the present invention provides a sputtering target for manufacturing an optical recording medium which comprises an alloy, in which at least one element of the alloy is selected from Ag, Au, Cu, B, Al, In, Mn, Sn, Zn, Bi, Pb, Ge, Si, and N, a content of the element is 10 atm % or less of other element of the alloy, and the alloy is expressed by one of the following Formula (1);

Formula (1)

where "α" and "β" are each expressed atm %, and each satisfy relations of: "5≦α≦20" and "80≦β≦95."

According to a thirty ninth aspect of the present invention, the present invention provides an optical recording process which comprises the steps of: forming a laser beam which reversibly phase changes between an amorphous phase and a crystalline phase in a recording layer which is disposed on a substrate of the optical recording medium of the present invention, so as to have one of a single pulse and a plurality of pulses; and irradiating the laser beam to the optical recording medium at a linear velocity (V) one of between more than 3 m/s and 40 m/s or less, and at a recording power (Pw) having a power density of 20 mW/μm² or more, so as to record in the recording layer.

According to a fortieth aspect of the present invention, the linear velocity (V) is one of between 10 m/s and 35 m/s.

According to a forty first aspect of the present invention, the laser beam is irradiated, so that a ratio of an erasing power (Pe) to the recording power (Pw) satisfies a relation of:

0.10≦Pe/Pw≦0.65, where "Pe" expresses the erasing power and "Pw" expresses the recording power.

According to a forty second aspect of the present invention, the laser beam is irradiated so as to have a ratio of an erasing power (Pe) to the recording power (Pw) which satisfies a relation of:

0.13≦Pe/Pw≦0.6, where "Pe" expresses the erasing power and "Pw" expresses the recording power.

DESCRIPTION OF THE PREFERRED EMBODIMENTS

Referring to the accompanying drawings, the embodiments of the present invention will be described hereinafter.

Figure 1:
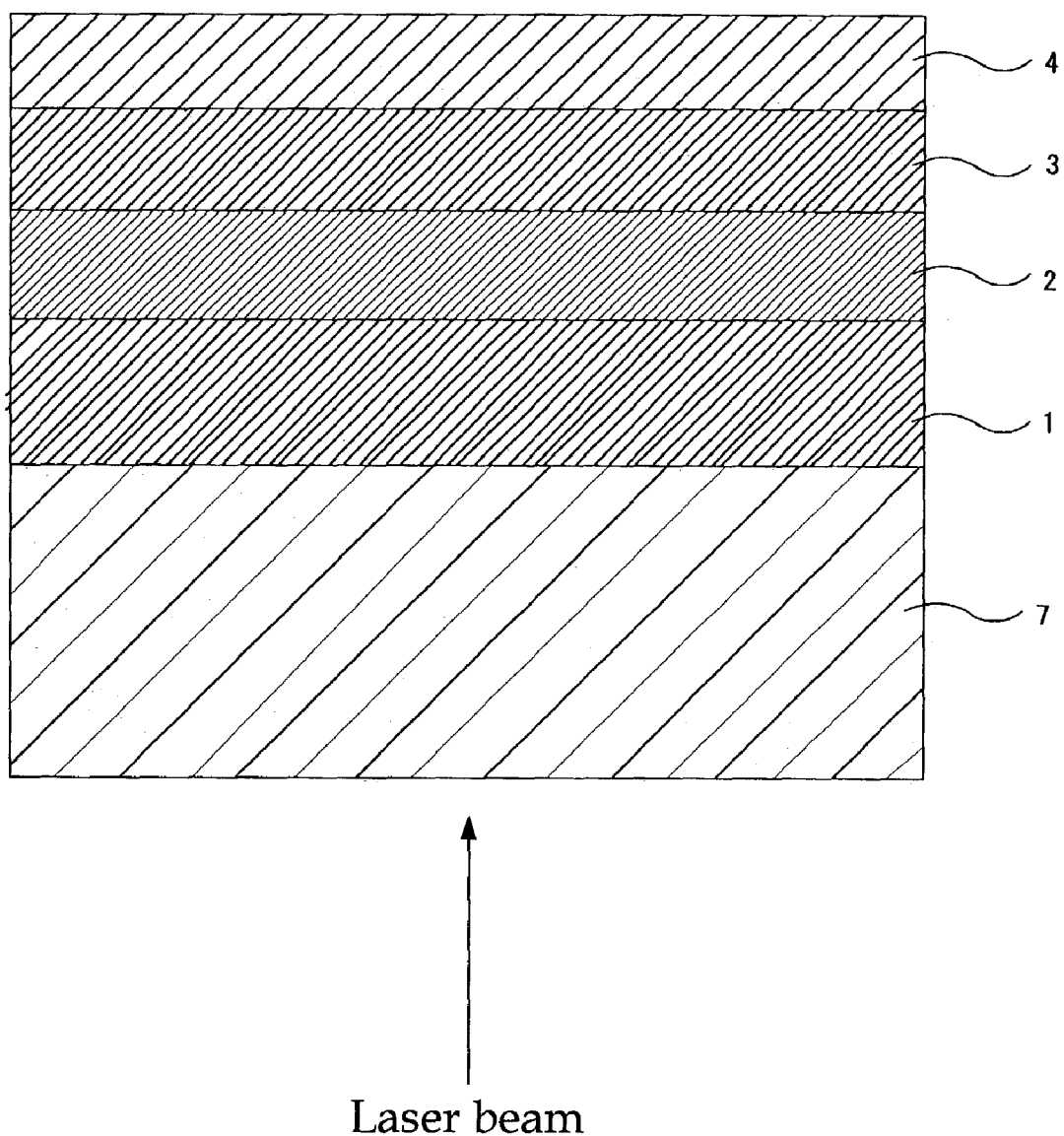
FIG. 1 is a sectional view showing an example of a schematic structure of an optical recording medium according to the present invention.
Figure 2:
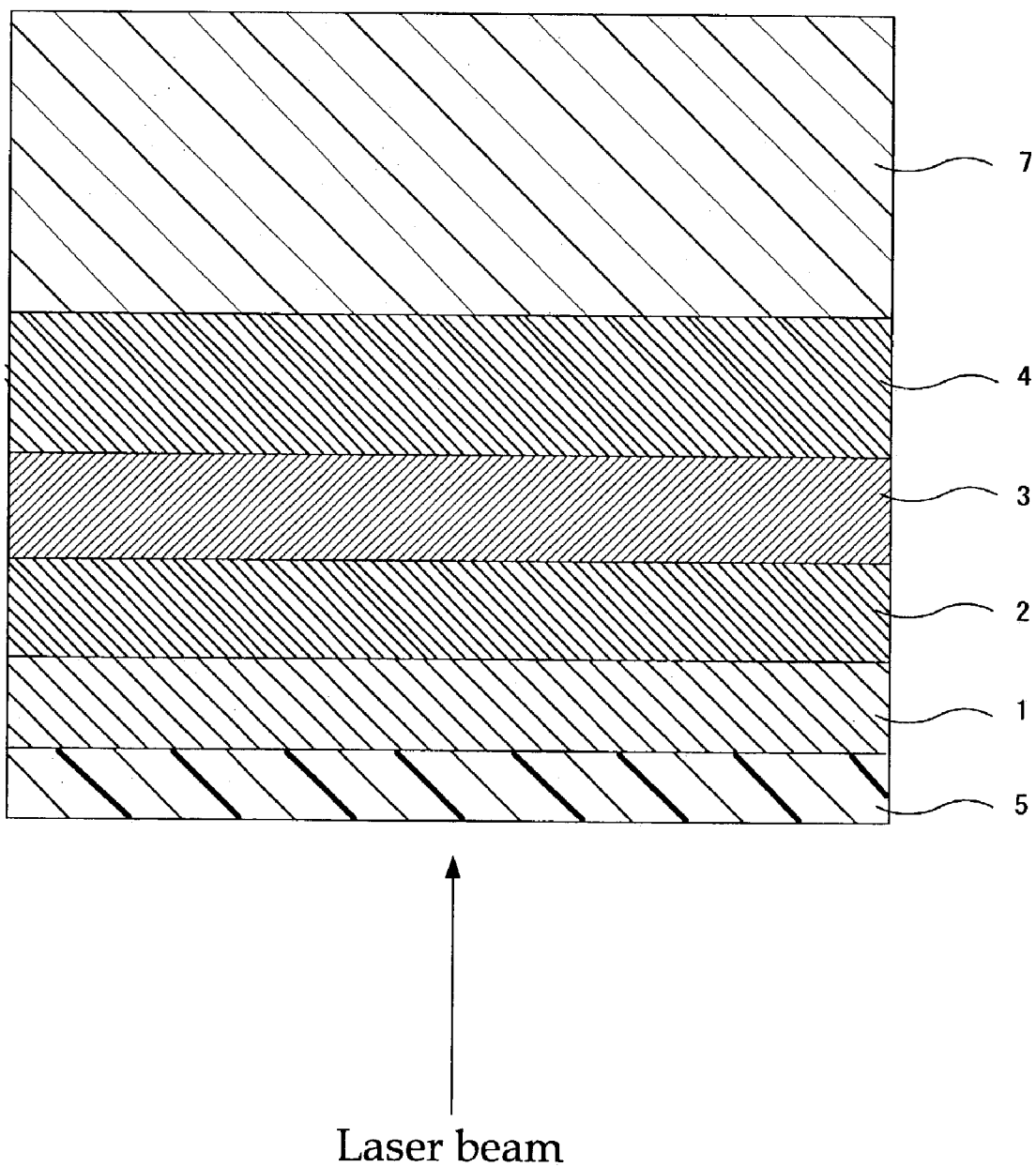
FIG. 2 is a sectional view showing another example of a schematic structure of an optical recording medium according to the present invention.

FIG. 1 and FIG. 2 are each sectional views showing examples of schematic structures of an optical recording medium according to the present invention. FIG. 1 shows a structure where a first protective layer 1, a recording layer 2, a second protective layer 3 and a reflection layer 4 are sequentially disposed on a substrate 7. Protective layer such as the first protective layer 1 and the second protective layer 3, are not required to be disposed. However, when the substrate 7 comprises a material having poor heat resistance such as a polycarbonate resin, the first protective layer is preferably disposed. A surrounding protective layer can also be disposed if necessary, though not shown in the figures.

Figure 4:
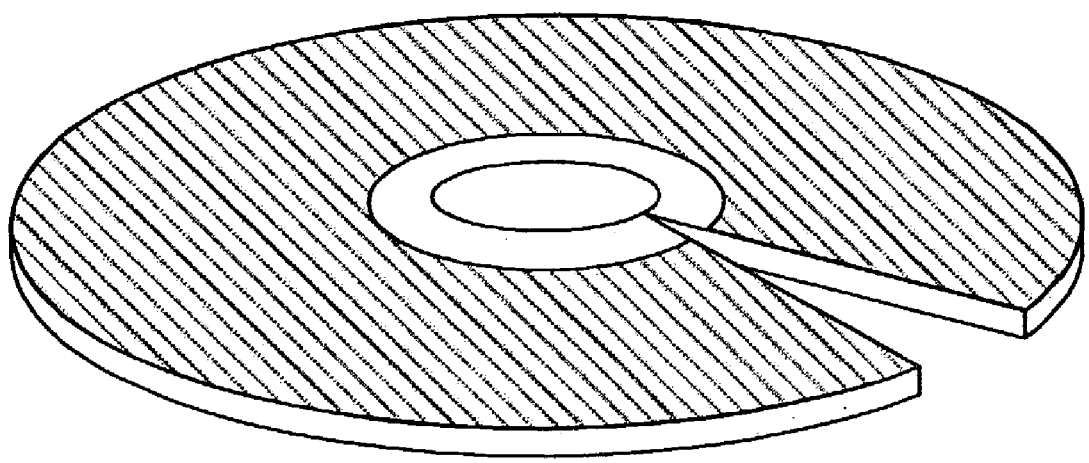
FIG. 4 is a perspective view showing an example of a schematic structure of an optical recording medium according to the present invention.

FIG. 2 shows an example of a structure where the reflection layer 4, the second protective layer 3, the recording layer 2, and the first protective layer 1 are sequentially disposed on the substrate 7, in the inverse order of the structure in FIG. 1. In the structure shown in FIG. 2, a light transmittance layer 5 is additionally disposed. Each of the optical recording media is subjected to recording and reproducing by irradiating a laser beam from the direction shown in FIGS. 1 and 2. An optical recording medium having the structure of FIG. 2 has a suitable structure for making the spot diameter of the laser beam smaller by enhancing numerical aperture (NA) of objective lens of an optical pickup, thereby allowing the recording mark to have higher density. The optical recording medium of the present invention preferably has a disk-shape. FIG. 4 is a perspective view showing an example of a schematic structure of an optical recording medium according to the present invention. A sectional view of a cut portion of the optical recording medium shown in FIG. 4 can be referred to as the one shown in FIG. 1, for example. Here, it should be noted that the optical recording medium of the present invention is not limited to the above configurations.

Hereinafter, the present invention will be described in detail.

As for material in a recording layer of the recent DVD system, there is already a marketed DVD system capable of recording at the speed of 2.5× (around 8.5 m/s recording linear velocity). Further demand has been made on a higher speed recording.

In view of this situation, the inventors of the present invention have researched and developed a recording material for an optical recording medium, which is capable of high density recording in a capacity equivalent to, or more than that of DVD-ROM, and which covers, at the same time, ×10 speed of recording (around 35 m/s or more). As a result, it has been found out that a preferable composition is the one closer to an eutectic composition of Ga and Sb.

It appears that the material, Ga and Sb, was proposed in development of a rewritable optical disk having reflectance interchangeability with CD-ROM in the middle of the 1980's. However, a low reflecting medium formed of AgInSbTe was alternatively proposed, and thus the Ga and Sb did not appear in the practical use.

The inventors of the present invention has found out that an optical recording medium is capable of recording and erasing by a reversible phase change between an amorphous phase and a crystalline phase by comprising a substrate and a recording layer disposed on the substrate in which the recording layer comprises Ga and Sb, and a content of the Sb is 80 atm % to 95 atm % relative to a total content of the Ga and the Sb in the recording layer. The optical recording medium having a composition ratio of the above is capable of recording at a high linear velocity, and of being applied to a wide range of the linear velocity at recording.

In the recording layer, a content of Sb is 80 atm % to 95 atm % relative to a total content of Ga and Sb. The content of Sb is preferable from a viewpoint of obtaining an optical recording medium having a good C/N ratio. The total content of Ga and Sb in the recording layer is preferably 90 atm % or more, and more preferably 95 atm % or more.

The optical recording medium of the present invention is capable of recording and erasing by a reversible phase change between an amorphous phase and a crystalline phase, preferably at a linear velocity of 10 m/s or more, more preferably at a linear velocity of 14 m/s or more, and still more preferably at a linear velocity of 28 m/s or more. Here, the optical recording medium of this aspect refers to the one that has a capability of recording and erasing at a linear velocity of 10 m/s or more. The optical recording medium of this aspect may be or may not be capable of recording and erasing at a linear velocity of less than 10 m/s.

However, the inventors of the present invention have confirmed the following. As described above, a limit of a recording linear velocity of the optical recording medium formed of AgInSbTe is around 20 m/s. As for Ga Sb, it has been confirmed by an experiment that a sufficient degree of modulation can be obtained, at a linear velocity up to around 35 m/s even with the Ga and Sb alone, when recording is carried out under a condition of $12\% \leq Rg \leq 30\%$, preferably $20\% \leq Rg \leq 30\%$ (herein "Rg" expresses a reflectance at an unrecorded space part of a disk upon irradiating a laser beam having wavelength of between 350 nm to 700 nm), using a DVD recording system having lens NA of around 0.65. The optical recording medium thus manufactured maintains good jitter properties even upon repetitive overwriting, and has very few problems regarding archival stability.

In order to satisfy such conditions, the optical recording medium comprises a substrate, a first protective layer, a recording layer, a second protective layer, and a reflection layer. In the optical recording medium, the first protective layer, the recording layer, the second protective layer, and the reflection layer are disposed on the substrate in this order. A thickness of the reflection layer preferably satisfies a relation of "$0.10\lambda$ or more," when the "$\lambda$" expresses wavelength of the laser beam.

When the wavelength of the laser beam is 630 nm to 700 nm, a thickness of the second protective layer and a thickness of the reflection layer each satisfy the following relations, and a thickness of the recording layer and a thickness of the first protective layer can mainly be adjusted.

$$0.011\lambda \leq t_3 \leq 0.040\lambda$$

$$0.10\lambda \leq t_4;$$

wherein "$t_3$" expresses the thickness of the second protective layer, and "$t_4$" expresses the thickness of the reflection layer. In particular, when the wavelength is determined, since the thicknesses of the recording layer and the protective layer are selected from an extremely limited range, it is easy to determine these thicknesses of the recording layer and the first protective layer.

The high reflectance within the "Rg," can be attained by thickening the recording layer and the first protective layer. Furthermore, in order to control the reflectance by the first protective layer within the range defined by the above relations of "Rg," the thickness of the recording layer preferably satisfies a relation of:

$$0.015\lambda \leq t_2 \leq 0.032\lambda,$$

wherein the "$t_2$" expresses the thickness of the recording layer.

The thickness of the first protective layer preferably satisfies a relation of:

$$0.070\lambda \leq t_1 \leq 0.16\lambda,$$

wherein the "$t_1$" expresses the thickness of the first protective layer.

If the thickness of the recording layer is within the range defined by the above relations, the thickness of the first protective layer may become larger than the thickness defined by the above relations. In the other words, the thickness of the first protective layer may satisfy other relations than the above in which the thicknesses are larger than the above relations.

If the thickness of the first protective layer satisfies the other relations than the above, it takes more time to form and dispose the first protective layer.

Therefore, from a viewpoint of manufacturing an optical disk (an optical recording medium), the thickness of the first protective layer is preferably within the range defined by the above relation, in order to produce at low-cost. Therefore, the thickness of the first protective layer preferably satisfies the relation of:

$$0.070\lambda \leq t_1 \leq 0.16\lambda,$$

wherein the "$t_1$" expresses the thickness of the first protective layer.

Since the reflectance changes an absorption factor of light energy in a disk (an optical recording medium), it is an important property that influences recording properties of a disk. That is, when "Rg" is more than 30%, recording energy shorts, and a sufficient degree of modulation cannot be obtained. On the other hand, when the "Rg" is less than 12%, sufficient signal strength, which is necessary for a recording system, cannot be obtained.

The second protective layer plays a role of efficiently transmitting the light energy to the reflection layer and the light energy having been absorbed in the disk (the light energy is mainly absorbed in a recording layer material), so as to dissipate the heat derived from the light energy. If the second protective layer is too thick, heat is kept inside and a recording mark becomes fuzzy or unclear. The recording property, particularly jitter property hence deteriorates. If the second protective layer is too thin, heat is released to the reflection layer before reaching a heat amount required to exhibit a phase change recording principle in which the light energy absorbed in the recording layer accumulates therein and the recording layer melts to produce a recording mark. Therefore, sufficient recording property may not be obtained. It is preferable that the second protective layer is not very thick, and is within a range defined by the above relation.

In addition, it is necessary to change the thickness of the second protective layer, since power density of a laser beam changes according to wavelength to be used in a recording system. This problem can be solved by placing the thickness within a range that satisfies the above relation. This can be applied to the thicknesses of the other layers.

Here, the jitter property is evaluated by mark-edge dispersion, σ/Tw, with respect to a channel cycle, "Tw."

The reflection layer plays a role of releasing the light energy, which has been absorbed in the disk (absorption is mainly carried out by a recording layer material), and also plays a role of reflecting the incident light of the light energy in an optical disk. If the thickness of the reflection layer satisfies a certain level, both of the roles can be carried out.

The inventors of the present invention have found out, through the experiments, that a preferable thickness of the reflection layer is around 60 nm or more in order to attain the roles. The maximum thickness of the reflection layer is not particularly limited, as long as the thickness does not affect the manufacturing cost of the disk. The preferable thickness is considered to be 300 nm or less.

When using the laser beam for recording, the thickness of the first protective layer is preferably 40 nm or more, from a viewpoint of protecting the substrate from heat, and the thickness of the first protective layer is preferably 500 nm or less, from a viewpoint that separation is less likely to occur between the substrate and a surface of the first protective layer.

The thickness of the first protective layer enables controlling a degree of modulation (M). In an optical recording medium comprising Ga and Sb according to the present invention, when a recording and reproducing system for a optical recording medium is utilized, there may be a case that a degree of modulation is small.

The degree of modulation (M), can be obtained by the following equation, when a recording test is carried out in an evaluation system of NA 0.65 and wavelength of 660 nm, as currently used in a DVD for recording:

$$M=(IH-IL)/IH:$$

wherein "M" expresses the degree of modulation, "IH" expresses a signal level of a space part having a maximum mark length, and "IL" expresses a signal level of a space part having a maximum space length.

In the above condition, the degree of modulation (M) in the currently used optical disk system is required to be around 0.5 or more. On the other hand, if the aforementioned thickness of each of the layers is large, in particular, if the thickness of the first protective layer is large, the degree of modulation may become less than 0.4.

Note that "the reflectance at unrecorded space part, 'Rg,'" has the same meaning as the signal level of a space part having a maximum mark length, "IH," (a signal level when the laser beam was irradiated 100%, is considered as 100%). It also should be noted that "the reflectance at recording mark (recorded portion), 'Rb,'" has the same meaning as the signal level of a space part having a maximum space length, "IL."

The necessary degree of modulation when irradiating a laser beam having wavelength of 630 nm to 700 nm may be attained, and determining the thickness of the first protective layer so as to have the degree of modulation of 0.4 or more when irradiating the laser beam having the above-mentioned wavelength, and also by controlling the thicknesses of the first protective layer and the recording layer.

In order to have smaller recording marks and to have smaller intervals between the recording marks for achieving higher capacity of the optical recording medium, the wavelength of the laser beam is required to be short. The optical recording medium of the present invention realizes a higher capacity at the same time as having shorter wavelength of the laser beam. The optical recording medium of the present invention can be used when irradiating a laser beam having any wavelength of between 350 nm to 450 nm.

When irradiating a laser beam having wavelength of between 350 nm to 450 nm, the thicknesses of each of the layers of the optical recording medium shown in FIG. 1 and FIG. 2, preferably satisfy the following relations, when "λ" expresses wavelength of the laser beam to be irradiated.

Referring into FIG. 1 and FIG. 2, the thickness of the recording layer 2, "$t_2$," preferably satisfies a relation of "$0.015\lambda \leq t_2 \leq 0.05\lambda$." If the "$t_2$" is 0.015λ or more, it is preferable from a viewpoint of having a uniform thickness. If the "$t_2$" is 0.05% or less, it is preferable from a viewpoint of recording sensitivity.

The thickness of the first protective layer 1, "$t_1$," preferably satisfies a relation of "$0.070\lambda \leq t_1 \leq 0.5\lambda$." If the "$t_1$" is 0.070λ or more, it is preferable from a viewpoint of protecting the substrate from heat generated upon recording. If the "$t_1$" is 0.5λ or less, it is preferable from a viewpoint of mass-production. The thicknesses, "$t_2$" and "$t_1$" are controlled or adjusted within the relations above, so as to have the most suitable reflectance when a laser beam is irradiated.

The thickness of the second protective layer 3, "$t_3$," satisfies a relation of "$0.011\lambda \leq t_3 \leq 0.055\lambda$." If the "$t_3$" is 0.011λ or more, it is preferable from a viewpoint of recording sensitivity. If the "$t_3$" is 0.055λ or more, it is preferable from a viewpoint that microscopic plastic deformation is accumulated inside the second protective layer 3, in accordance with repetitive overwriting and thus prevents an increasing noise level.

The thickness of the reflection layer 4, "$t_4$," preferably satisfies a relation of "$0.10\lambda \leq t_4$." The "$t_4$" is preferably $0.10\lambda$ or more, from a viewpoint of repetitive recording property. As shown in FIG. 2, if the reflection layer 4 is adjacent to the substrate 7, the thickness of the reflection layer 4, "$t_4$," satisfies a relation of "$0.10\lambda \leq t_4 \leq 0.75\lambda$." If the "$t_4$" is larger than $0.75\lambda$, a shape of the recording layer 2 may become largely different from the groove of the substrate, and a problem such as crack may occur.

In the structure of FIG. 2, the thickness of the light transmittance layer 5 which is formed on the uppermost in the structure, "$t_5$," is preferably as thin as possible. For instance, "$t_5$" satisfies a relation of "$0 \leq t_5 \leq 0.6$ mm," so as to make a tilt margin larger, even when numerical aperture (NA) of an objective lens used for forming laser spot is large. If the "$t_5$" is larger than 0.6 mm, aberration may occur, causing an increase in errors.

Figure 3:
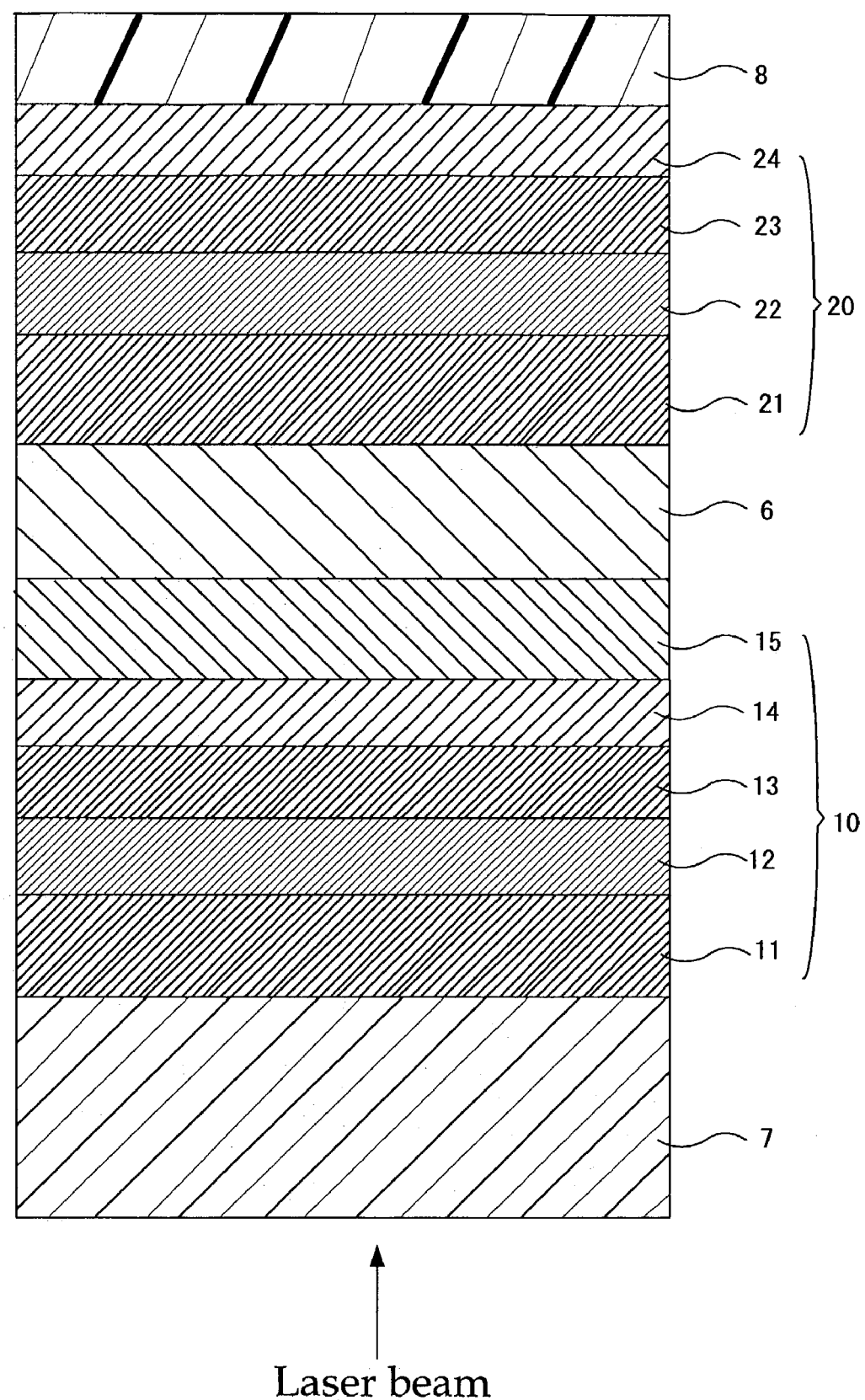
FIG. 3 is a sectional view showing an example of a schematic structure of an optical recording medium having two recording layers.

Furthermore, the optical recording medium of the present invention may have a multi-layer structure which has a high recording density, by providing two or more of the recording layers. FIG. 3 is a sectional view showing an example of a schematic structure of the optical recording medium having two of the recording layers. A first information layer 10, and a second information layer 20 are disposed in this order on the substrate 7. An intermediate layer 6 is disposed between the first information layer 10 and the second information layer 20. The first information layer 10 includes the first protective layer 11, the recording layer 12, the second protective layer 13, and the reflection layer 14. The second information layer 20 includes the first protective layer 21, the recording layer 22, the second protective layer 23, and the reflection layer 24. A heat dissipation layer 15 is provided between the intermediate layer 6 and the reflection layer 14. The heat dissipation layer 15 sufficiently dissipates heat which generates upon recording in the first information layer 10.

In order to achieve preferable recording and reproducing properties in the second information layer 20, the light transmittance of the first information layer 10 is required to be high. Therefore, in the optical recording medium of the present invention, the light transmission of the first information layer 10 is 40% or more, by adjusting the thickness of each of the layers in the first information layer 10. Specifically, it means to thin the recording layer 12. Since the material expressed by $Ga\alpha Sb\beta X\gamma$ is utilized, it is possible to attain a sufficient degree of modulation and crystallization speed, even with a thin recording layer 12. Accordingly, it is possible to attain good recording and reproducing, even with double layer-structure optical recording medium, and provides an optical recording medium having a large recording capacity.

As shown in the above, the recording layer of an optical recording medium according to the present invention comprises Ga and Sb. The recording layer may further comprise other element(s). The recording layer may comprise other element(s) than Ga and Sb in 10 atm % or less of a total content of Ga and Sb. The other element(s) is preferably at least one selected from Ag, Au, Cu, Zn, B, Al, In, Si, Ge, Sn, Pb, N, P, Bi, La, Ce, Gd, Tb, Mg, Co, Mn, Zr, Rh, Se, Fe, and Ir. Containing at least one of the elements of the above may enable improving recording properties and resistance of the optical recording medium of the present invention.

For instance, containing 10 atm % or less of a total content of Ga and Sb of at least one element selected from Ag, Au, Cu, B, Al, In, Mn, Sn, Zn, Bi, Pb, Ge, Si, and N, physical properties of the optical recording medium such as recording power, a recordable linear velocity, stability of amorphous mark, or the like, can be improved.

Adding a single substance of Ge or a mixture of Ge and at least one element selected from In, Al, Ag, Mn, Cu, Au, and N into the recording layer can also contribute to improving the degree of modulation (M).

A preferable composition ratio of the element(s) to be added into the recording layer is 10 atm % or less.

For example, the inventors of the present invention have confirmed that adding around 3 atm % of In or Ge to GaSb enhances the degree of modulation by around 10%. The other elements show a similar effect. Here, in $Ga\alpha Sb\beta X\gamma$, "X" expresses an element other than Ga and Sb and a mixture thereof. In addition, "$\alpha$," "$\beta$," and "$\gamma$" each satisfy the relations of, in atm %, "$5 \leq \alpha \leq 20$," "$80 \leq \beta \leq 95$," "$0 < \gamma \leq 10$" and "$\alpha + \beta + \gamma = 100$." If "$\alpha$" is smaller than 5, crystallization speed is lowered and thus a recording and reproducing at a high linear velocity becomes difficult. On the other hand, if "$\alpha$" is larger than 20, cycle of repetitive overwriting may become deteriorated. If "$\beta$" is smaller than 80, a degree of modulation becomes as small as, for example, less than 0.4, between a reflectance of a recording mark and that of unrecorded space part. If "$\beta$" is larger than 95, cycle of repetitive overwriting may become less frequent. Furthermore, if "$\gamma$" is larger than 10, a storage properties may deteriorate.

The recording layer 2 can be formed by various vapor growth methods, including, for example, vacuum deposition method, sputtering method, plasma-CVD method, photo-CVD method, ion plating method, electron beam vacuum deposition method and the like. In particular, the sputtering method is preferable for mass production and for quality of film (layer), or the like.

The inventors have further confirmed that, by adding those elements other than Ga and Sb, it is possible to obtain an optical recording medium which is easily treated in a recording system, having further enhanced storage stability and requires less recording power, compared with an optical recording medium having a recording layer formed of GaSb alone. The addition of each of the elements may be optimized according to a necessity in the recording system.

When irradiating a laser beam having wavelength of 350 nm to 450 nm, the element(s) other than Ga and Sb is preferably at least one selected from Ag, Au, Cu, Zn, B, Al, In, Si, Ge, Sn, Pb, N, P, Bi, La, Ce, Gd, and Tb. The addition of the element(s) leads to an optical recording medium that can be easily treated, for example, enabling improving archival stability and requiring small laser power for recording.

An optical recording medium according to another aspect of the present invention comprises Bi and Rh as the elements other than Ga and Sb. The optical recording medium of another aspect focuses on a high-speed crystallization ability of Ga and Sb, and the inventors of the present invention have decided to employ GaSb for the components of the recording layer in order to attain a high-speed crystallization. Bi is also employed so as to improve such properties of GaSb that the initial crystallization is slightly difficult because of a high crystallization temperature. Addition of Bi has enabled higher crystallization speed and a sufficient degree of modulation. By further adding Rh, the archival stability and overwriting properties are improved.

The reason why the recording layer comprising Ga and Sb enables a high-speed crystallization has not yet been clear. An assumption has been made on that it is because the most adjacent distance between the atoms of Ga and Sb is 2.65 Å (0.265 nm) in the case of amorphous phase, and is 2.64 Å (0.264 nm) in the case of crystalline phase, and that the phase transferring between the amorphous phase to the crystalline phase can be carried out easily, accordingly.

Furthermore, having weak covalent bond, Bi enables weakening covalent bond of Ga and Sb. The crystallization temperature is lowered and re-arrangement of atoms is more easily enabled. Thus, the crystallization speed can be accelerated. Moreover, by adding Bi, a structure between amorphous phase and crystalline phase becomes largely changed, compared with that of GaSb alone. This results in a significant change of optical constant between amorphous and crystalline phases along with the phase transferring. Accordingly, it is possible to obtain a sufficient degree of modulation.

Although it is still unknown how the addition of Rh influences the improvement of archival stability and overwriting properties, an assumption has been made on that a passive state is created by adding Rh, and oxidation may be prevented. Since having a high melting point, Rh prevents substance flow during overwriting, and improves the overwriting properties, as a result.

A content of Bi is preferably 1 atm % to 5 atm % in the recording layer, and a content of Rh is preferably 1 atm % to 3 atm % in the recording layer.

Containing 1 atm % or more of Bi in the recording layer, crystallization temperature becomes lower, and a degree of modulation improves. If the content of Bi is more than 5 atm %, archival stability deteriorates. Containing 1 atm % or more of Rh in the recording layer, archival stability and overwriting properties improve. If the content of Rh is less than 3 atm %, recording sensitivity deteriorates. In this aspect, the content of Sb is preferably 94 atm % or less in the recording layer.

The recording layer which comprises Bi and Ri in addition to Ga and Sb, may further comprise at least one element selected from Cu, B, N, Ge, Fe, and Ir. The optical recording medium having the above recording layer may have a sufficient degree of modulation, with an equivalent capacity of that of DVD-ROM at a recording linear velocity of 3.0 m/s to 35 m/s. The optical recording medium also have good overwriting repetitive properties, and have better archival stability.

It is considered to be because in the case of B, N and Ge, those elements have strong covalent bonding property, and thus tend to be connected with an unconnected bond of host material (elements contained in the recording layer), which prevents oxidation. It is still not clear how Cu, Fe, and Ir improve the archival stability. An assumption has been made on that Cu, Fe, and Ir also tend to connect with unconnected bonds of the host material, which prevents oxidation.

A content of at least one element selected from Cu, B N, Ge, Fe, and Ir is preferably 1 atm % to 3 atm % in the recording layer. If the content of the element is less than 1 atm %, there is no effect derived from the addition, which is not preferable. If the content of the element is more than 3 atm %, the crystallization speed become lowered, which is not preferable.

In the aspect of the present invention above, thicknesses of the first protective layer and the second protective layer is preferably 20 nm to 300 nm.

The first protective layer and the second protective layer are each preferably formed by sputtering method using ZnS and $SiO_2$.

The first protective layer and the second protective layer each play a role of protecting the optical recording medium from heat (a role of a heat resistant layer) at the same time as playing a role of a light interference layer.

If the thickness of the first protective layer is less than 200 Å (20 nm), the first protective layer does not work as the heat resistant layer that prevents damage to the substrate from heat. If the thickness of the first protective layer is more than 3000 Å (300 nm), the separation of interface between layers, is more likely to occur. The thickness of the first protective layer is therefore preferably 200 Å (20 nm) to 3000 Å (300 nm). In order to work as the light interfering layer, the thickness of the first protective layer more preferably satisfies a relation of:

$$0.070\lambda \leq t_1 \leq 0.16\lambda,$$

wherein "$t_1$," expresses the thickness of the first protective layer, and "$\lambda$" expresses the wavelength of the laser beam.

The second protective layer plays a role of effectively dissipating the heat absorbed in the recording layer toward the reflection layer, and a role of preventing a reaction between the recording layer and the reflection layer.

The thickness of the second protective layer is preferably 20 Å (2 nm) or more. The second protective layer is formed preferably as thin as possible. If the second protective layer is too thin, however, the beam power upon recording has to be large. When using a laser beam having wavelength of 630 nm to 700 nm, as utilized in DVDs, the thickness of the second protective layer preferably satisfies a relation of:

$$0.011\lambda \leq t_3 \leq 0.040\lambda,$$

wherein "$t_3$" expresses the thickness of the second protective layer, and "$\lambda$" expresses the wavelength of the laser beam.

The recording layer of the aspect of the present invention above is formed ordinarily by sputtering method. A thickness of the recording layer of the aspect is preferably 10 nm to 100 nm, and more preferably 20 nm to 35 nm.

If the thickness of the recording layer is smaller than 10 nm, light absorption properties deteriorate, and a function as a recording layer is lost. If the thickness of the recording layer is larger than 100 nm, a less laser beam is transmitted, and an interference effect cannot be expected.

The reflection layer of the aspect comprises Ag alloy. The reflection layer can be formed by the sputtering method. The reflection layer works also as a heat dissipation layer. A preferable thickness of the reflection layer is 50 nm to 200 nm, and more preferably, 70 nm to 150 nm.

In an optical recording medium according to other aspect of the present invention, the recording layer comprises Zr and Mg, as the other elements than Ga and Sb. In the other words, the present invention focuses on high speed crystallization speed derived from Ga and Sb. This is why Ga and Sb are contained in the recording layer of the optical recording medium of the present invention. Mg is employed so as to improve such properties of GaSb that the initial crystallization is slightly difficult because of its high crystallization temperature.

Addition of Mg enables lowering the crystallization temperature of GaSb, higher speed crystallization and a sufficient degree of modulation. Addition of Zr to the GaSb further improves archival stability and overwriting properties of the recording layer.

The reason why the recording material which contains a combination of Ga and Sb, Zr, and Mg enables a high speed crystallization have not yet been clear. An assumption has been made on that it is because the most adjacent distance between the atoms of GaSb alloy is 2.65 Å (0.265 nm) in the case of amorphous phase, and is 2.64 Å (0.264 nm) in the case of crystalline phase, and that the phase transferring between the amorphous phase to the crystalline phase can be carried out with slight transferring of the atoms, accordingly.

Decrease in crystallization temperature because of addition of Mg is derived from weakening the bonding among Ga—Sb—Mg alloy, since Mg has weak covalent bonding. Re-arrangement of atoms is more easily enabled. Thus, the crystallization speed can be accelerated. Moreover, by adding Mg, a structure between amorphous phase and crystalline phase becomes largely changed, compared with that of GaSb alloy. This results in a significant change of optical constant between amorphous and crystalline phases along with the phase transferring. Accordingly, it is possible to improve the degree of modulation.

Although it is still not very clear how the addition of Zr influences the improvement of archival stability and overwriting properties, an assumption has been made on that a high melting point of Zr controls a substance flow, thereby the overwriting properties are improved. Furthermore, a passive state is easily created by adding Zr, which prevents oxidization, thereby improving the archival stability.

According to the above aspect of the present invention, by use of the phase change alloy of the above composition for the recording layer, it is possible to obtain a optical recording medium having a large recording capacity equivalent to that of DVD-ROM, and even at a wide range of recording linear velocity of 3.5 m/s to 35 m/s, including a high linear velocity of 25 m/s or more, and it still improves the degree of modulation, good in overwriting and its repeating property, and further a high archival stability.

In the aspect above, a content of Zr in the recording layer is preferably 0.5 atm % to 5 atm %, and a content of Mg in the recording layer is preferably 1 atm % to 6 atm %.

Containing 0.5 atm % or more of Zr in the recording layer improves archival stability and overwriting properties. If the content of the Zr is more than 5 atm %, crystallization speed and recording sensitivity deteriorate. Containing 1 atm % or more of Mg in the recording layer lowers crystallization temperature, and enables easier initial crystallization, and further accelerates crystallization speed. Moreover, containing 1 atm % of Mg enables faster crystallization speed, enables easier overwriting at a high linear velocity of 35 m/s, and improves the degree of modulation.

If the content of Mg is more than 6 atm %, archival stability deteriorates.

In the aspect above, a content of Ga is preferably 6 atm % or more, from a viewpoint of crystallization speed. A content of Sb here is preferably 90 atm % or less, from a viewpoint of improving the number of cycle of repetitive overwriting.

As a further preferable phase change alloy to be used for the recording layer, there is suggested a recording material in the recording layer comprising Ga, Sb, Zr, and Mg, together with one element selected from Al, C, N, Se, and Sn. When Al, C, N, and Se are added, the archival stability is further improved. When Al, and Sn are added, the crystallization speed is further improved and overwriting can be carried out at a linear velocity of, for example, 35 m/s, on the other hand.

A content of the element selected from Al, C, N, Se, and Sn in the recording layer is preferably 1 atm % to 3 atm %. Containing 1 atm % or more of the element in the recording layer enables exhibiting the above effects such as good archival stability, overwriting properties at the linear velocity of 35 m/s, or the like.

Containing more than 3 atm % of the element in the recording layer, recording sensitivity deteriorates in a case of Al, C, N, Se, and crystallization temperature decreases and hence archival stability deteriorates in a case of Sn.

The content of Ga, Sb, Zr, and Mg in the recording layer and the reason for the contents are the same as the previously given reasons for the case of Ga, Sb, Zr, and Mg.

The recording layer can be formed by various vapor growth methods, for example, sputtering method, as described in the above. In the aspect above, the thickness of the recording layer is 10 nm to 100 nm, and more preferably 20 nm to 35 nm.

If the recording layer is thinner than 10 nm, light absorption ability deteriorates, and a function as a recording layer may be lost. If the recording layer is thicker than 100 nm, less light is transmitted to the recording layer, and an interference effect may not be expected.

A material of substrate 7 is ordinarily, glass, ceramics or a resin. Of these, a resin is preferable from a viewpoint of capability of forming and cost. Specific examples of the resin include a polycarbonate resin, an acrylic resin, an epoxy resin, a polystyrene resin, an acrylonitrile-styrene copolymer resin, a polyethylene resin, a polypropylene resin, a silicone resin, a fluorine resin, an ABS resin, a urethane resin, and the like. Of these, a polycarbonate resin or an acrylic resin such as polymethyl methacrylate (PMMA) or the like is preferable from a viewpoint of capability of forming, optical properties, and cost. Concavoconvex patterns such as guide grooves are formed on the substrate 7, and the substrate 7 is formed by injecting molding or a photopolymer method. The formation or the shape of the substrate 7 can be any of disk, card, sheet or the like.

Materials of a reflection layer 4 can be metals such as Al, Au, Ag, Cu, Ta, and W, or an alloy thereof. Of these, Ag, Cu, Au is preferably used as the material when recording at a high linear velocity. Cr, Ti, Si, Pd, Ta, Cu, In, Mn, or the like, can be added to the reflection layer 4 either alone or in combination of two or more. The reflection layer 4 can be formed by various vapor growth methods, for example, vacuum deposition method, sputtering method, plasma-CVD method, photo-CVD method, ion plating method, electron beam vacuum deposition method or the like. Of these, the sputtering method is preferable for mass production, for quality of the layer, and the like.

The first protective layer 1 plays a role of protecting the recording layer 2 so that impurities such as moisture or the like from the substrate 7 is not to be included in a recording layer, of preventing thermal damage on the substrate 7, and of adjusting optical properties, and the like. Therefore, the first protective layer 1 preferably is unlikely to penetrate moisture, preferably has good heat resistance, a small absorptance (k) and refractive index (n).

Materials of the first protective layer 1 and the second protective layer 3 can be metal oxide such as SiO, $SiO_2$, ZnO, $SnO_2$, $Al_2O_3$, $TiO_2$, $In_2O_3$, MgO, $ZrO_2$, or the like; nitride such as $Si_3N_4$, AlN, TiN, ZrN, or the like; sulfide such as ZnS, $In_2S_3$, $TaS_4$, or the like; carbides such as SiC, TaC, $B_4C$, WC, TiC, ZrC, or the like; diamond like carbon, and the like. These materials can be used either alone or in a mixture of two or more in order to form each of the first and second protective layers. In addition, these materials may inevitably include impurities. It is necessary that a melting point of the first protective layer 1 and that of the second protective layer 3 are higher than that of the recording layer 2. The first protective layer 1 and the second protective layer 3 can be formed by various vapor growth methods, for example, vacuum deposition method, sputtering method, plasma-CVD method, photo-CVD method, ion plating method, electron beam vacuum deposition method or the like. Of these, the sputtering method is preferable for mass production, for quality of the layer, and the like. It is preferable to form the first protective layer 1 and the second protective layer 3 by sputtering method, using (ZnS).(SiO$_2$).

Material of the light transmittance layer 5 is preferably resin, from a viewpoint of ability of forming and cost. Examples of the resin include a polycarbonate resin, an acrylic resin, an epoxy resin, a polystyrene resin, an acrylonitrile-styrene copolymer resin, a polyethylene resin, a polypropylene resin, a silicone resin, a fluorine resin, an ABS resin, a urethane resin and the like. Of these, a polycarbonate resin or an acrylic resin such as polymethyl methacrylate (PMMA), or the like, is preferable from viewpoints of ability of forming, optical properties, and cost. It is also preferable to use an ultraviolet setting resin.

The light transmittance layer 5 may have concavoconvex patterns such as guide grooves. The concavoconvex patterns are molded by injecting molding or a photopolymer method, as in the substrate 7.

Examples of the material for the intermediate layer include ITO formed of InO and SnO, and the like.

Examples of an overcoat layer, which will be mentioned in the followings, include an acrylic resin, and the like.

EXAMPLES

The present invention will be described in more detail with reference to the following EXAMPLES. It should be noted that the present invention is not limited to those EXAMPLES and conditions for manufacturing can be suitably changed or adjusted according to necessity.

Example A-1

On a 0.6 mm thick polycarbonate substrate having a guiding groove which is formed of track pitch of 0.74 μm and of groove depth of 400 Å (40 nm), and also having a diameter of 120 mm, a 75 nm thick first protective layer comprising ZnS.SiO$_2$ mixture target (in which SiO$_2$ was 20 mol %), a 16 nm thick recording layer comprising Ga12Sb88 (atm %) alloy target, a 14 nm thick second protective layer comprising the same target as those for the first protective layer, and a 140 nm thick reflection layer comprising Ag—Pd (1 atm %)-Cu(1 atm %) target, were sequentially disposed in this order by the sputtering method.

As for the alloy target of the recording layer, a feed amount thereof was weighed beforehand, and was heated and melted in a glass ampoule. Thereafter, it was taken out to be-pulverized into powder by a pulverizer. The powder thus obtained was heated and sintered, thereby making a disc-shaped target. Composition ratio of the recording layer after deposition was measured by the inductively coupled plasma (ICP) emission spectrochemical analysis. The resulted composition ratio was the same as that of the elements of the target. For the ICP emission spectrochemical analysis, Sequential type ICP atomic emission spectrometer SPS4000, produced by Seiko Instruments Inc., was used. It should be noted that, in the following EXAMPLES A-2 to A-7, and COMPARATIVE EXAMPLE A-1, the composition ratio of the alloy in the recording layer and the composition ratio of the alloy of the sputtering target were identical.

Subsequently, on the reflection layer, an around 5 μm to 10 μm thick surrounding protective layer comprising an acrylic resin was disposed by a spin coating method. On the surrounding protective layer, a 0.6 mm thick substrate, which was as thick as the substrate originally formed, was adhered to an ultraviolet setting resin, so as to manufacture the optical recording medium of the EXAMPLES As. Initial crystallization was carried out by rotating thus obtained optical recording medium at a constant linear velocity of 3 m/s, while a laser beam having a power density of 8 mW/μm$^2$ was irradiated radially, and moving the laser beam at 36 μm/r.

Recording and reproducing was carried out to the optical recording medium, by using a pickup having wavelength of 660 nm and NA of 0.65. Random patterns were recorded by EFM+ modulation technique, which is a modulation technique of DVD, under the recording conditions of a recording linear velocity of 17 m/s, recording linear density of 0.267 μm/bit, which is the same capacity as that of DVD-ROM, recording power (Pw) of 20 mW, and erasing power (Pe) of 7 mW.

Figure 5:
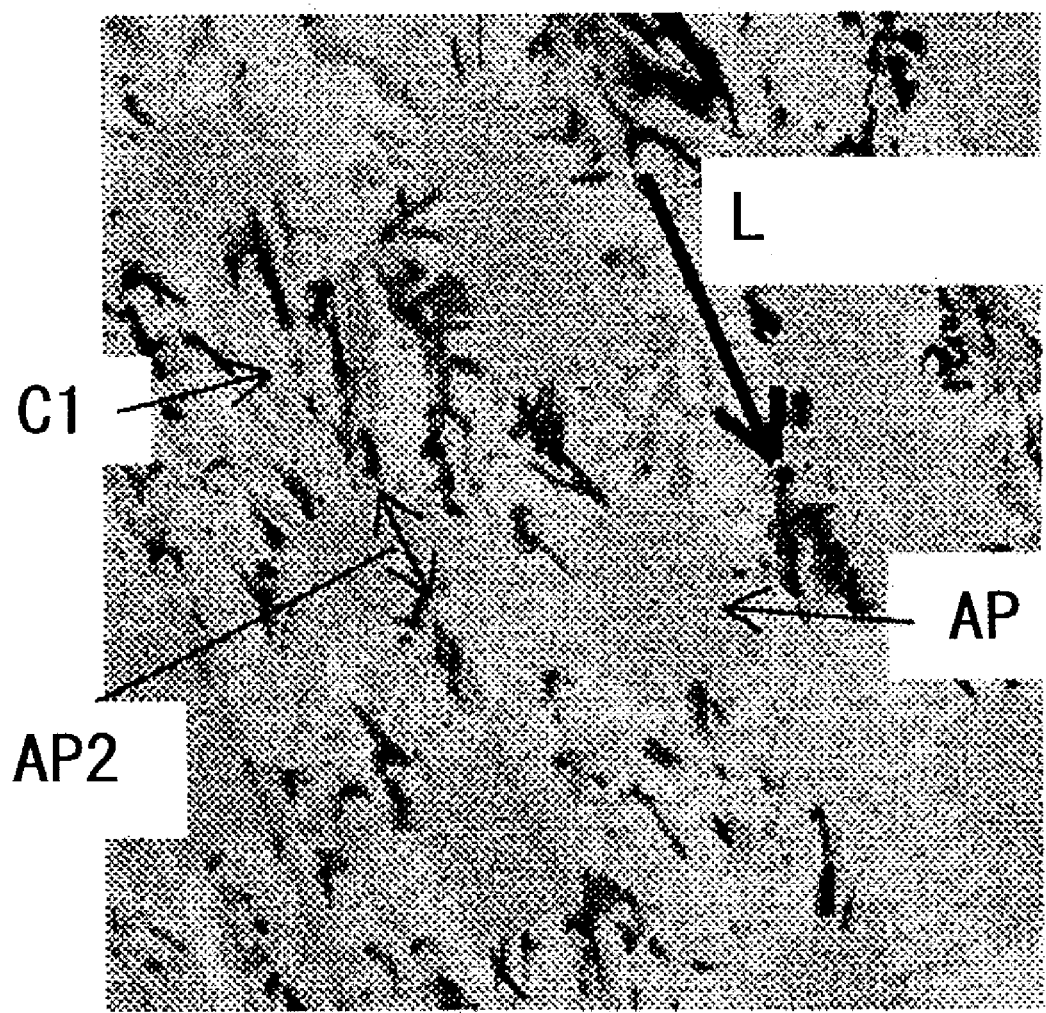
FIG. 5 is a transmission electronographic image showing an example of a recording layer after an initial recording.

FIG. 5 shows a transmission electron microscope image of the recording layer after the first recording.

As shown in FIG. 5, it was observed that a mark AP 2 (gray portion without black and white contrast in the figure) which had around 0.4 μm of the shortest mark and around 1.8 μm of the longest mark in the laser beam scanning direction (expressed by an arrow L), were recorded randomly. The gray area was analyzed by an electron beam diffraction and it was found to be a halo pattern which indicated that this area was in amorphous material phase AP (amorphous phase). On the other hand, when the area having a clear contrast of black and white was analyzed by the electron beam diffraction, spots indicating crystalline phase C1 were observed.

Furthermore, when the recording layer was observed by its transmission electron microscope image after 10 time direct overwriting (DOW), an image similar to the initial recording was observed. Therefore, it was confirmed that a repetitive recording could be carried out by the phase change between an amorphous phase and a crystalline phase.

In a similar manner as described above, an optical recording medium that had a different composition ratio of the recording layer was manufactured. An amorphous phase and a crystalline phase were observed from the transmission electron microscope images after initial recording and 10 time DOW at a recording linear velocity of 10 m/s. It was confirmed that repetitive recording was carried out by phase change between the amorphous phase and the crystalline phase.

Composition ratios and results in a case of GaSb are shown in TABLE 1. "◯" in the table expresses that crystalline phase and amorphous phase were observed. "x(1)" expresses that an amorphous phase was not observed under any recording conditions. This is because crystallization speed of the recording material was too fast, and a sufficient rapid cooling condition could not be obtained within recording conditions available in a current optical recording apparatus, and as a result, an entire portion of the recording layer was crystallized. "x(2)" expresses that amorphous phase was observed, but was still formed on a space part of the recording layer, which should have been crystallized entirely, and that the recording linear velocity herein did not enable erasing.

TABLE 1

| Ga (atm %) | Sb (atm %) | Initial recording | After 10 times DOW |
|---|---|---|---|
| 3 | 97 | X(1) | X(1) |
| 5 | 95 | ◯ | ◯ |

TABLE 1-continued

| Ga (atm %) | Sb (atm %) | Initial recording | After 10 times DOW |
|---|---|---|---|
| 7 | 93 | ◯ | ◯ |
| 12 | 88 | ◯ | ◯ |
| 18 | 82 | ◯ | ◯ |
| 20 | 80 | ◯ | ◯ |
| 22 | 78 | ◯ | X(2) |

Figure 6:
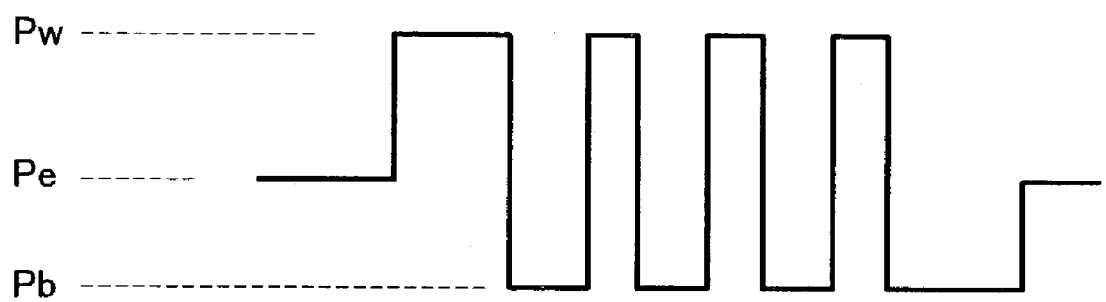
FIG. 6 is a view showing a recording strategy which is generally used for a rewritable optical recording medium.

On a rewritable optical recording medium, recording and erasing are generally carried out by a recording strategy as shown in FIG. 6. Usually, the recording strategy includes recording power (Pw)(mW), erasing power (Pe), and bias power (Pb: here, "Pb" is 1 mW or less), in descending order from higher power. By irradiating pulses to drastically reduce the power from "Pw" to "Pb," the recording layer is rapidly cooled, and an amorphous phase is thus formed. On the other hand, by irradiating the constant power (Pe), the recording layer is gradually cooled and a space (crystalline phase) is formed. Amorphous phase was formed in the space part, which should have become a crystalline phase, because the recording linear velocity was too fast with respect to the crystallization speed of the recording material.

According to those results, the preferable composition ratio of the recording layer was found out to be shown in the following Formula (1);

$$Ga\alpha Sb\beta \qquad \text{Formula (1)}$$

wherein "α" and "β" were each expressed in "atm %," and each satisfied the relations of "$5 \leq \alpha \leq 20$," and "$80 \leq \beta \leq 95$."

As for GaSb, the detailed explanation in Japanese Patent Application Laid-Open (JP-A) No. 61-168145 states that "If the composition ratio of Ga becomes 20% or less, a prominence may occur probably due to air bubble, causing instability of variation level of reflectance coefficient. Therefore, there may be a problem in practical use." According to this description, it has been confirmed that the optical recording medium of the present invention and that of the JP-A No. 61-168145 are substantially different from each other.

This fact indicates that, when phase change between amorphous and crystalline phases is utilized, as in the present invention, the composition ratio capable of obtaining excellent recording properties is apparently different from that in the JP-A No. 61-168145 where the phase change between crystal and crystalline phases is used.

Example A-2

Optical recording media were manufactured in the same manner as in EXAMPLE A-1, except that the alloy target for recording was replaced with GaSb alloy having an identical composition to that of the recording layer shown in TABLE 2. Thereafter, those optical recording media were subjected to initial crystallization as in EXAMPLE A-1.

Figure 7:
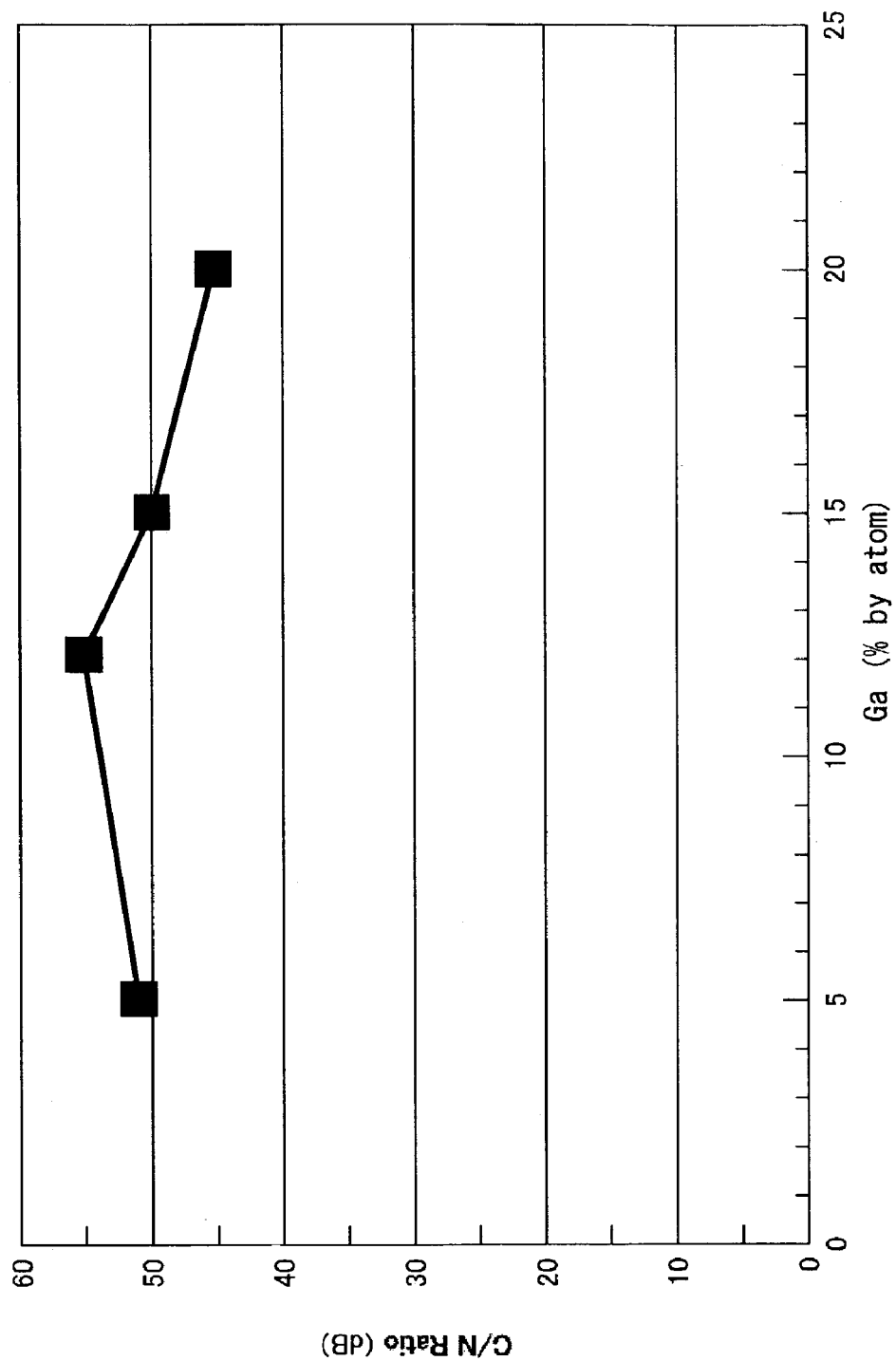
FIG. 7 is a graph showing a result of measuring C/N ratio, using GaSb of EXAMPLE A-2.

With respect to these optical recording media, C/N ratios [ratio between noise (N) level and signal intensity (C: carrier) was measured by spectrum analyzer] after 10 time DOW (direct overwriting) of 3T under the same recording conditions as those of EXAMPLE A-1, are shown in TABLE 2, and FIG. 7. In order to implement a rewritable optical disc system, the C/N ratio is required to be at least 45 dB. If it is 50 dB or more, further stable system can be obtained.

TABLE 2

| Ga (atm %) | Sb (atm %) | C/N ratio(dB) after 10 times DOW of 3T |
|---|---|---|
| 3 | 97 | — |
| 5 | 95 | 51 |
| 12 | 88 | 55 |
| 15 | 85 | 50 |
| 20 | 80 | 45 |
| 25 | 75 | — |

Furthermore, optical recording media were manufactured in the same manner as in EXAMPLE A-1, except that the alloy target for recording was replaced with GaSb alloy having a composition ratio of the recording layer shown in TABLE 3. Thereafter, the optical recording media were subjected to initial crystallization as in EXAMPLE A-1.

With respect to these optical recording media, C/N ratios [ratio between noise (N) level and signal intensity (C: carrier) which was measured by spectrum analyzer] after 10 time DOW (direct overwriting) of 3T under the same recording conditions as those of EXAMPLE A-1, except that the recording linear velocity were set to 10 m/s, 14 m/s, 28 m/s, and 35 m/s, are shown in TABLE 3.

TABLE 3

| Ga (atm %) | Sb (atm %) | C/N ratio(dB) after 10 time DOW of 3T | | | |
|---|---|---|---|---|---|
| | | 10 m/s | 14 m/s | 28 m/s | 1351 m/s |
| 3 | 97 | X | X | X | X |
| 4 | 96 | X | Δ | Δ | ◯ |
| 5 | 95 | ◯ | ⊙ | ⊙ | ⊙ |
| 12 | 88 | ⊙ | ⊙ | ⊙ | ⊙ |
| 15 | 85 | ⊙ | ⊙ | ⊙ | ◯ |
| 20 | 80 | ⊙ | ◯ | Δ | Δ |
| 25 | 75 | Δ | X | X | X |

⊙: 50 dB or more
◯: 45 dB or more
Δ: 40 dB or more
X: less than 40 dB

According to those results, the preferable composition ratio of the according layer was found out to be expressed in the following Formula (1);

$$Ga\alpha Sb\beta \qquad \text{Formula (1)}$$

wherein "α" and "β" were each expressed in atm % and each satisfied the relations of "$5 \leq \alpha \leq 20$," and "$80 \leq \beta \leq 95$."

When "α" and "β" each satisfied the above relations, it was possible to carry out recording even at a recording linear velocity of 10 m/s to 35 m/s. However, in the case of Ga3Sb97, an amorphous phase was not formed, and further, in the case of Ga25Sb75, repetitive recording could not be carried out. In order to certainly obtain a stable system having C/N ratio of 45 dB or more, the composition ratio of GaSb preferably satisfies relations of: "$5 \leq \alpha \leq 15$," and "$85 \leq \beta \leq 95$."

Example A-3

Optical recording media were manufactured in the same manner as in EXAMPLE A-1, except that the alloy target for recording was replaced with an alloy which was obtained by adding 5 atm % of each of Ag, In, Sn, Ge, to Ga12Sb88. Thereafter, the optical recording media were subjected to initial crystallization as in EXAMPLE A-1.

As for thus obtained four of the optical recording media, recording test was conducted in a similar manner as that of EXAMPLE A-1. The alloy to which Ag or In was added, was capable of reducing recording power required to obtain the same degree of modulation as that in the case of recording using Ga12Sb88 alone, with Pw of 30 mW at the recording linear velocity of 28 m/s. When Ag was added, the recording power was reduced by 10%, and when In was added, it was reduced by 13% or less.

With a criteria for 45 dB or more for the C/N ratio, however, an alloy having the composition ratio of Ga12Sb88 alone enabled recording at a linear velocity of 36 m/s to 38 m/s. On the other hand, the alloy having Ag additionally produced a result that a range of a linear velocity was reduced by 10%. The alloy having In additionally produced a result that a range of a linear velocity was reduced by 5% or less.

As for the alloy to which Sn was added, under the condition of recording linear velocity of 28 m/s, the recording power to obtain the same degree of modulation was approximately equal to that of using Ga12Sb88 alone, but a range of the recording linear velocity became higher by around 7%.

As for the alloy to which Ge was added, the recording linear velocity range was reduced by around 10%, and around 5% more recording power was required. However, when a archival stability test was conducted at high temperature of 80° C. and high humidity of 85% RH, it was found out that increase of jitter value after a lapse of 500 hours was around 1.5%, and that, in the case of Ga12Sb88 alone, contrary to the case of Ge addition, it could be reduced by within 0.5%.

Similarly, optical recording media were manufactured with Ga12Sb88, the additive elements to which were replaced by 5 atm % of Au, Cu, B, Al or Mn, it was possible to reduce recording power, as shown in the cases of Ag or In. Further, when optical recording media were manufactured with Ga12Sb88, the additive elements to which were replaced with 5 atm % of Zn, Si, Bi and Pb, a recording linear velocity became higher as shown in the case of Sn. Further, when an optical recording medium was manufactured with Ga12Sb88, the additive element to which was replaced by 2 atm % of N, a stability of amorphous mark was improved, as shown in the case of Ge.

In an actual composition ratio, sufficient recording properties can be obtained with GaSb alone. However, it is possible to control the recording layer material properties by adding the above elements either alone or in combination of two or more, according to the intended use.

Furthermore, using an alloy, which was provided by adding In to Ga12Sb88, a suitable additive amount of In was evaluated. When the content of In was more than 10 atm %, the recording linear velocity became 10 m/s or less. When a archival stability test was conducted under a condition of high temperature of 80° C. and 85% RH of high humidity, a defect was found that reflectance change was significantly deteriorated, and then it was found that a high speed recording, a purpose of the present invention, became not possible. The same tendency was found when Ag, Au, Cu, B, Al, or Mn was added to the alloy.

Furthermore, as for the alloy to which Sn was added, when the additive amount was more than 10%, the same degree of modulation could not be obtained although the recording power was increased by 30%, comparing to the case that the additive amount was 5%. In such a case, even if a maximum recording power which could be provided by a currently available recording system, is used, there may be a possibility that sufficient signal cannot be obtained. Similar tendency was found in the case of using the alloy to which Zn, Bi, or Pb was added. As for the alloy added with Ge, when the additive amount was more than 10%, the recording linear velocity became 10 m/s or less, as shown in the case of an alloy to which In was added. Further, larger recording power was required by 30% or more, compared to the case of using Ga12Sb88 alone. It should be noted that as for N, it was taken into the alloy by gas phase reaction when the recording layer was subjected to sputtering, but admixture amount 5 atm % or more of N was found to be difficult.

Example A-4

Figure 8:
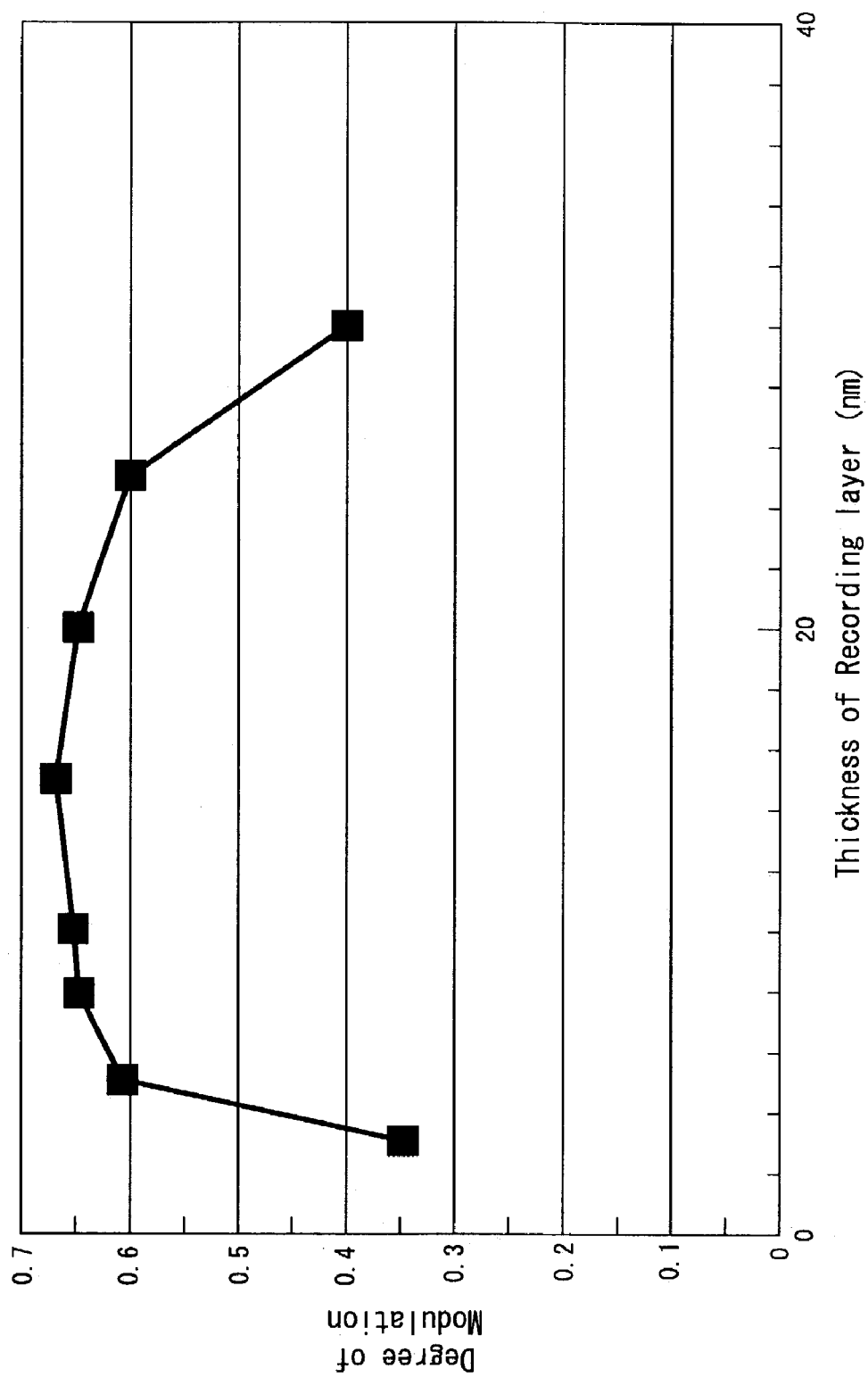
FIG. 8 is a graph showing a result of evaluation of a degree of modulation, when a thickness of the recording layer was changed in EXAMPLE A-4

Optical recording media were manufactured in the same manner as in EXAMPLE A-1, except that thicknesses of the recording layer were changed to 3 nm, 5 nm, 8 nm, 10 nm, 15 nm, 20 nm, 25 nm and 30 nm, respectively. After initial crystallization as in EXAMPLE A-1 was carried out thereon, C/N ratios and a degree of modulation were evaluated in the same manner as in EXAMPLE A-1. The results are shown in TABLE 4 and FIG. 8. When the thickness of the recording layer was 5 nm to 25 nm, a degree of modulation was 0.6 or more, which satisfies a DVD standard, was obtained. A preferable thickness of the recording layer was 8 nm to 20 nm. Within this range, the degree of modulation was 0.65 or more, and further stable system can be obtained.

TABLE 4

Dependence of recording layer thickness

| Recording layer thickness (nm) | C/N ratio (dB) | Degree of modulation |
| --- | --- | --- |
| 3 | 43 | 0.35 (35%) |
| 5 | 53 | 0.605 (60.5%) |
| 8 | 54 | 0.65 (65%) |
| 10 | 56 | 0.655 (65.5%) |
| 15 | 55 | 0.67 (67%) |
| 20 | 50 | 0.65 (65%) |
| 25 | 45 | 0.6 (60%) |
| 30 | 30 | 0.4 (40%) |

Example A-5

The optical recording medium manufactured in EXAMPLE A-1, was rotated at a constant linear velocity of 9 m/s, and a laser beam having power density of 18 mW/$\mu m^2$ was irradiated radially, while moving the laser beam at 36 $\mu$m/r, so as to carry out initial crystallization.

Bonded portions of the optical recording medium were physically separated off, and then a surrounding protective layer and a reflection layer were separated off with adhesive tape. Subsequently, a surface of the substrate on which the recording layer remained was soaked into an organic solvent, the recording layer was exfoliated from the substrate, and then it was subjected to filtering to obtain powder. Thus obtained powder was filled in a capillary, and powder X-ray diffraction measurement was conducted at wavelength of 0.419 Å (0.0419 nm), by using emitted light of the incident beam having a parallelism and extremely high luminance.

Figure 9:
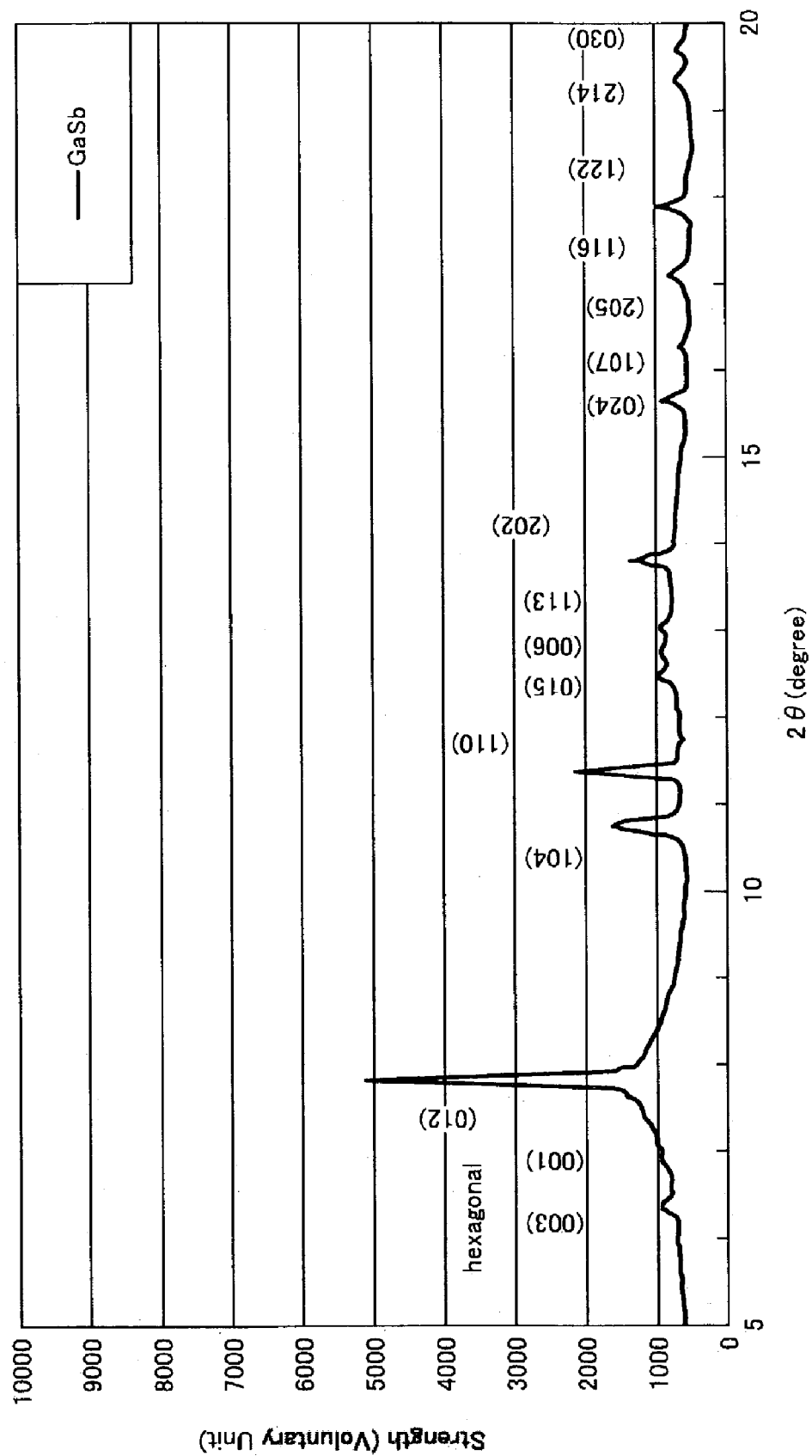
FIG. 9 is a graph showing an example of the X ray diffraction of EXAMPLE A-5.

The powder X-ray diffraction spectrum is shown in FIG. 9. Main peaks of the diffraction spectrum were 2θ=6.36°, 6.875°, 7.804°, 10.737°, 11.334°. When surface distance of lattice planes corresponding to each of these peaks was calculated by the following Bragg's equation, the values were d=3.78, 3.49, 3.08, 2.24, 2.12, respectively. These peaks could be exponentially expressed by rhombohedral structure, which is similar to Sb structure. Thereafter, it was found out that the recording layer had a single layer structure;

Bragg's equation: $2d \sin \theta = n\lambda$, wherein "d" expresses Distance of lattice planes, "n" expresses Order of reflection, and "λ" expresses X-ray wavelength)

Figure 10:
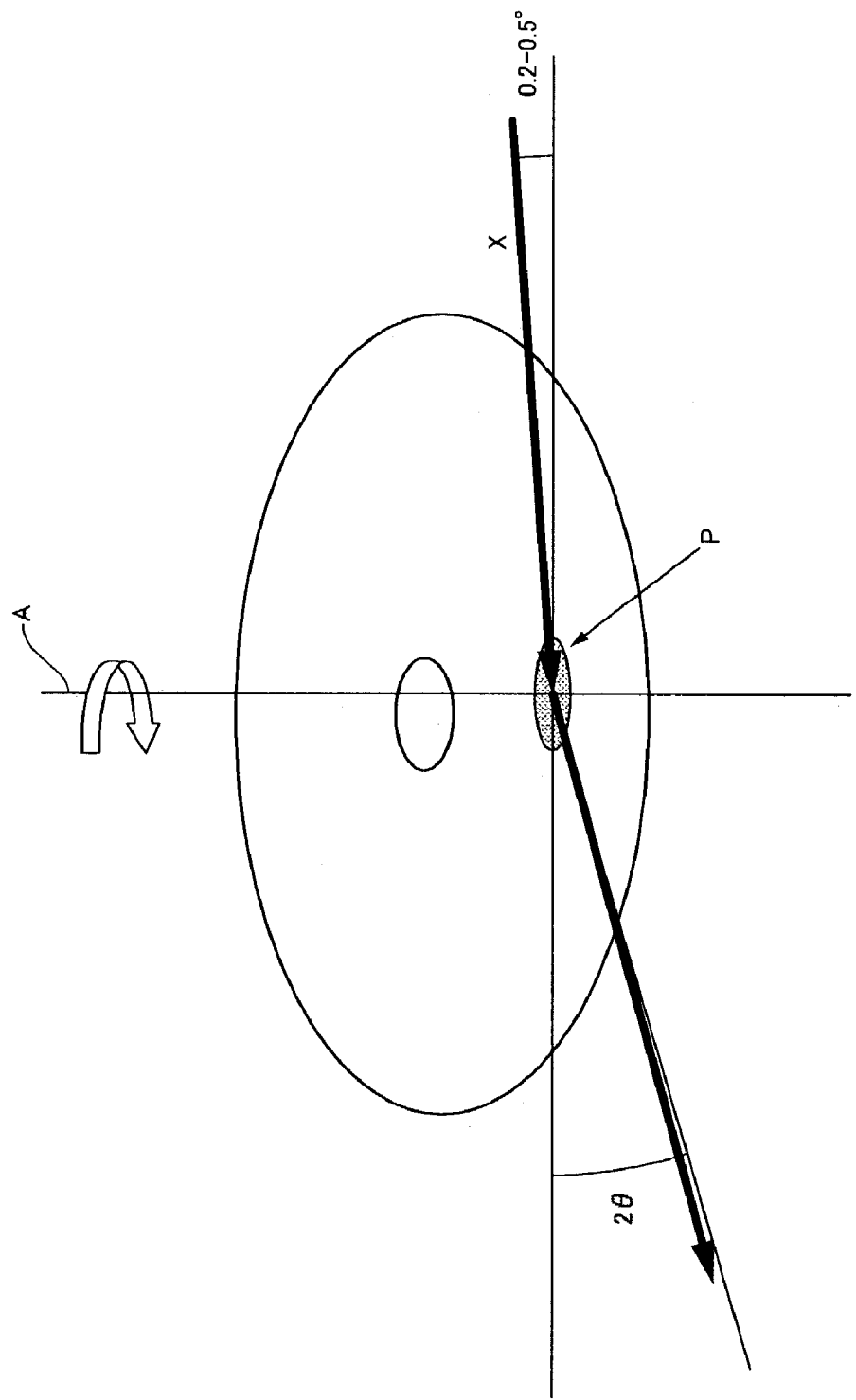
FIG. 10 is a graph to explain In-plane X-ray diffraction.

In a state that the bonded portions of the optical recording medium same as above were physically separated off and the recording layer became the uppermost surface of the optical recording medium, the optical recording medium was subjected to In-plane X-ray diffraction (a method for measuring a lattice plane being vertical to a substrate surface of the sample here). Details of this measurement method are described in *The Rigaku-Denki Journal* 31(1), 2000. Here, a schematic graph is shown in FIG. 10.

Figure 11:
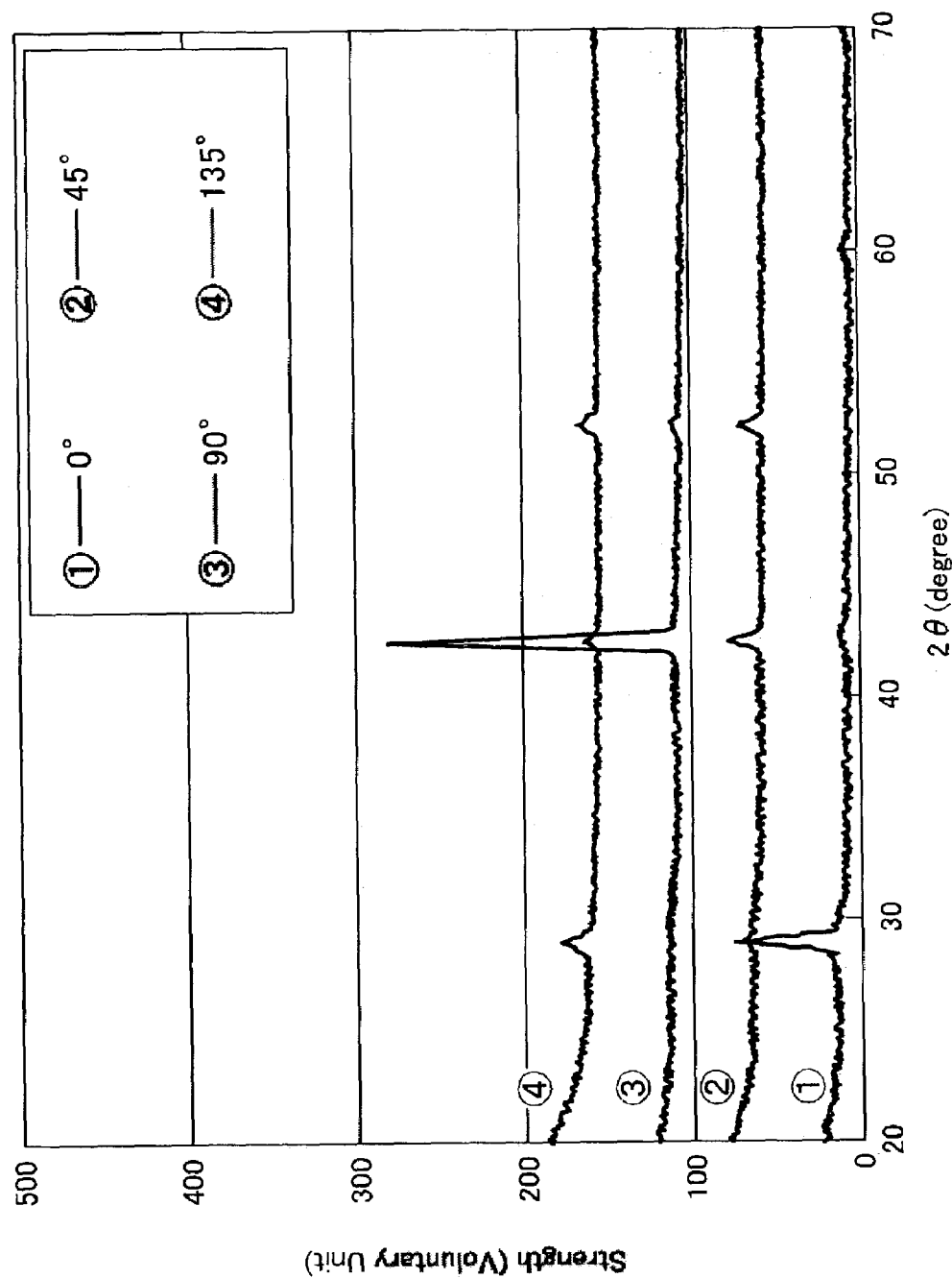
FIG. 11 is a diagram showing spectrum measured by In-plane X-ray diffraction as to an optical recording medium of EXAMPLE A-5.

X'pert MRD manufactured by Philips Co., Ltd., was used as the apparatus, and for the incident light source of X-ray, Kα ray of copper (wavelength λ=1.54 Å (0.154 nm)) was used. X-ray was entered almost parallel to the substrate surface (angle of incident light: from 0.2° to 0.5°), and the sample (optical recording medium) was rotated by 45°, having an axis "A" in FIG. 10 of the rotation in a portion P exposed to the X-ray, so as to measure X-ray diffraction spectrum. According to this measurement method of X-ray diffraction spectrum, since the X-ray is entered almost parallel to the substrate surface, it is possible to suppress a penetration depth of the X-ray within a few nanometers. Therefore, the crystal structure of the recording layer having a thin thickness can be accurately examined. Further, the sample was set so that X-ray was irradiated to a 40 mm vicinity of the radius of the sample (optical recording medium), and then the X-ray was irradiated parallel to a direction of tracking of the optical recording medium. The angle of incidence of the X-ray was set to 0°, and the sample was rotated by 45°, having an axis "A" in FIG. 10 of the rotation in a portion P exposed to the X-ray, so as to measure X-ray diffraction spectrum. The results are shown in FIG. 11.

There is a relationship that pertinent peaks are intensified, when a polycrystalline film is oriented in a certain direction. The aforementioned powder X-ray diffraction was measured in a state that the orientation of crystal was removed by separating the sample off from the substrate and rendered into powder. By comparing the result of the powder X-ray diffraction and the result of in-plane diffraction (In-plane X-ray diffraction), the orientation of crystal can be more remarkably revealed.

Figure 12:
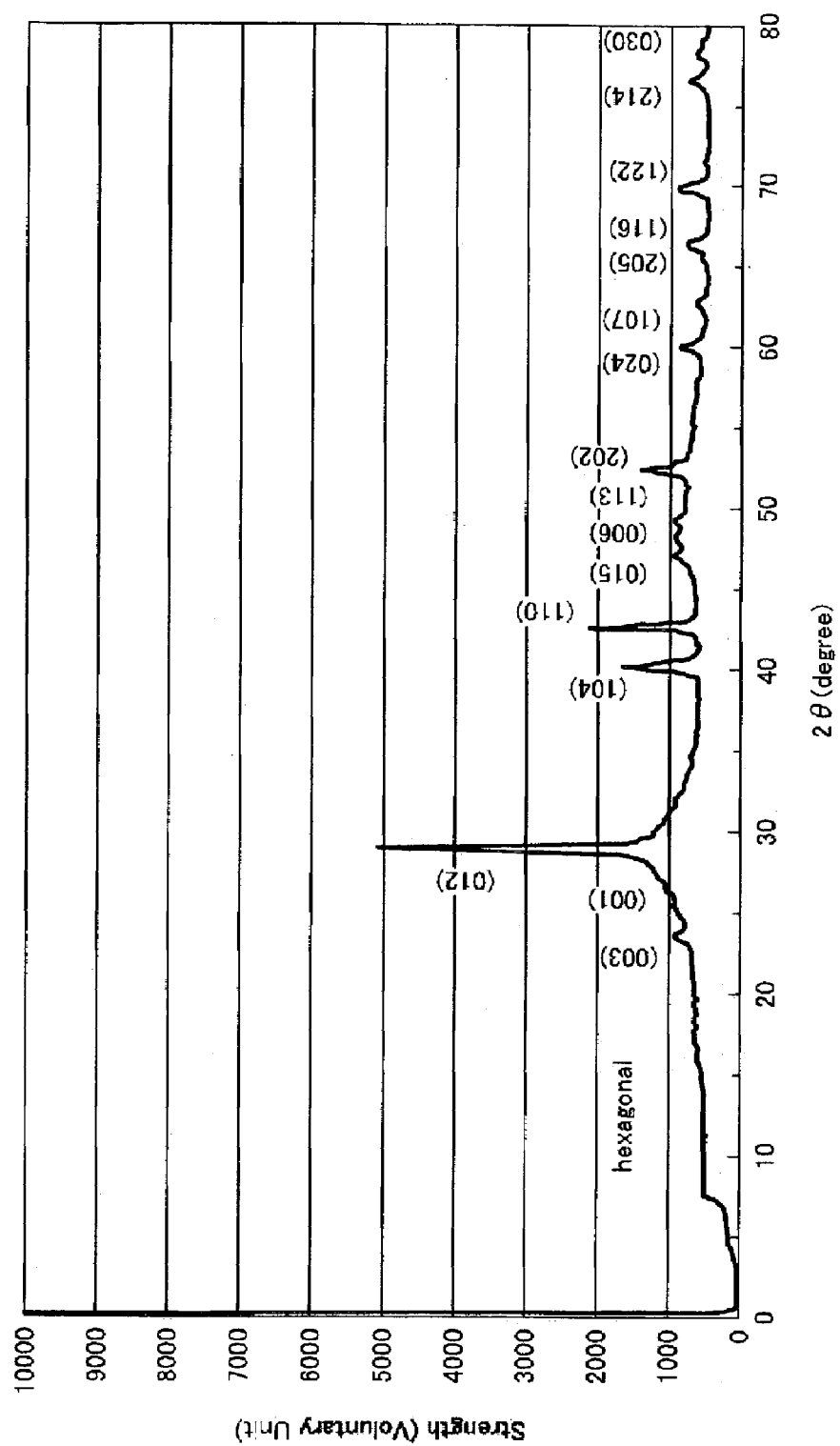
FIG. 12 is a graph showing an example of an effect obtained by converting the powder X-ray diffraction measurement result into wavelength λ=1.54 Å (0.154 nm), as to the optical recording medium of EXAMPLE A-5.

FIG. 12 shows a result obtained by converting the powder X-ray diffraction result at wavelength of λ=1.54 Å (0.154 nm) is shown. Comparing this result with that of in-plane diffraction, the peak in the vicinity of 2θ=29° of the powder X-ray diffraction was most intensified, whereas the peak of 29° of the in-plane diffraction became weak, and further the appeared number of peaks were reduced. This is because of the orientation of crystal, and because a lattice plane not satisfying the Bragg's diffraction condition may appear. When X-ray was entered at an angle of 90° with respect to the track direction, the crystal was strongly oriented to a lattice plane having lattice distance "d" of 2.12 Å (0.212 nm), wherein 2θ=42.6°.

Next, the power density was set to 3 mW/μm², 5 mW/μm², 7 mW/μm², 15 mW/μm², 25 mW/μm², 40 mW/μm², 50 mW/μm², and 52 mW/μm², and a state after initialization at the optimum linear velocities, respectively, and reflectance are shown in TABLE 5. The evaluation criteria were set as the following:

"X(1)": there was no orientation of crystal
"○": there was a orientation of crystal
"⊙": there was a strong orientation of crystal
"X(2)": separation of layer occurred.

TABLE 5

| | Conditions of initialization | | |
|---|---|---|---|
| Linear velocity (m/s) | Power density (mW/μm²) | State after initialization | Reflectance (%) |
| 2 | 3 | X(1) | 15 |
| 3 | 5 | ○ | 20 |
| 5 | 7 | ○ | 21 |
| 6 | 15 | ⊙ | 24 |
| 10 | 25 | ⊙ | 25 |
| 14 | 40 | ⊙ | 24.5 |
| 18 | 50 | ○ | 22 |
| 19 | 52 | X(2) | — |

Figure 13:
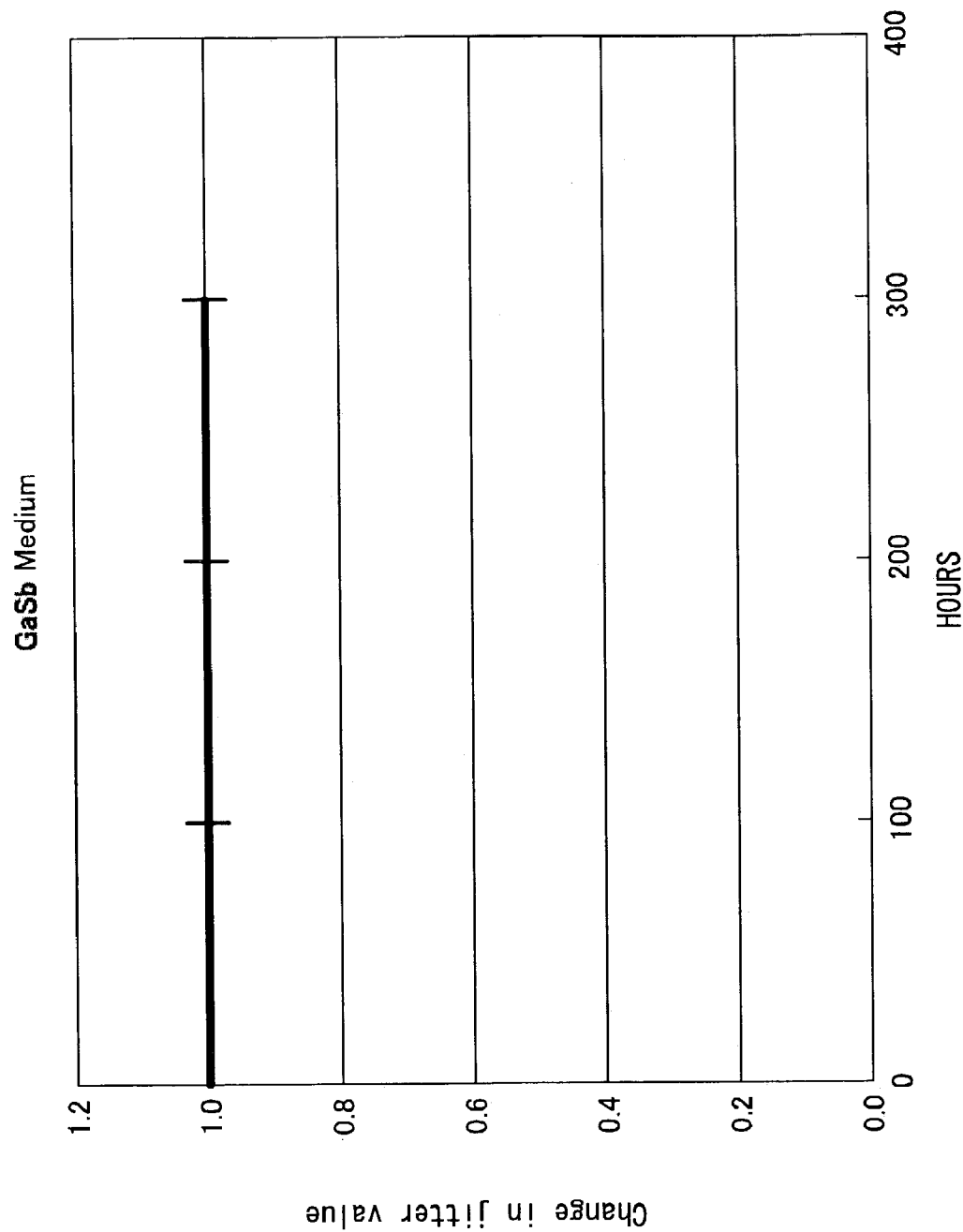
FIG. 13 is a graph showing an example of a change in jitter value after having conserved a recorded-medium under a circumstance of 80° C. and 85% RH, as to the optical recording medium of EXAMPLE A-5.

Within a range of the linear velocity of 3 m/s to 18 m/s, and power density of 5 mW/μm² to 50 mW/μm², the orientation of crystal appeared. In particular, when the linear velocity was from 6 m/s to 14 m/s, and power density was from 15 mW/μm² to 40 mW/μm², strong orientation appeared and accordingly, high reflectance was obtained. The optical recording medium having the orientation of crystal and high reflectance exhibits an excellent recording property having C/N ratio of 45 dB or more, under the recording condition of recording linear velocity of 10 m/s to 35 m/S. After the recorded optical recording medium was stored under a condition of 85° C. and 85% RH, and change in jitter value was examined. In spite of a lapse of 300 hours, the jitter value was not changed, and it was confirmed that stability of the amorphous mark was good (as shown in FIG. 13).

The jitter value refers to a dispersion of mark edge, and the smaller the value is, the less dispersion occurs, and thus indicates an excellent recording was carried out. It is known according to acceleration test that when crystallization starts from edge of the amorphous mark, the jitter value drastically becomes worse. When the result of the acceleration test is estimated in a room temperature, the lifetime is prolonged to 10 years or more, and thus a sufficient lifetime of the optical recording medium is secured. Therefore, it has been confirmed that the above initialization conditions are suitable for obtaining an optical recording medium capable of high speed recording at a recording linear velocity of 10 m/s or more, which is a purpose of the present invention.

Optical recording media were manufactured in the same manner as in EXAMPLE A-1, except that the alloy target for recording was replaced with Ag2In5Sb68Te25, Sb78Te22, Sb88Te12, In31.7Sb68.3 (each of which was used in the COMPARATIVE EXAMPLE), Ga12Sb88, Ge16.7Sb83.3, each of which was parent phase material.

Figure 14:
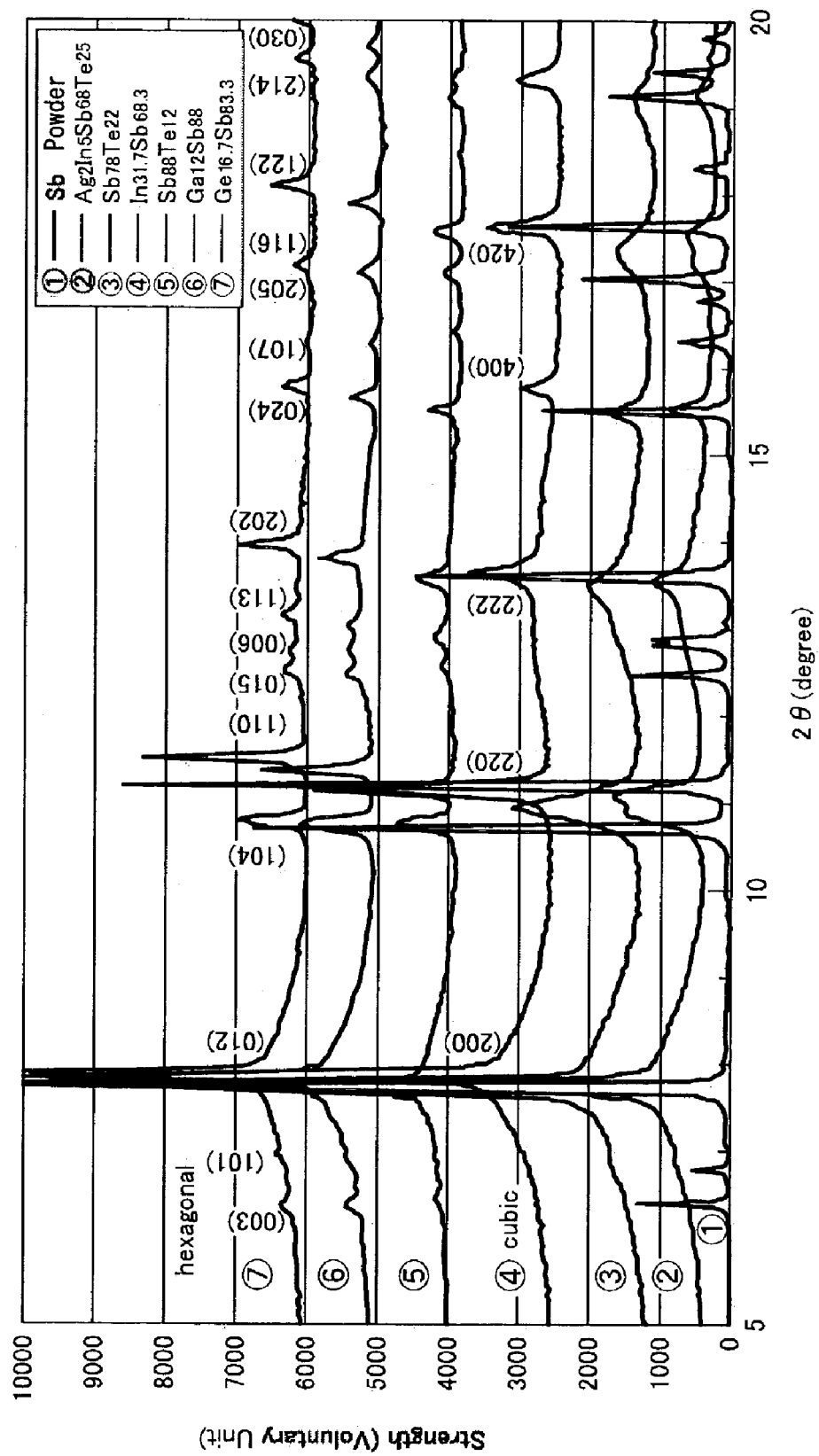
FIG. 14 is a graph showing an example of a result of powder X-ray diffraction as to further alternative optical recording medium of EXAMPLE A-5.
Figure 15:
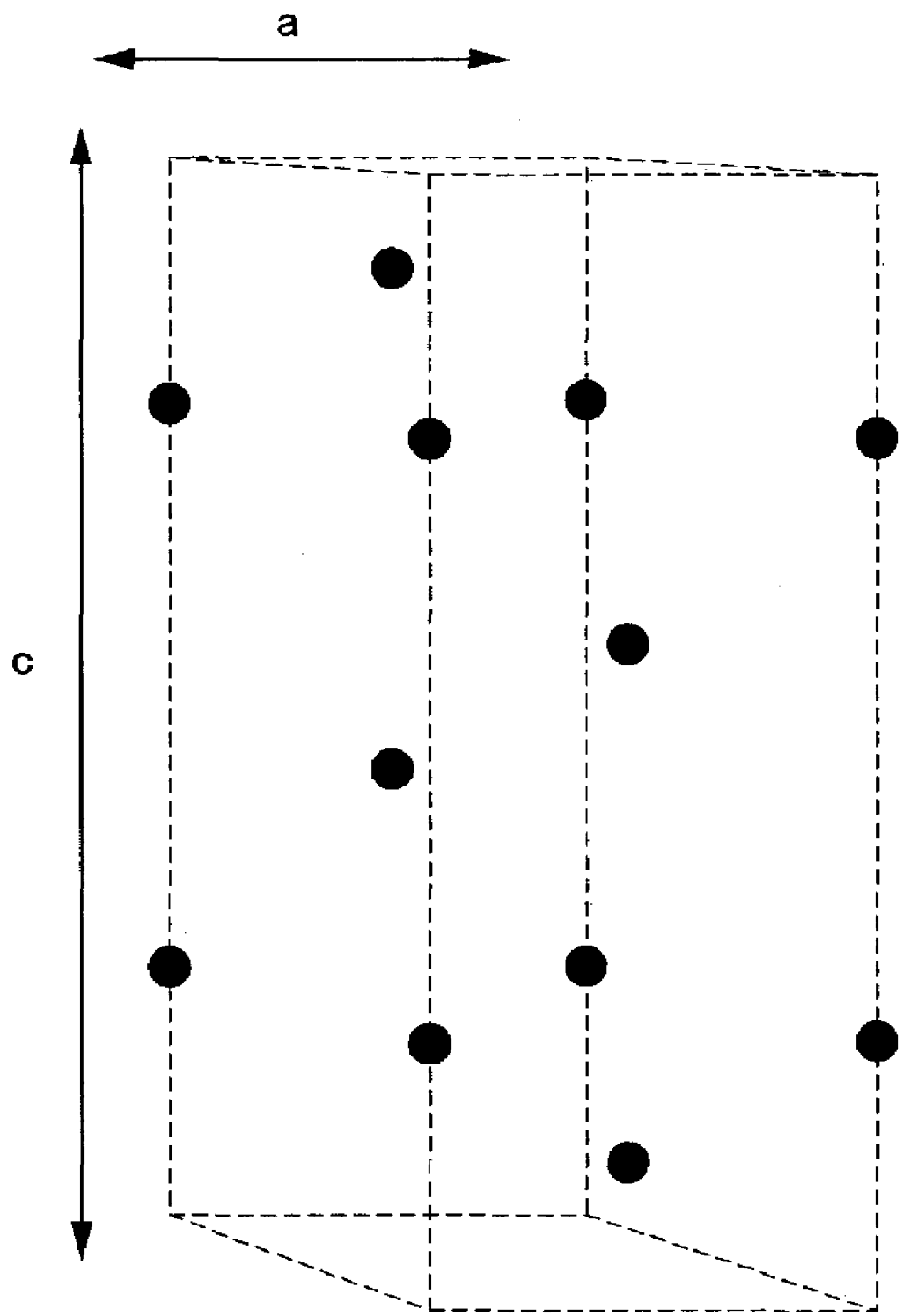
FIG. 15 is a graph showing an example of a unit lattice of hexagonal structure.

These optical recoding media were rotated at a constant linear velocity of 8 m/s, and a laser beam having power density of 20 mW/μm² was irradiated radially while moving at 36 μm/r, so as to carry out initial crystallization. As to these optical recording media, with a same process as described above, powder X-ray diffraction was carried out. For a purpose of comparison, the powder X-ray diffraction was carried out as to the powder of Sb. A summary of the results is shown in FIG. 14. Each peak of Ag2In5Sb68Te25, Sb78Te22, and In31.7Sb68.3 could be exponentially expressed by cubic structure. Sb88Te12, Ga12Sb88 and Ge16.7Sb83.3 could be exponentially expressed by hexagonal structure, which was similar to Sb structure.

In order to compare the crystal structure of the materials, all of the materials were subject to calculation to obtain lattice constant "a (Å)/(nm)" and lattice constant "c (Å)/(nm)," where the unit lattice of hexagonal structure (shown in FIG. 17) was considered to be a standard, and crystallization temperature Tc (° C.) obtained by thermal analysis are shown in TABLE 6. When c/a ratio is 2.45, it is equivalent to cubic structure. As for the crystallization temperature, a single film as a recording layer was formed on a glass, temperature of the film in amorphous phase was raised by differential scanning calorimeter, at 10° C./minute and when crystallization started, the temperature at which the crystallization started was taken to be crystallization temperature. It is possible to say that the higher the crystallization temperature is, the more stable the amorphous phase is and also the more difficult crystallization is.

TABLE 6

| Composition Ratio | a(Å)/(nm) | c(Å)/(nm) | c/a | Tc(° C.) |
|---|---|---|---|---|
| | Lattice constant | | | |
| Ag2In5Sb68Te25 | 4.339/0.4339 | 11.006/1.1006 | 2.537 | 179.5 |
| Sb78Te22 | 4.402/0.4402 | 10.766/1.0766 | 2.445 | 120.5 |
| Sb88Te12 | 4.327/0.4327 | 11.116/1.1116 | 2.576 | 79.5 |
| Sb | 4.300/0.4300 | 11.273/1.1273 | 2.622 | — |
| Ga12Sb88 | 4.240/0.4240 | 11.307/1.1307 | 2.667 | 194.5 |
| Ge16.7Sb83.3 | 4.185/0.4185 | 11.320/1.1320 | 2.705 | 255.5 |
| In31.7Sb58.3 | 4.323/0.4323 | 10.618/1.0618 | 2.456 | 114.1 |

Ag2In5Sb68Te25 was a material obtained by adding Ag and In as additive elements to the parent phase material, SbTe. It is known that by increasing the amount of Sb of the parent material SbTe, the speed for crystallizing material is accelerated. However, there is a defect that in the material containing increased amount of Sb, amorphous phase is crystallized even under a low temperature. Therefore, recording at 18 m/s, 5×DVD speed, is assumed to be upper limit. Comparing to the low crystallization temperature of-SbTe, such as 120.5° C., 79.5° C., GaSb and GeSb respectively has high temperature such as 194.5° C. and 255.5° C. Therefore, it has been found that the amorphous phase is hardly crystallized and archival stability of amorphous mark is good. These phenomena can be explained from a material structure. It can be considered that all of the materials which were subjected to powder X-ray diffraction measurement in the EXAMPLEs were material that something was added to Sb. In the case of Sb alone, crystallization speed is high, but stability of amorphous phase is not good such as causing crystallization even at a room temperature. Therefore, it cannot be used as a material of the optical recording medium of the present invention. Then, it is conceivable that in order to enhance the stability of amorphous phase, bonding power is enforced by adding elements other than Sb.

Figure 16:
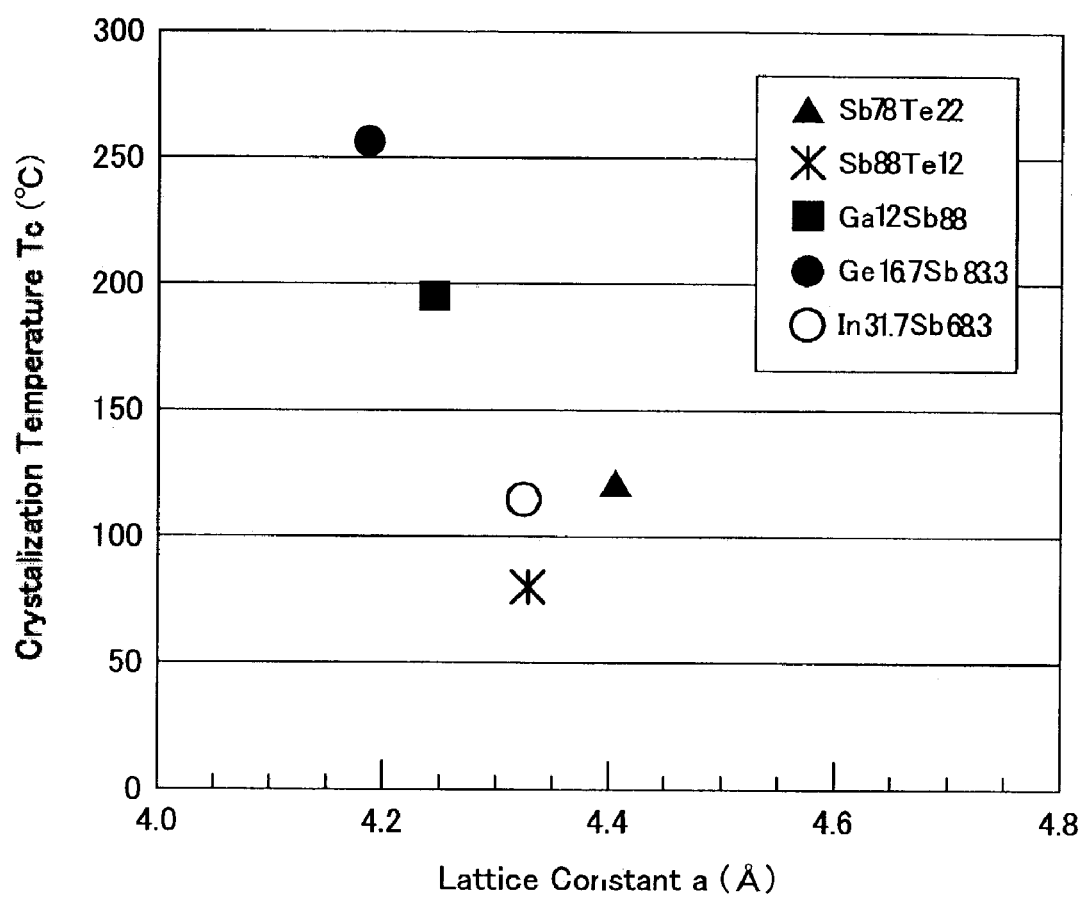
FIG. 16 is a graph showing a relationship between lattice constant and crystallization temperature.

Relations between lattice constant a, and crystallization temperature is shown in FIG. 16. A material having a small lattice constant "a," is strong in covalent bonding force. Since in order to thermally crystallize the amorphous phase, large energy is required to cut the covalent bonding and recompose a network. Therefore, it is conceivable that crystallization temperature is relatively high.

Sample Example A-1

The optical recoding medium obtained in EXAMPLE A-1 was rotated at a constant linear velocity of 2 m/s, and a laser beam having power density of 4.5 mW/μm² was irradiated radially, while moving at 36 μm/r, so as to carry out initial crystallization.

Figure 17:
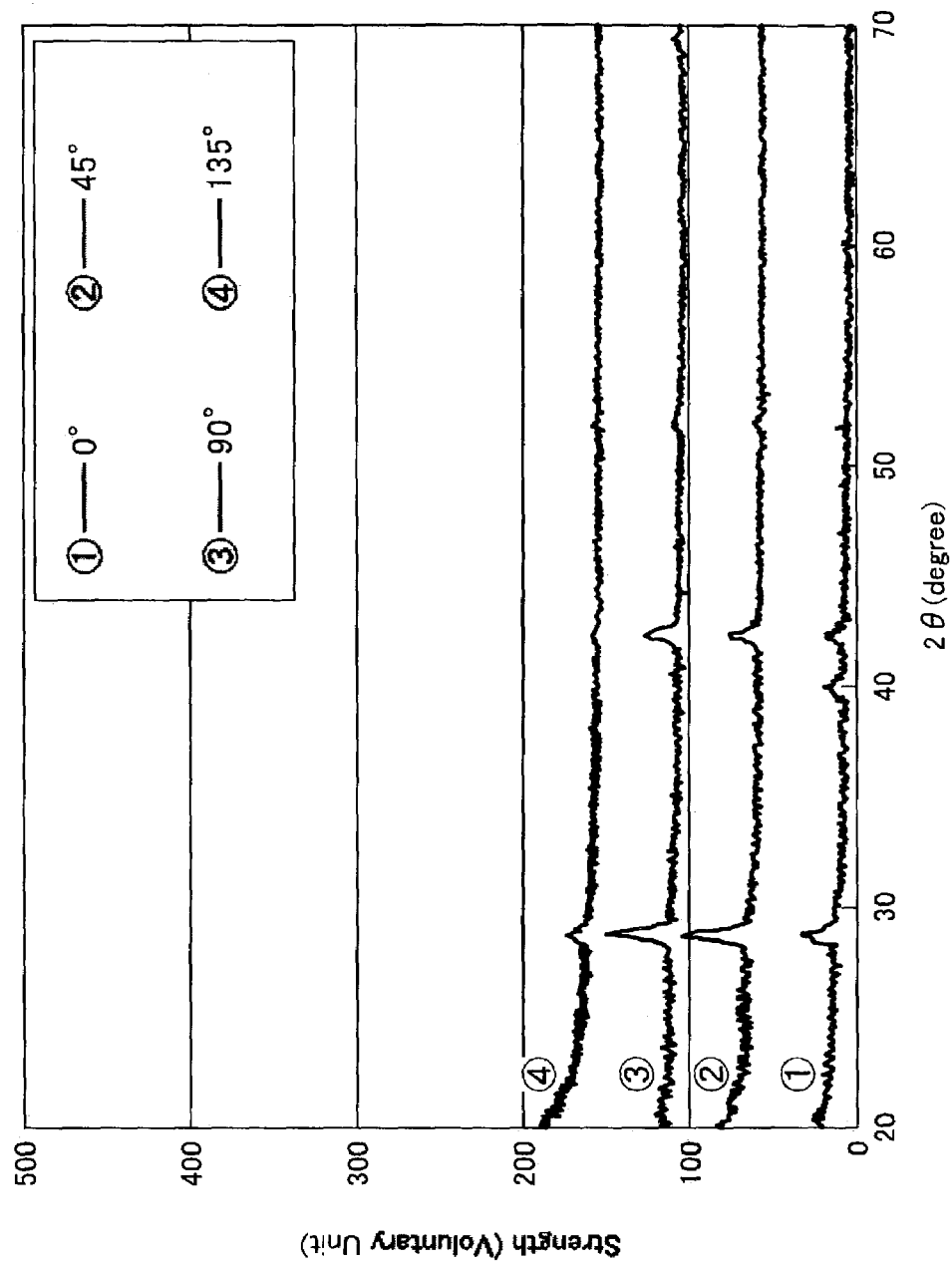
FIG. 17 is a graph showing an example of spectrums measured by In-plane X-ray diffraction as to the optical recording medium of COMPARATIVE EXAMPLE A-1.

In a state that the bonded portions of the optical recording medium were physically separated off and the recording layer became the uppermost surface, the in-plane diffraction (in-plane X-ray diffraction) was conducted as the case of EXAMPLE A-5. Namely, X-ray was entered almost parallel to the substrate surface (angle of incidence: from 0.2° to 0.5°), and the sample (optical recording medium) was rotated by 45°, so as to measure X-ray diffraction spectrum. FIG. 17 shows a result of measurement where the angle of incidence of X-ray in parallel to a direction of tracking was set to 0°, and the sample was rotated by 45° to 135°.

By use of the recording and reproducing apparatus as used in EXAMPLE A-1, the above optical recording medium on which initial crystallization had been carried out was subjected to recording under same conditions as those of EXAMPLE A-1. As a result, reflectance and degree of modulation were, compared to EXAMPLE A-1, low, 17% and 0.55 (55%), respectively. This is because this material has small orientation and is, compared to EXAMPLE A-1, poor in crystallization, resulting in low reflectance and low degree of modulation.

Example A-6

Figure 18:
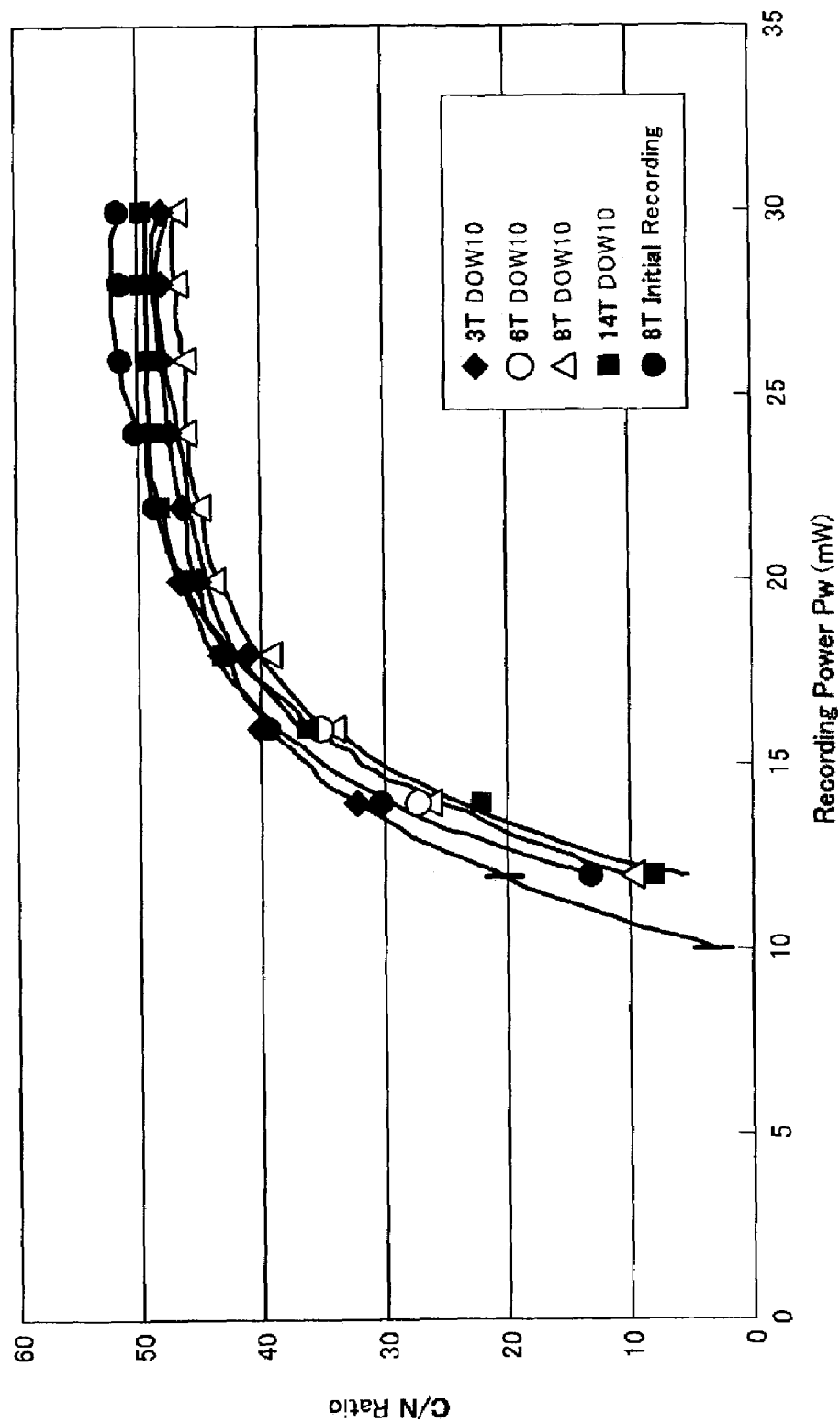
FIG. 18 is a result of recording test, which was conducted to the optical recording medium manufactured in EXAMPLE A-1.

As to the optical recording medium manufactured in the same manner as in EXAMPLE A-1, a recording test was conducted, using an optical system having LD (laser diode) having wavelength of 660 nm and NA of 0.65, where the recording linear velocity was 28 m/s, Pe/Pw was 0.2 with a laser beam having pulse train as shown in FIG. 6, and Pw varied. The results are shown in FIG. 18.

This test was conducted by 10 time DOW (direct overwriting) of single marks of 3T, 6T, 8T, and 14T, respectively, at EFM+modulation, which is a modulation system of DVD. Then, obtained C/N ratios were monitored. As to 8T mark, another result was also plotted in the case where recording was carried out only once (initial recording was carried out). A pulse used for recording was optimized in each Ts, and the pulse number, pulse width, and Pb level width were optimized for the use.

In the optical recording medium where Ga12Sb88 is used as a recoding material in a recording layer, in order to secure 30 dB or more of C/N ratio, 15 mW or more of recording power (Pw) is required, and if a recording property of 45 dB or more, for further stable recording, is to be obtained, the recording power (Pw) of around 20 mW or more is required.

In the optical system used in this EXAMPLE A-6, a beam diameter to obtain 1/e² of beam power is necessary to be around 0.9 micron. Therefore, it has been found out that the power density of the beam in the recording power (Pw) required for recording, is necessary to be at least 20 mW/μm², and more preferably 30 mW/μm² or more.

Example A-7

Figure 19:
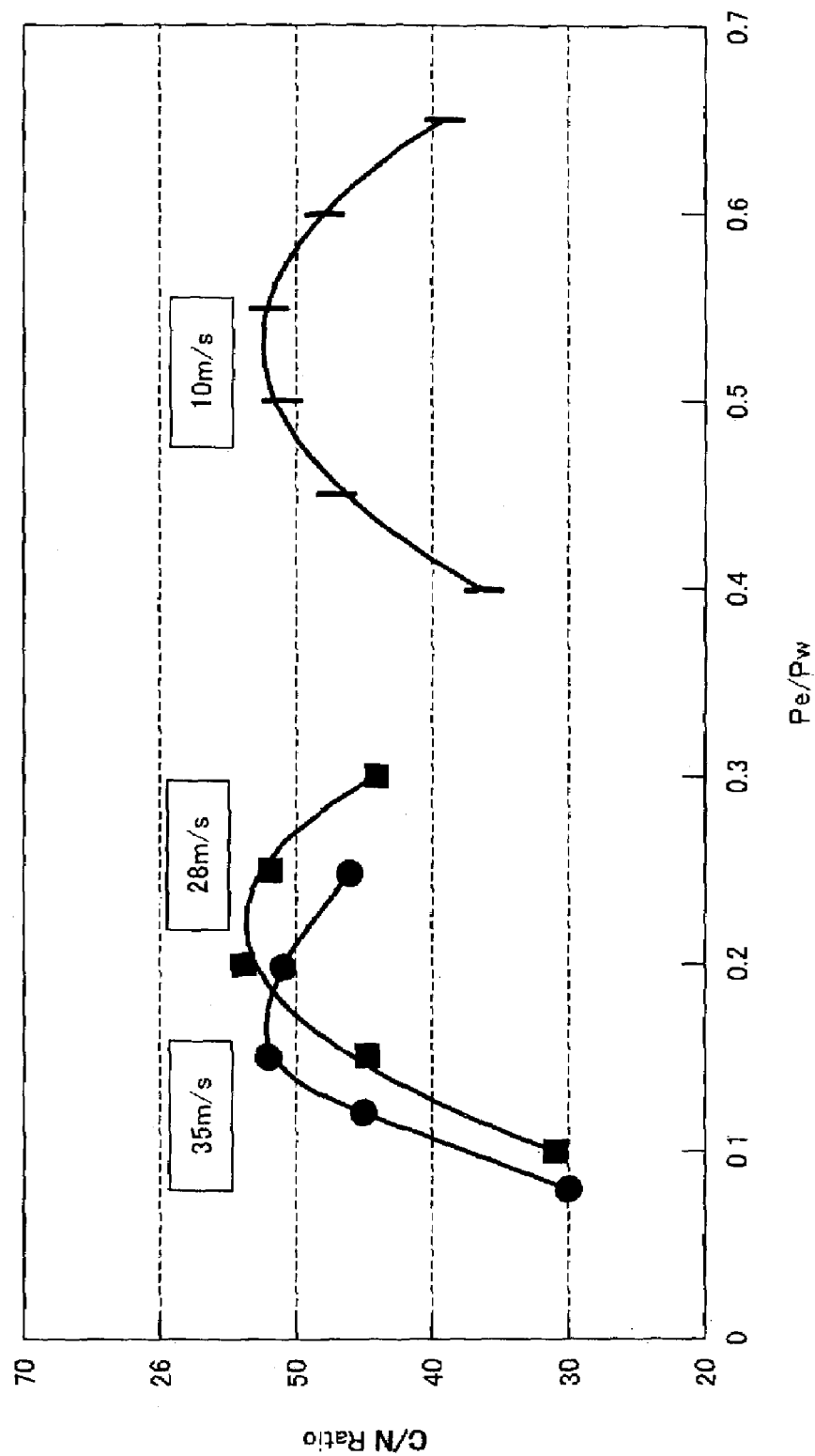
FIG. 19 is a graph showing an example of plotted C/N ratios, when recording was carried out by changing the recording linear velocity, by utilizing the optical recording medium manufactured in EXAMPLE A-1
Figure 20:
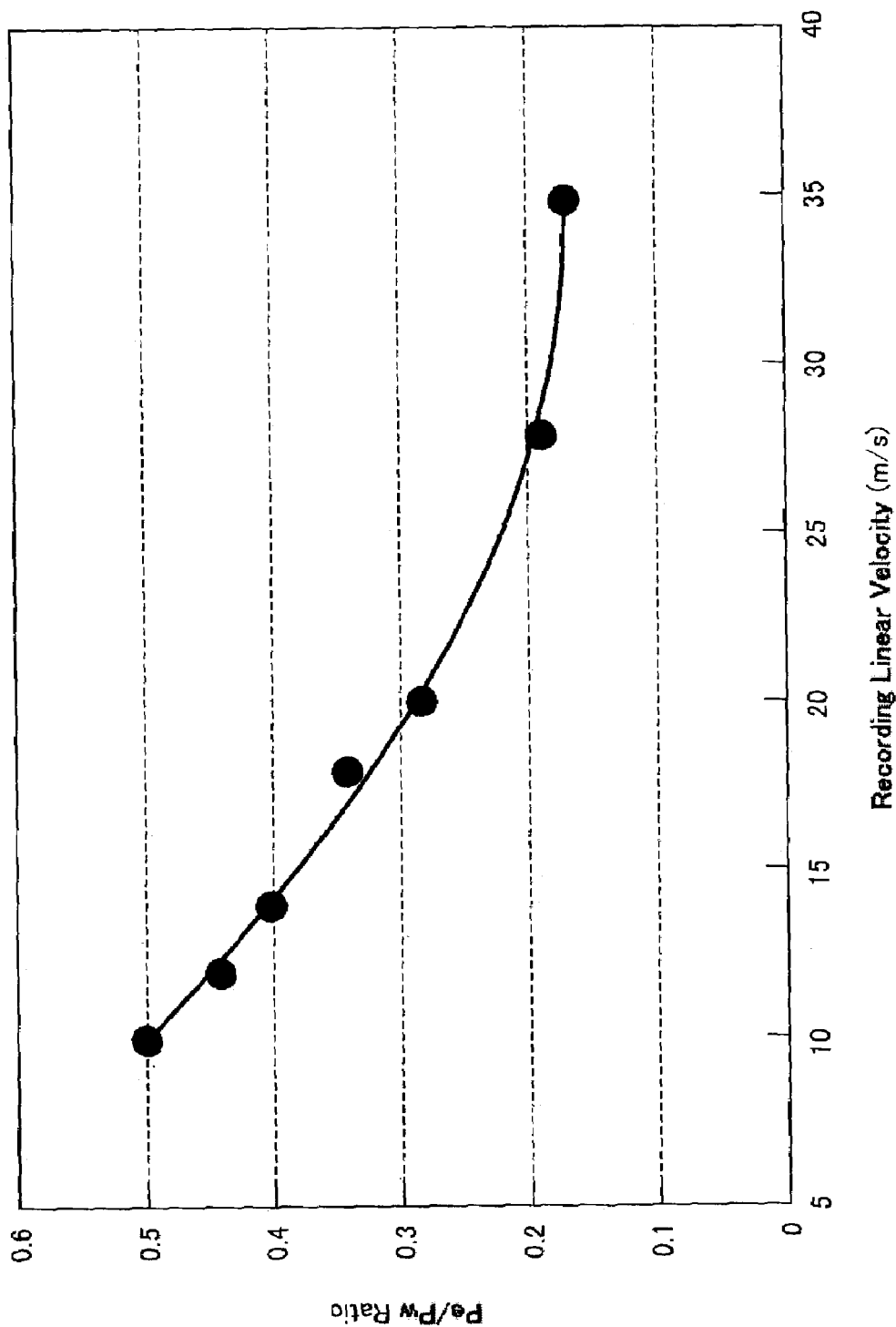
FIG. 20 is a graph showing an example of plotted power conditions when the C/N ratio became maximum, and the optical recording medium manufactured in EXAMPLE A-1 was used and Pe/Pw (erasing power/recording power) of the laser beam to be used for recording was improved under the respective recording linear velocity conditions.

By use of the optical recording medium manufactured in EXAMPLE A-1, recording was carried out utilizing the pulse beam as shown in FIG. 6, at the recording linear velocity of 10 m/s, 28 m/s, and 35 m/s. In FIG. 19, it is shown that C/N ratios of the recording were plotted. In FIG.

20, it is shown that ratios of erasing power (Pe) and peak power (Pw) were respectively optimized at each of the recording linear velocities, and a power condition where the C/N ratio became maximum was plotted with respect to the recording linear velocities.

Similar to the case of EXAMPLE A-6, the pulse number with respect to each Ts was changed at each of the recording linear velocities, and optimized number was used. EFM+ modulation system was used for recoding, and those results were obtained by randomly recording each of Ts.

At a recording linear velocity of 10 m/s, if Pe/Pw is changed, the range to obtain excellent C/N ratio satisfied the relation of $0.42 \leq Pe/Pw \leq 0.65$. In particular, if it satisfied a relation of around $0.47 \leq Pe/Pw \leq 0.60$, C/N ratio could become 50 dB. Further, at recording linear velocity of 35 m/s, the range to obtain excellent C/N ratio satisfied a relation of $0.10 \leq Pe/Pw \leq 0.25$. In particular, if it satisfied a relation of around $0.13 \leq Pe/Pw \leq 0.22$, C/N ratio could become 50 dB. Since it is possible to apply each recording linear velocity within the range of 10 m/s to 35 m/s, the range of Pe/Pw to obtain an excellent recording property, when the recording linear velocity is 10 m/s to 35 m/s, is $0.10 \leq Pe/Pw \leq 0.65$, and preferably $0.13 \leq Pe/Pw \leq 0.60$.

According to the present invention, it is possible to provide an optical recording medium, having a capacity equivalent to that of DVD-ROM, and even at the linear velocity of 10 m/s or more, recording and erasing by a reversible phase change between amorphous material phase (amorphous phase) and crystalline phase of the recording layer can be attained.

According to a preferable aspect of the present invention, it is possible to provide an optical recording medium on which recording and erasing can be carried out at a linear velocity of 10 m/s or more.

According to another preferable aspect of the present invention, it is possible to provide an optical recording medium on which repetitive recording can be carried out at a recording linear velocity of 4×DVD speed (14 m/s) or more.

According to another preferable aspect of the present invention, it is possible to provide an optical recording medium on which repetitive recording can be carried out at a recording linear velocity of 8×DVD speed (28 m/s) or more.

According to the present invention, it is possible to provide an optical recording medium having high degree of modulation by adjusting a thickness of the recording layer to 5 nm to 25 nm, and more preferably 8 nm to 20 nm.

According to the present invention, it is possible to provide a process for manufacturing an optical recording medium having a capacity equivalent to that of DVD-ROM, and high-speed recording can be carried out thereto even at the recording linear velocity of 10 m/s or more.

According to the present invention, it is possible to provide a sputtering target for manufacturing an optical recording medium having a capacity equivalent to that of DVD-ROM, on which high-speed recording can be carried out thereto even at the recording linear velocity of 10 m/s or more.

According to the present invention, it is possible to provide an optical recording process, where stable recording can be carried out.

According to another preferable aspects of the present invention, it is possible to provide an optical recording process where a high C/N ratio is enabled at the recording linear velocity of 10 m/s or more.

Example B-1

On a 0.6 mm thick a polycarbonate substrate which has a meandering groove of pitch size 0.74 μm, meandering amount of 35 nm and groove width of 0.25 μm, a 65 nm to 85 nm thick first dielectric layer (first protective layer) using $ZnS \cdot SiO_2$ mixing target ($SiO_2$ 20 mol %), a 15 nm to 20 nm thick recording layer which contains Ga0.1Sb0.9, a 12 nm thick second dielectric layer using the same materials as those of the first dielectric layer, a 2 nm to 8 nm thick third dielectric layer using SiC target, and a 80 nm to 150 nm thick reflection layer using Ag target, were disposed in this order by sputtering method. An ultraviolet setting resin layer (overcoat layer) was disposed on the reflection layer by spin coating. Thereafter, a 0.6 mm thick second polycarbonate substrate was disposed onto the reflection layer, using the ultraviolet setting resin. Subsequently, the layers were annealed (initialized) with a laser diode beam under a power condition of 130W·sec/disk. Accordingly, the recording material, which had been amorphous just after sputtering, was crystallized and an optical recording medium was thus manufactured (in the EXAMPLE B-1, the second protective layer had double layered structure which included the second dielectric layer and the third dielectric layer).

The followings are film (layer)-forming conditions by the sputtering device for each of the layers.

|  | Input power; | Ar gas pressure (air pressure in film-forming chamber) |
|---|---|---|
| First and second dielectric layers: | 3 kW | 2mTorr |
| Recording layer: | 1 kW | 2mTorr |
| Third dielectric layer: | 1 kW | 2mTorr |
| Reflection layer | 5 kW | 2mTorr |

A thickness of the first dielectric layer was prepared so as to have a similar reflectance, Rg. Onto the thus obtained optical recording medium, recording was carried at various recording linear velocity, and a degree of modulation was measured, using a recording system with a laser beam having wavelength of 650 nm to 665 nm, lens NA of 0.65, so as to have a recording density equivalent to that of DVD. It was found out that a recordable range of linear velocity was as wide as 6 m/s to 40 m/s.

It was also confirmed that recording could be carried out, when a degree of modulation (M) between the reflectance at unrecorded space part, "Rg," and the reflectance at recording mark (recorded portion), "Rb," was 4.0 or more.

Change in jitter properties in accordance with a recording linear velocity was measured. Here, the change in jitter properties was expressed by σ/Tw (%), which is a distribution of mark edge relative to a channel cycle, "Tw."

Figure 21:
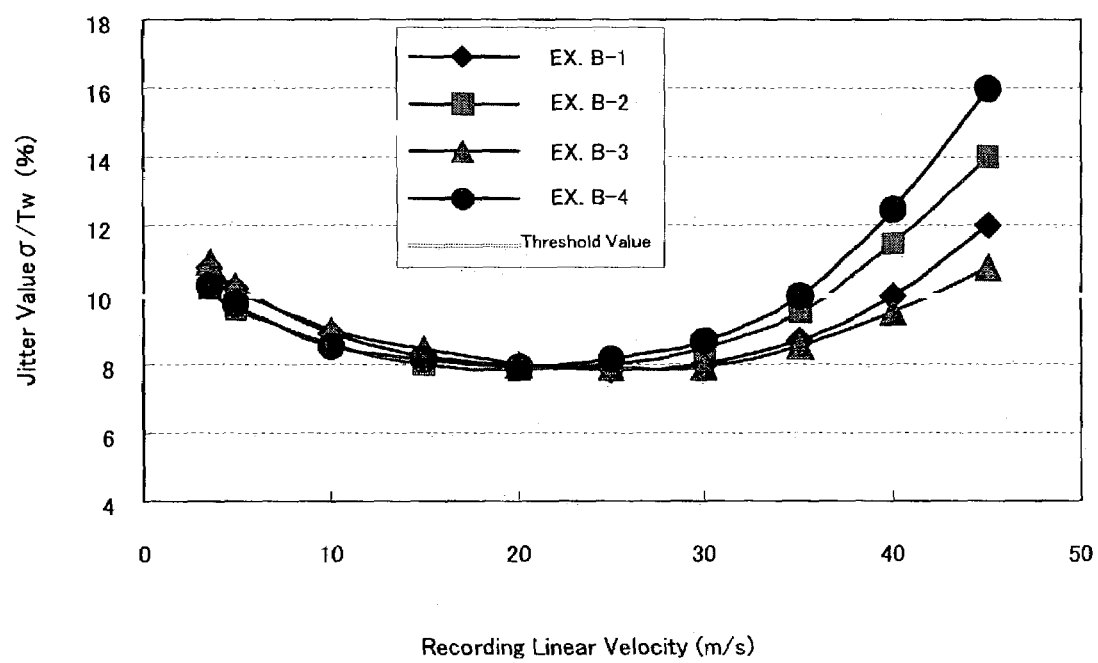
FIG. 21 is a graph showing a relationship between the recording linear velocity and the jitter properties in EXAMPLEs B-1 to B-4.

The results of the measurement are shown in FIG. 21. When the jitter value of 10% or less is defined as a sufficient recording linear velocity, as can be understood from the results of the measurement, it was found out that sufficient jitter value could be obtained at a recording linear velocity similar to the one obtained by the degree of modulation (M).

The results of measuring the jitter value after 10 time overwriting, a degree of modulation (M), a reflectance at an unrecorded space part, "Rg (%)," and a reflectance at a recorded mark, "Rb (%)," at a recording linear velocity of 15 m/s, 25 m/s, and 35 m/s, are shown in TABLE 7.

Example B-2

An optical recording medium was manufactured in the same manner as described in EXAMPLE B-1, except that the recording layer material was replaced by Ge0.03 (Ga0.1Sb0.9)Sb0.97, in which a content of Ge was 3 atm %, a content of Ga was 10 atm %, a content of Sb was 97 atm % in the recording layer.

Recording in the optical recording medium was carried out by the same system as used in EXAMPLE B-1. It was found out that the range of the recording linear velocity with which recording could be carried out, was as wide as 4 m/s to 37 m/s.

Change in jitter properties in accordance with a recording linear velocity was measured in the same way as in EXAMPLE B-1. The results of the measurement are shown in FIG. 21.

The results of measuring the jitter value after 10 time overwriting, a degree of modulation (M), a reflectance at an unrecorded space part, "Rg (%)," and a reflectance at a recorded mark, "Rb (%)," at a recording linear velocity of 15 m/s, 25 m/s, and 35 m/s, are shown in TABLE 7.

Furthermore, a archival stability test was conducted with the optical recording medium manufactured in EXAMPLE B-2, under a condition of high temperature of 80° C. and high humidity of 85%, along with the optical recording medium manufactured in EXAMPLE B-1. The result showed increase of jitter property of recording mark, as the following. As for the optical recording medium of EXAMPLE B-1, increase rate was 5% after a lapse of 300 hours, whereas as for the optical recording medium of EXAMPLE B-2, the increase rate was 1% or less. It was hence found out that addition of Ge was effective for enhancing the archival stability.

It was also found out that if the addition amount of Ge was 1% or more, it was not effective, and that the recordable range of linear velocity was narrowed as the addition amount increased.

It depends on the target range of linear-velocity, however, the addition amount of Ge is preferably 0.1 or less in atomic ratio, and more preferably 0.07 or less in atomic ratio.

Example B-3

An optical recording medium was manufactured in the same manner as described in EXAMPLE B-1, except that the recording layer material was replaced by Ge0.03In0.05 (Ga0.1Sb0.9)0.92.

Recording in the optical recording medium was carried out by the same system as used in EXAMPLE B-1. It was found out that the range of the recording linear velocity was as wide as 6 m/s to 43 m/s.

It was found that addition of In was effective for enhancing a range of the recording linear velocity. It was also found out that addition of Mn or Al instead of In was also effective to obtain the good recording linear velocity.

It depends on the target range of linear velocity, however, the addition amount of In, Mn or Al is preferably 0.15 or less in atomic ratio, and more preferably 0.1 or less in atomic ratio, since the excessively large addition amount of In, Mn or Al causes crystallization even with a low power laser beam upon repetitive reproducing.

Change in jitter properties in accordance with a recording linear velocity was measured in the same way as in EXAMPLE B-1. The results of the measurement are shown in FIG. 21. It was confirmed that the range of the recording linear velocity was wide from the viewpoint of the jitter value. The results of measuring the jitter value after 10 time overwriting, a degree of modulation (M), a reflectance at an unrecorded space part, "Rg (%)," and a reflectance at a recorded mark, "Rb (%)," at a recording linear velocity of 15 m/s, 25 m/s, and 35 m/s, are shown in TABLE 7.

Example B-4

An optical recording medium was manufactured in the same manner as described in EXAMPLE B-1, except that the recording layer material was replaced by Ge0.03Ag0.02 (Ga0.1Sb0.9)0.95.

Recording in the optical recording medium was carried out by the same system as used in EXAMPLE B-1. It was found out that the range of the recording linear velocity was as wide as 4 m/s to 35 m/s.

An equivalent degree of modulation to that of EXAMPLE B-2 was obtained even with around 10% smaller power of a laser beam.

It was also found out that addition of Cu, Au, or N instead of Ag was also effective to obtain the equivalent recording linear velocity.

It depends on the target range of linear velocity, however, the addition amount of Ag, Cu, Au, or N is preferably 0.05 or less in atomic ratio, and more preferably 0.03 or less in atomic ratio, since the excessively large addition amount of Ag, Cu, Au, or N causes a narrower range of recording linear velocity.

Change in jitter properties in accordance with a recording linear velocity was measured in the same way as in EXAMPLE B-1. The results of the measurement are shown in FIG. 21. The results of measuring the jitter value after 10 time overwriting, a degree of modulation (M), a reflectance at an unrecorded space part, "Rg (%)," and a reflectance at a recorded mark, "Rb (%)," at a recording linear velocity of 15 m/s, 25 m/s, and 35 m/s, are shown in TABLE 7.

Example B-5

An optical recording medium having the same recording material as in EXAMPLE B-1, was manufactured in the same manner as described in EXAMPLE B-1, except that the thickness of the first dielectric layer (first protective layer) was changed to 105 nm, 120 nm, and 80 nm.

The results of measuring the jitter value after 10 time overwriting, a degree of modulation (M), a reflectance at an unrecorded space part, "Rg (%)," and a reflectance at a recorded mark, "Rb (%)," at a recording linear velocity of 15 m/s, 25 m/s, and 35 m/s, are shown in TABLE 7. Here, the thickness of the recording layer was 16 nm.

Figure 22:
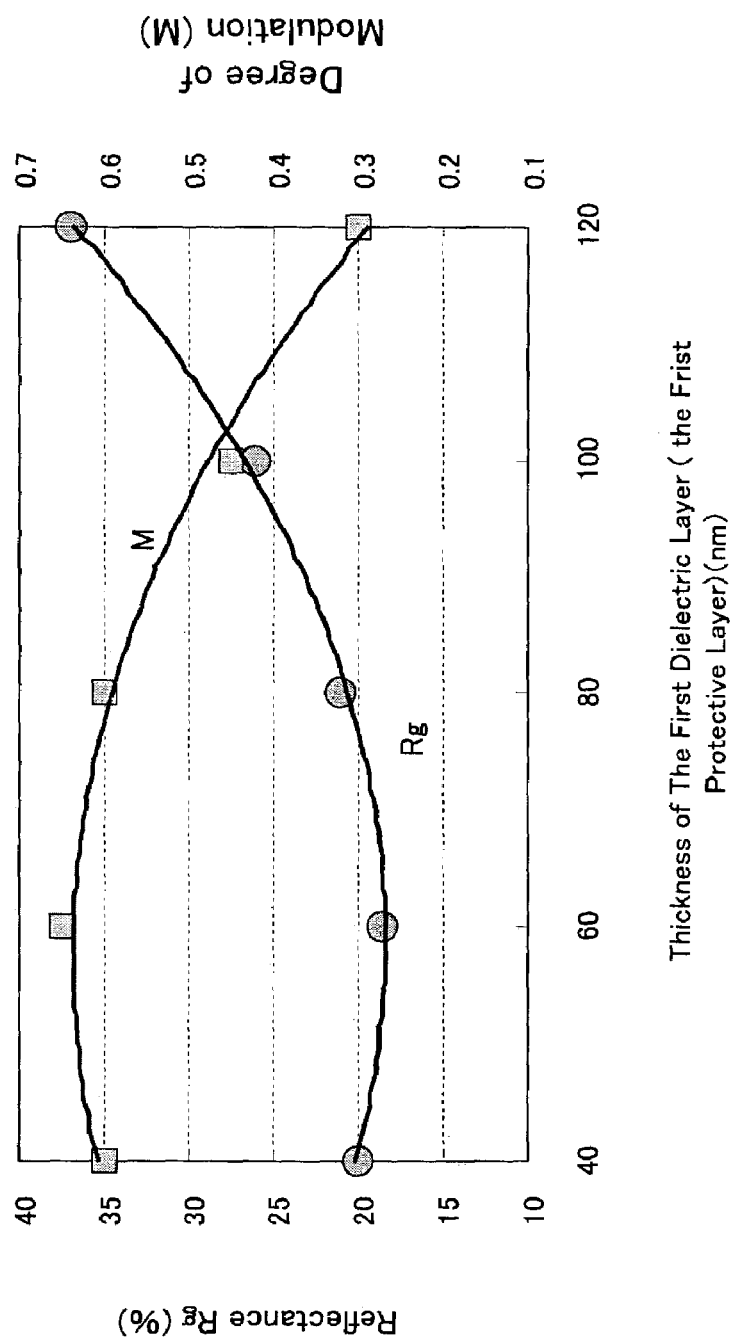
FIG. 22 is a graph showing a relationship among the thickness of the first dielectric layer, the reflectance, and the degree of modulation (M) in EXAMPLE B-5.

The relationship among the first dielectric layer, a reflectance, and a degree of modulation at a recording linear velocity of 35 m/s (wavelength of the laser beam was 660 nm), was measured further in detail. The result is shown in FIG. 22.

It was found out from the measurement that an excessively high reflectance deteriorates a degree of modulation. It was also found out that a reflectance and a degree of modulation could be adjusted by a thickness of the first dielectric layer. In the EXAMPLE B-5, the degree of modulation became 0.4 or more, when the reflectance was 30% or less. Here, the jitter value was within 10%, which was recordable. The thickness of the first dielectric layer was around 107 nm (0.162λ). When the thickness of the first dielectric layer was 120 nm, the reflectance was more than 30%, and the degree of modulation (M) was less than 0.4.

On the other hand, when the thickness of the first dielectric layer was 60 nm, the reflectance was as low as around 16%. However, in the condition of the thickness of the first dielectric layer and the reflectance, the results produced a large value for the degree of modulation and good jitter values.

Example B-6

Figure 23:
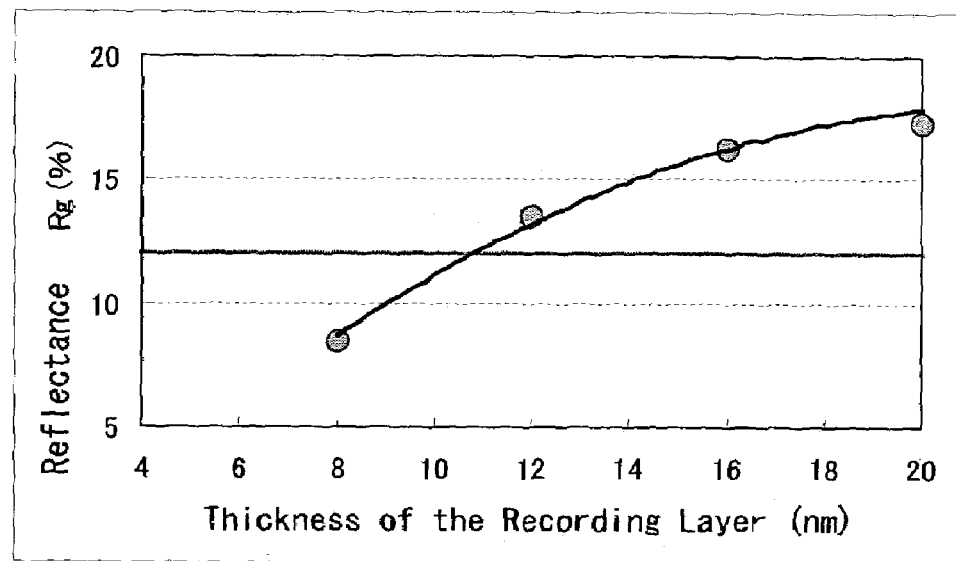
FIG. 23 is a graph showing a relationship between the thickness of the recording layer and the reflectance in EXAMPLE B-6.
Figure 24:
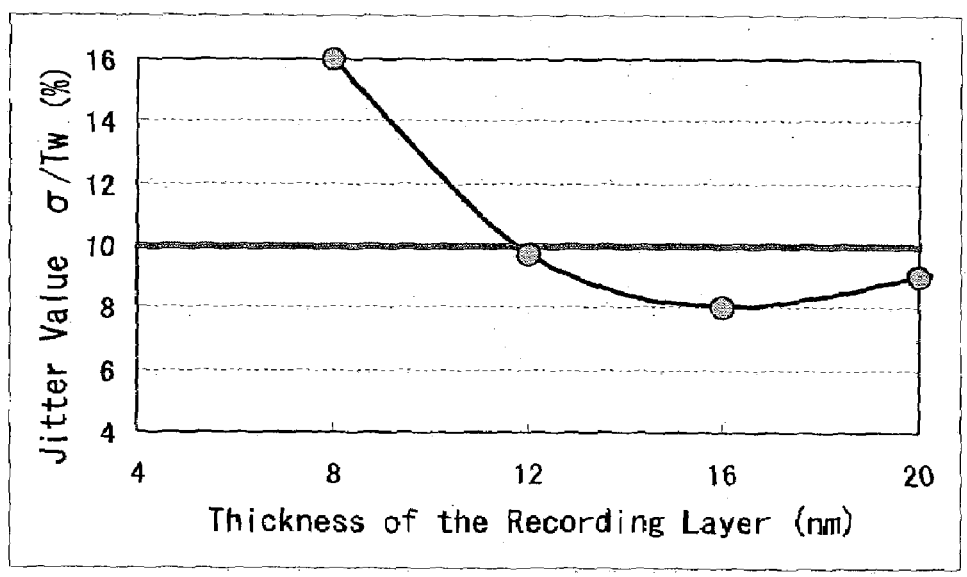
FIG. 24 is a graph showing a relationship between the thickness of the recording layer and the reflectance in EXAMPLE B-6.

An optical recording medium was manufactured in the same manner as described in EXAMPLE B-1, except that the thickness of the first dielectric layer (first protective layer) was changed to 60 nm. A reflectance and a jitter value were measured at a recording linear velocity of 35 m/s (wavelength of the laser beam was 660 nm), in which a thickness of the recording layer of the optical recording medium manufactured in EXAMPLE B-6, was changed. The results are shown in FIGS. 23 and 24.

As the results show, it was found out that an excessively low reflectance deteriorated jitter properties. It was also found out that decrease in the reflectance and deterioration of the jitter properties were related to the thickness of the recording layer, and that an excessively thin recording layer caused decrease in reflectance and deterioration of the jitter properties. For the recording material of the EXAMPLE B-6, the thickness of the recording layer was required to be around 10 nm (0.015λ) or more in order to obtain a sufficient reflectance (reflectance of 12% or more). The thickness of the recording layer of 12 nm (0.018λ) or more contributed to good jitter properties.

The results of measuring the jitter value after 10 time overwriting, a degree of modulation (M), a reflectance at an unrecorded space part, "Rg (%)," and a reflectance at a recorded mark, "Rb (%)," at a recording linear velocity of 15 m/s, 25 m/s, and 35 m/s, are shown in TABLE 7. Here, the thickness of the recording layer was 7 nm. With the condition provided here, recording could not be carried out, from viewpoints of the degree of modulation (M) and jitter value. In the following TABLE 7, "PL" expresses a thickness of the recording layer.

According to present invention, it is possible to achieve an optical recording medium prepared for a wide recording speed range from 1× to 10× or more for DVD recording. As a result, it enables a short time recording when a user inputs contents. Further, in a certain system, it is possible to carry out recording during a real-time reproducing. Therefore, it may enhance the convenience of a recording system.

According to an aspect of the present invention where the recording layer further comprises at least one element such as Ge or the like, a degree of modulation and archival stability of a recording mark are further improved, which requires an optical recording medium to employ only small amount of recording power.

The following EXAMPLEs C-1 to C-11, COMPARATIVE EXAMPLEs C-1 to C-2 describes a case where a laser beam having short wavelength was used as the laser beam for recording.

Examples C-1 to C-11, Comparative Examples C-1 to C-2

On a 0.6 mm thick polycarbonate substrate having a diameter of 12 cm, which has irregularity for a tracking guide formed of continuous groove on a surface thereof, 100 nm thick ZnS.SiO$_2$ (20 mol %) having as a first protective layer, a 12 nm thick recording layer using a composition target as shown in TABLE 8 and TABLE 9, 20 nm thick ZnS.SiO$_2$ (20 mol %) as a second protective layer, and a 140 nm thick Ag—Pd (1 atm %)-Cu (1 atm %) as a reflection layer, were sequentially disposed. A sputtering method in Ar gas atmosphere was employed for forming these layers.

On the reflection layer, an overcoat layer was provided utilizing a spin coater, and an optical recording medium was manufactured. Subsequently, using an initialization apparatus having a semiconductor laser of large diameter, the recording layer of the optical recording medium was subjected to initialization.

TABLE 7

| | | Thickness of the first dielectric layer (nm) | Recording Linear Velocity (m/s) | Recording Power (mW) | Recording Properties after 10 time Overwirting | | | |
|---|---|---|---|---|---|---|---|---|
| | | | | | Jitter Value (%) | Degree of Modulation (M) | Reflectance Rg (%) | Reflectance Rb (%) |
| EX. B-1 | Ga0.1Sb0.9 | 70 | 15 | 18 | 8.2 | 0.63 | 20.0 | 7.4 |
| | | 73 | 25 | 26 | 7.8 | 0.62 | 19.9 | 7.6 |
| | | 75 | 35 | 36 | 8.7 | 0.61 | 19.8 | 7.7 |
| EX. B-2 | Ga0.03(Ga0.1Sb0.9)0.97 | 70 | 15 | 18 | 8.0 | 0.65 | 19.6 | 6.9 |
| | | 73 | 25 | 26 | 8.0 | 0.64 | 19.5 | 7.0 |
| | | 75 | 35 | 36 | 9.5 | 0.62 | 19.6 | 7.4 |
| EX. B-3 | Ge0.03In0.05(Ga0.1Sb0.9) | 70 | 15 | 18 | 8.4 | 0.70 | 20.5 | 6.2 |
| | | 73 | 25 | 26 | 7.9 | 0.68 | 20.6 | 6.6 |
| | | 75 | 35 | 36 | 8.5 | 0.68 | 20.6 | 6.6 |
| EX. B-4 | Ge0.03Ag0.02 (Ga0.1Sb0.9) | 70 | 15 | 18 | 8.1 | 0.68 | 19.2 | 6.1 |
| | | 73 | 25 | 26 | 8.1 | 0.67 | 19.0 | 6.3 |
| | | 75 | 35 | 36 | 10.0 | 0.66 | 19.0 | 6.5 |
| EX. B-5 | Ga0.1Sb0.9 | 105 | 15 | 18 | 9.6 | 0.50 | 27.5 | 13.8 |
| | | 105 | 25 | 26 | 8.3 | 0.45 | 27.2 | 15.0 |
| | | 105 | 35 | 36 | 9.1 | 0.43 | 27.0 | 15.4 |
| | Ga0.1Sb0.9 | 60 | 15 | 18 | 9.0 | 0.69 | 16.5 | 5.1 |
| | | 60 | 25 | 26 | 8.1 | 0.67 | 16.8 | 5.4 |
| | | 60 | 35 | 36 | 8.9 | 0.66 | 16.0 | 5.4 |
| | Ga0.1Sb0.9 | 120 | 15 | 18 | >15 | 0.37 | 33.0 | 20.8 |
| | | 120 | 25 | 26 | >15 | 0.35 | 32.6 | 21.2 |
| | | 120 | 35 | 36 | >15 | 0.33 | 32.8 | 21.6 |
| EX. B-6 | Ga0.1Sb0.9 | 60/PL7 | 15 | 18 | >15 | 0.39 | 11.4 | 7.0 |
| | | 60/PL7 | 25 | 26 | >15 | 0.38 | 11.8 | 7.0 |
| | | 60/PL7 | 35 | 36 | >15 | 0.38 | 11.1 | 6.9 |

Recording was carried out under the following condition for each of the thus manufactured optical recording media. Upon recording, under a condition of linear density of 0.18 µm/bit, jitter value and a degree of modulation (M), and jitter value and a degree of modulation (M) after 1,000 times recording were measured. The results are shown in TABLE 8 and TABLE 9.

<Recording Condition>

| Wavelength of a laser beam | 407 nm |
|---|---|
| Numerical aperture NA | 0.65 |
| Linear velocity | 5.7 m/s, 17.1 m/s, and 34.2 m/s |
| Tracking pitch | 0.40 µm |

TABLE 8

Recording experiment of an optical recording medium

| Recording layer composition (atm %) | Linear velocity (m/s) | Jitter value (%) after overwriting 1 time | Jitter value (%) after overwriting 1,000 times | Degree of modulation after overwriting 1 time | Degree of modulation after overwriting 1,000 times |
|---|---|---|---|---|---|
| Ex. C-1 Ga12Sb88 | 5.7 | 6.8 | 7.0 | 0.69 (69%) | 0.68 (68%) |
| | 17.1 | 6.9 | 7.1 | 0.67 (67%) | 0.67 (67%) |
| | 34.2 | 7.0 | 7.4 | 0.66 (66%) | 0.65 (65%) |
| Ex. C-2 Ga5Sb95 | 5.7 | 7.2 | 7.8 | 0.68 (68%) | 0.69 (69%) |
| | 17.1 | 7.5 | 7.8 | 0.68 (68%) | 0.68 (68%) |
| | 34.2 | 7.6 | 7.9 | 0.64 (64%) | 0.65 (65%) |
| Ex. C-3 Ga20Sb80 | 5.7 | 7.3 | 7.5 | 0.68 (68%) | 0.67 (67%) |
| | 17.1 | 7.4 | 7.6 | 0.65 (65%) | 0.65 (65%) |
| | 34.2 | 7.6 | 7.9 | 0.65 (65%) | 0.65 (65%) |
| Ex. C-4 Ca11Sb84Ge5 | 5.7 | 6.7 | 6.8 | 0.7 (70%) | 0.69 (69%) |
| | 17.1 | 6.8 | 7.0 | 0.7 (70%) | 0.7 (70%) |
| | 34.2 | 7.0 | 7.4 | 0.69 (69%) | 0.68 (68%) |
| Ex. C-5 Ga12Sb85In3 | 5.7 | 7.1 | 7.4 | 0.65 (65%) | 0.65 (65%) |
| | 17.1 | 7.2 | 7.5 | 0.65 (65%) | 0.66 (66%) |
| | 34.2 | 7.5 | 7.9 | 0.63 (63%) | 0.63 (63%) |
| Ex. C-6 Ga12Sb85Zn3 | 5.7 | 7.2 | 7.5 | 0.69 (69%) | 0.69 (69%) |
| | 17.1 | 7.4 | 7.8 | 0.69 (69%) | 0.7 (70%) |
| | 34.2 | 7.6 | 7.9 | 0.67 (67%) | 0.68 (68%) |

TABLE 9

| | | | | | | |
|---|---|---|---|---|---|---|
| Ex. C-7 | Ga10Sb83Mn3Ag4 | 5.7 | 7.3 | 7.5 | 0.66 (66%) | 0.67 (67%) |
| | | 17.1 | 7.5 | 7.6 | 0.65 (65%) | 0.65 (65%) |
| | | 34.2 | 7.7 | 8.0 | 0.65 (65%) | 0.66 (66%) |
| Ex. C-8 | Ga10Sb83Ge3Cu4 | 5.7 | 7.1 | 7.3 | 0.71 (71%) | 0.7 (70%) |
| | | 17.1 | 7.2 | 7.5 | 0.7 (70%) | 0.7 (70%) |
| | | 34.2 | 7.5 | 7.8 | 0.68 (68%) | 0.67 (67%) |
| Ex. C-9 | Ga10Sb83In3N4 | 5.7 | 7.3 | 7.4 | 0.65 (65%) | 0.64 (64%) |
| | | 17.1 | 7.5 | 7.7 | 0.65 (65%) | 0.65 (65%) |
| | | 34.2 | 7.7 | 7.8 | 0.63 (63%) | 0.64 (64%) |
| Ex. C-10 | Ga6Sb80Mn7Ag7 | 5.7 | 11.1 | 15.4 | 0.67 (67%) | 0.66 (66%) |
| | | 17.1 | 11.2 | 16.2 | 0.65 (65%) | 0.61 (61%) |
| | | 34.2 | 12.0 | 16.8 | 0.52 (52%) | 0.48 (48%) |
| Ex. C-11 | Ga9Sb80Ge3Ag8 | 5.7 | 9.8 | 11.0 | 0.64 (64%) | 0.63 (63%) |
| | | 17.1 | 9.9 | 11.8 | 0.63 (63%) | 0.63 (63%) |
| | | 34.2 | 9.9 | 12.3 | 0.6 (60%) | 0.62 (62%) |
| Comp. Ex. C-1 | Ga50Sb50 | 5.7 | 15.2 | 18.2 | 0.38 (38%) | 0.35 (35%) |
| | | 17.1 | 16.0 | 19.0 | 0.34 (34%) | 0.34 (34%) |
| | | 34.2 | 17.1 | 19.0 | 0.3 (30%) | 0.29 (29%) |
| Comp. Ex. C-2 | Ga22Sb78 | 5.7 | 12.5 | 15.6 | 0.57 (57%) | 0.58 (58%) |
| | | 17.1 | 12.7 | 16.7 | 0.55 (55%) | 0.56 (56%) |
| | | 34.2 | 13.0 | 17.9 | 0.54 (54%) | 0.55 (55%) |

As indicated in TABLE 8 and TABLE 9, it was found out that the optical recording medium according to the EXAMPLES C-1 to C-9 of the present invention, jitter value and a degree of modulation were excellent and had excellent overwriting property, even at a high linear velocity. In addition, even when thickness of each of the layers was changed within a range of:

$$0.070\lambda \leq t_1 \leq 0.5\lambda$$

$$0.015\lambda \leq t_2 \leq 0.05\lambda$$

$$0.011\lambda \leq t_3 \leq 0.055\lambda$$

$$0.10\lambda \leq t_4;$$

wherein "$t_1$" expresses the thickness of the first protective layer, "$t_2$" expresses the thickness of the recording layer, "$t_3$" expresses the thickness of the second protective layer, and "$t_4$" expresses the thickness of the reflection layer, the optical recording medium still attained the jitter value and the degree of modulation.

On the other hand, the optical recording media of COMPARATIVE EXAMPLEs C-1 and C-2, where the recording layer comprised Ga and Sb, and a content of Sb is 80 atm % to 95 atm % relative to a total content of Sb, did not show a sufficient degree of modulation, or showed a result that jitter value was large although having a sufficient degree of modulation. Furthermore, the optical recording media of EXAMPLEs C-10 and C-11, where less than 90% of Ga and Sb was contained in the recording layer, showed deteriorated results, compared to the optical recording media of EXAMPLEs C-1 to C-9, where 90% or more of Ga and Sb were contained in the recording layer.

Furthermore, apart from the above EXAMPLEs, it was found out that excellent properties such as improvement of archival stability and recording sensitivity were obtained, by adding at least one selected from Au, B, Al, Si, Sn, Pb, Bi, La, Ce, Gd, and Tb to the recording layer.

Example C-10

On a 1.1 mm thick polycarbonate substrate having a diameter of 12 cm, which had irregularity for a tracking guide formed of continuous groove on a surface thereof, a 120 nm thick Ag—Pd (1 atm %)-Cu (1 atm %) as a reflection layer, 15 nm thick $ZnS.SiO_2$ (20 mol %) as a second protective layer, 12 nm thick Ga11Sb84Ge5 as a recording layer, and 100 nm thick $ZnS.SiO_2$ (20 mol %) having as a first protective layer, were sequentially disposed. A sputtering method in Ar gas atmosphere was employed for disposing these layers.

On the first protective layer, a 50 μm thick polycarbonate film was laminated, via a 50 μm thick adhesive sheet, thus forming a 0.1 mm thick light transmittance layer, and an optical recording medium was manufactured. Subsequently, by an initialization apparatus having a semiconductor laser of large diameter, the recording layer of the optical recording medium was subjected to initialization.

Recording was carried out under a condition shown in the following as to thus manufactured optical recording medium.

<Recording Condition>

| | |
|---|---|
| Wavelength of laser beam | 407 nm |
| Numerical aperture NA | 0.85 |
| Linear velocity | 5.7 m/s, 17.1 m/s, 34.2 m/s |
| Tracking pitch | 0.32 μm |

Recording was carried out under the following condition as to each manufactured optical recording medium. Upon recording, under a condition of linear density of 0.13 μm/bit, jitter value and a degree of modulation (M), and jitter value and a degree of modulation (M) after 1000 time recording was measured. It was found out that jitter value and degree of modulation (M) were excellent and the optical recording medium had excellent overwriting property, within a linear velocity of 5.7 m/s to 34.2 m/s. In addition, even when thicknesses of each layer was changed within a limitation of the present invention, the above properties were obtained.

Example C-11

On a 0.6 mm thick polycarbonate substrate having a diameter of 12 cm, which had irregularity for a tracking guide formed of continuous groove having a pitch of 0.4 μm on a surface thereof, 150 nm thick $ZnS.SiO_2$ (20 mol %) having as a first protective layer, 10 nm thick $ZnS.SiO_2$ (20 mol %) as a second protective layer, a 10 nm thick Ag—Pd (1 atm %)-Cu (1 atm %) as a reflection layer, and a 200 nm thick heat dissipation layer which contained AlN, were sequentially disposed, so as to form a first information layer. The light transmittance rate of the first information layer was 42%, when the laser beam had wavelength of 407 nm.

On the first information layer, by photopolymer method, a transparent layer which had irregularity for a tracking guide formed of continuous groove of pitch 0.4 μm, was formed. The thickness of the transparent layer was 30 μm. On the transparent layer, a 40 nm thick $ZnS.SiO_2$ (20 mol %) as a first protective layer, a 12 nm thick Ga11Sb84Ge5 as a second recording layer, a 15 nm thick $ZnS.SiO_2$ (20 mol %) as a second protective layer, and a 150 nm Ag—Pd (1 atm %)-Cu(1 atm %) as a reflection layer, were sequentially disposed so as to form a second information layer. A sputtering method in Ar gas atmosphere was employed for disposing each of the layers.

On the second information layer, an overcoat layer was formed using a spin coater, and a double-layer optical recording medium was thus manufactured. Subsequently, by an initialization apparatus having a semiconductor laser of large diameter, the recording layers of the double-layer optical recording medium was subjected to initialization.

Recording was carried out under a condition shown in the following as to the double-layer optical recording medium.

<Recording Condition>

| | |
|---|---|
| Wavelength of laser beam | 407 nm |
| Numerical aperture NA | 0.65 |
| Linear velocity | 17.1 m/s |

Upon recording, under a condition of linear density of 0.18 μm/bit, jitter value and a degree of modulation (M), and jitter and a degree of modulation (M) after 1,000 time recording were measured.

In addition, according to the experiment apart from the above Examples, the light transmittance rate of the first information layer was required to be 40% or more in order to conduct recording and reproducing in the second information layer in good condition.

As described above, according to the present invention, it is possible to provide an optical recording medium having a large degree of modulation, showing excellence in recording and reproducing, and further good overwriting property, by using Ga and Sb in the recording layer and restricting a composition ratio thereof, even when a laser beam having wavelength of 350 nm to 450 nm. In addition, by defining thickness of each of the layers, it is possible to achieve an optical recording medium having an excellent recording sensitivity.

The optical recording medium of the present invention can cope with shorter wavelength of a laser beam, and also can cope with an optical pickup apparatus having a high numerical aperture (NA). Therefore, recording with a high density can be carried out, and thus recording capacity is enlarged.

The following EXAMPLEs D-1 to D-10, and COMPARATIVE EXAMPLEs D-1 and D-4 indicate an aspect of the present invention where the recording layer of an optical recording medium contains Ga, Sb, Ri and Rh.

Examples D-1 to D-10, Comparative Examples D-1 to D-4

In order to manufacture an optical recording medium having a composition as shown in TABLE 10, on a 0.6 mm thick polycarbonate substrate having track pitch of 0.7 μm, groove depth of 400 Å (40 nm), and a diameter of 120 mm, a first protective layer (thickness: 700 Å (70 nm)), a recording layer (thickness: 150 Å (15 nm)), an second protective layer (thickness: 250 Å (25 nm)), and a reflection layer (thickness: 1000 Å (100 nm)) were sequentially formed by a sputtering method, and further on the reflection layer, an surrounding protective layer was provided by spin coating method. Subsequently, after having thus obtained optical recording medium subjected to initial crystallization, signal property of the optical recording medium was evaluated. In order to evaluate a response against higher linear velocity, evaluation items were determined as follows: recording linear velocity and recording power were 3.5 m/s (10 mW), 15 m/s (16 mW), 25 m/s (26 mW), and 35 m/s (36 mW), respectively. Wavelength of recording laser beam was 650 nm, overwriting was repeated in EFM (Eight to Fourteen Modulation) random pattern. Evaluation of reproduced signal property was conducted as to a jitter value of 3T signal and a degree of modulation of 14T signal. A archival stability was evaluated by 3T signal jitter value and 14T signal degree of modulation at the 1000 times of overwriting, as to the optical recording medium, which had been overwritten for 1000 times and maintained for 300 hours under the temperature of 80° C. and humidity of 85RH %. The result is shown in the following TABLE 11, TABLE 12, and TABLE 13.

TABLE 10

|  | First protective layer | Recording layer | Second protective layer | Reflection layer |
|---|---|---|---|---|
| Ex. D-1 | $(ZnS)_{80}(SiO_2)_{20}$ (mol %) | Ga10Sb85Bi3Rh2 (atm %) | $(ZnS)_{80}(SiO_2)_{20}$(mol %) | Ag96Cu2Ni2 |
| Ex. D-2 | $(ZnS)_{80}(SiO_2)_{20}$ | Ga9Sb85Bi3Rh2Cu1 | $(ZnS)_{80}(SiO_2)_{20}$ | Ag96Cu2Ni2 |
| Ex. D-3 | $(ZnS)_{80}(SiO_2)_{20}$ | Ga9Sb85Bi3Rh2B1 | $(ZnS)_{80}(SiO_2)_{20}$ | $Ag_{96}Cu_2Ni_2$ |
| Ex. D-4 | $(ZnS)_{80}(SiO_2)_{20}$ | Ga9Sb85Bi3Rh2N1 | $(ZnS)_{80}(SiO_2)_{20}$ | Ag96Cu2Ni2 |
| Ex. D-5 | $(ZnS)_{80}(SiO_2)_{20}$ | Ga9Sb85Bi3Rh2Ge1 | $(ZnS)_{80}(SiO_2)_{20}$ | Ag96Cu2Ni2 |
| Ex. D-6 | $(ZnS)_{80}(SiO_2)_{20}$ | Ga9Sb85Bi3Rh2Fe1 | $(ZnS)_{80}(SiO_2)_{20}$ | Ag96Cu2Ni2 |
| Ex. D-7 | $(ZnS)_{80}(SiO_2)_{20}$ | Ga9Sb85Bi3Rh2Ir1 | $(ZnS)_{80}(SiO_2)_{20}$ | Ag96Cu2Ni2 |
| Ex. D-8 | $(ZnS)_{80}(SiO_2)_{20}$ | Ga12Sb88 | $(ZnS)_{80}(SiO_2)_{20}$ | Ag96Cu2Ni2 |
| Ex. D-9 | $(ZnS)_{80}(SiO_2)_{20}$ | Ga10Sb88Bi2 | $(ZnS)_{80}(SiO_2)_{20}$ | Ag96Cu2Ni2 |
| Ex. D-10 | $(ZnS)_{80}(SiO_2)_{20}$ | Ga10Sb88Ge2 | $(ZnS)_{80}(SiO_2)_{20}$ | Ag96Cu2Ni2 |
| Comp. Ex. D-1 | $(ZnS)_{80}(SiO_2)_{20}$ | Ga50Sb50 | $(ZnS)_{80}(SiO_2)_{20}$ | Ag96Cu2Ni2 |
| Comp. Ex. D-2 | $(ZnS)_{80}(SiO_2)_{20}$ | Ga4Sb96 | $(ZnS)_{80}(SiO_2)_{20}$ | Ag96Cu2Ni2 |
| Comp. Ex. D-3 | $(ZnS)_{80}(SiO_2)_{20}$ | Ga2Sb96Bi1Rh1 | $(ZnS)_{80}(SiO_2)_{20}$ | Ag96Cu2Ni2 |
| Comp. Ex. D-4 | $(ZnS)_{80}(SiO_2)_{20}$ | Ag1In3Sb80Te16 | $(ZnS)_{80}(SiO_2)_{20}$ | Ag96Cu2Ni2 |

As for initial crystallization, in EXAMPLEs D-1 to D-10, and in COMPARATIVE EXAMPLE D4, a semiconductor laser with 700 mW output was used. In COMPARATIVE EXAMPLE D-1, a semiconductor laser with 1000 mW output was used.

TABLE 11

|  | Recording Linear Velocity (m/s) | Recording Power (mW) | Jitter Value after Overwriting | | Degree of Modulation (M) after Overwriting | | Reflectance, Rg (%) after Overwriting | | Archival Stability | | Reflectance, Rb (%) after Overwriting | |
|---|---|---|---|---|---|---|---|---|---|---|---|---|
|  |  |  | 1 time | 1000 times | 1 time | 1000 times | 1 time | 1000 times | Jitter Value (%) | Degree of Modulcation (M) after Overwriting | 1 time | 1000 times |
| EX. D-1 | 3.5 | 10 | 7.2 | 7.3 | 65 | 67 | 19.8 | 19.6 | 7.5 | 0.65 (65%) | 6.9 | 6.5 |
|  | 15 | 16 | 7.2 | 7.3 | 65 | 67 | 19.7 | 19.4 | 7.5 | 0.65 (65%) | 6.9 | 6.4 |
|  | 25 | 26 | 7.3 | 7.5 | 63 | 65 | 19.5 | 19.2 | 7.7 | 0.63 (63%) | 7.2 | 6.7 |
|  | 35 | 36 | 7.6 | 7.8 | 62 | 64 | 19.3 | 18.9 | 8.0 | 0.62 (62%) | 7.3 | 6.8 |
| EX. D-2 | 3.5 | 10 | 7.1 | 7.4 | 66 | 68 | 20.4 | 20.2 | 7.6 | 0.66 (66%) | 6.9 | 6.5 |
|  | 15 | 16 | 7.2 | 7.5 | 65 | 68 | 20.3 | 20.0 | 7.7 | 0.65 (65%) | 7.1 | 6.4 |
|  | 25 | 26 | 7.3 | 7.6 | 64 | 66 | 20.0 | 19.7 | 7.8 | 0.64 (64%) | 7.2 | 6.7 |
|  | 35 | 36 | 7.6 | 7.9 | 63 | 65 | 19.8 | 19.5 | 8.1 | 0.63 (63%) | 7.3 | 6.8 |
| EX. D-3 | 3.5 | 10 | 7.2 | 7.3 | 68 | 70 | 20.0 | 19.7 | 7.4 | 0.68 (68%) | 6.4 | 5.9 |
|  | 15 | 16 | 7.3 | 7.5 | 67 | 69 | 20.1 | 19.7 | 7.6 | 0.67 (67%) | 6.6 | 6.1 |
|  | 25 | 26 | 7.4 | 7.6 | 66 | 68 | 19.9 | 19.5 | 7.7 | 0.66 (66%) | 6.8 | 6.2 |
|  | 35 | 36 | 7.7 | 7.9 | 65 | 68 | 19.7 | 19.4 | 8.0 | 0.66 (66%) | 6.9 | 6.2 |
| EX. D-4 | 3.5 | 10 | 7.0 | 7.2 | 66 | 68 | 20.2 | 20.0 | 7.3 | 0.66 (66%) | 6.9 | 6.4 |
|  | 15 | 16 | 7.2 | 7.4 | 66 | 68 | 20.0 | 19.8 | 7.5 | 0.66 (66%) | 6.8 | 6.3 |
|  | 25 | 26 | 7.4 | 7.5 | 65 | 67 | 19.7 | 19.4 | 7.6 | 0.65 (65%) | 6.9 | 6.4 |
|  | 35 | 36 | 7.7 | 7.8 | 63 | 66 | 19.7 | 19.3 | 8.0 | 0.64 (64%) | 7.3 | 6.6 |
| EX. D-5 | 3.5 | 10 | 7.1 | 7.1 | 67 | 69 | 20.2 | 19.9 | 7.2 | 0.67 (67%) | 6.7 | 6.2 |
|  | 15 | 16 | 7.2 | 7.3 | 67 | 69 | 20.0 | 19.8 | 7.4 | 0.67 (67%) | 6.6 | 6.1 |
|  | 25 | 26 | 7.3 | 7.4 | 66 | 68 | 19.8 | 19.5 | 7.5 | 0.66 (66%) | 6.7 | 6.2 |
|  | 35 | 36 | 7.7 | 7.9 | 65 | 67 | 19.6 | 19.2 | 7.9 | 0.65 (65%) | 6.9 | 6.3 |

TABLE 12

| | Recording Linear Velocity (m/s) | Recording Power (mW) | Jitter Value after Overwriting | | Degree of Modulation (M) after Overwriting | | Reflectance, Rg (%) after Overwriting | | Archival Stability | | Reflectance, Rb (%) after Overwriting | |
|---|---|---|---|---|---|---|---|---|---|---|---|---|
| | | | | | | | | | Jitter Value (%) | Degree of Modulation (M) after Overwriting | 1 time | 1000 times |
| | | | 1 time | 1000 times | 1 time | 1000 times | 1 time | 1000 times | | | | |
| EX. D-6 | 3.5 | 10 | 7.2 | 7.4 | 67 | 69 | 20.2 | 19.9 | 7.5 | 0.67 (67%) | 6.7 | 6.2 |
| | 15 | 16 | 7.5 | 7.6 | 67 | 69 | 20.0 | 19.8 | 7.7 | 0.67 (67%) | 6.6 | 6.1 |
| | 25 | 26 | 7.7 | 7.8 | 67 | 68 | 19.8 | 19.6 | 7.9 | 0.66 (66%) | 6.5 | 6.3 |
| | 35 | 36 | 7.8 | 7.9 | 66 | 68 | 19.5 | 19.3 | 8.0 | 0.66 (66%) | 6.6 | 6.2 |
| EX. D-7 | 3.5 | 10 | 7.0 | 7.2 | 66 | 68 | 20.4 | 20.0 | 7.3 | 0.66 (66%) | 6.9 | 6.4 |
| | 15 | 16 | 7.2 | 7.4 | 65 | 67 | 20.2 | 19.9 | 7.5 | 0.65 (65%) | 7.1 | 6.6 |
| | 25 | 26 | 7.4 | 7.6 | 64 | 66 | 20.0 | 19.8 | 7.7 | 0.64 (64%) | 7.2 | 6.7 |
| | 35 | 36 | 7.7 | 7.9 | 63 | 65 | 19.8 | 19.5 | 7.9 | 0.63 (63%) | 7.3 | 6.8 |
| EX. D-8 | 3.5 | 10 | 9.0 | 9.2 | 55 | 57 | 20.2 | 19.9 | 9.3 | 0.56 (56%) | 9.1 | 8.6 |
| | 15 | 16 | 8.7 | 9.0 | 63 | 64 | 20.0 | 19.8 | 9.1 | 0.62 (62%) | 7.4 | 7.1 |
| | 25 | 26 | 8.8 | 9.1 | 62 | 63 | 20.1 | 19.7 | 9.4 | 0.60 (60%) | 7.6 | 7.3 |
| | 35 | 36 | 8.9 | 9.5 | 58 | 54 | 19.7 | 19.5 | 10.0 | 0.57 (57%) | 8.3 | 9.0 |
| EX. D-9 | 3.5 | 10 | 7.2 | 7.9 | 66 | 68 | 19.8 | 19.6 | 10.8 | 0.67 (67%) | 6.7 | 6.3 |
| | 15 | 16 | 7.3 | 8.1 | 65 | 67 | 19.7 | 19.6 | 11.0 | 0.66 (66%) | 6.9 | 6.5 |
| | 25 | 26 | 7.4 | 8.3 | 64 | 66 | 19.7 | 19.4 | 11.3 | 0.65 (65%) | 7.1 | 6.6 |
| | 35 | 36 | 7.7 | 8.8 | 63 | 65 | 19.6 | 19.3 | 11.8 | 0.64 (64%) | 7.3 | 6.8 |

TABLE 13

| | Recording Linear Velocity (m/s) | Recording Power (mW) | Jitter Value after Overwriting | | Degree of Modulation (M) after Overwriting | | Reflectance, Rg (%) after Overwriting | | Archival Stability | | Reflectance, Rb (%) after Overwriting | |
|---|---|---|---|---|---|---|---|---|---|---|---|---|
| | | | | | | | | | Jitter Value (%) | Degree of Modulation (M) after Overwriting | 1 time | 1000 times |
| | | | 1 time | 1000 times | 1 time | 1000 times | 1 time | 1000 times | | | | |
| EX. D-10 | 3.5 | 10 | 9.0 | 9.5 | 54 | 56 | 19.5 | 19.2 | 9.7 | 0.56 (56%) | 9.0 | 8.4 |
| | 15 | 16 | 9.4 | 9.9 | 53 | 55 | 19.5 | 19.1 | 10.1 | 0.55 (55%) | 9.2 | 8.6 |
| | 25 | 26 | 9.9 | 10.5 | 52 | 54 | 19.3 | 19.1 | 10.7 | 0.54 (54%) | 9.3 | 8.8 |
| | 35 | 36 | 10.7 | 11.3 | 51 | 53 | 19.2 | 18.9 | 11.5 | 0.53 (53%) | 9.4 | 8.9 |
| COMP. EX. D-1 | 3.5 | 10 | 10.3 | 9.9 | 51 | 56 | 18.0 | 18.0 | 13.1 | 0.56 (56%) | 8.8 | 7.9 |
| | 15 | 16 | 10.7 | 10.5 | 50 | 56 | 17.9 | 17.5 | 14.1 | 0.55 (55%) | 9.0 | 7.7 |
| | 25 | 26 | 10.8 | 11.7 | 50 | 55 | 17.2 | 17.3 | 14.8 | 0.54 (54%) | 8.6 | 7.8 |
| | 35 | 36 | — | — | 45 | 48 | 17.0 | 16.9 | — | 0.42 (42%) | 9.4 | 8.8 |
| COMP. EX. D-2 | 3.5 | 10 | — | — | 42 | 43 | 25.0 | 24.6 | — | 0.40 (40%) | 14.5 | 14.0 |
| | 15 | 16 | 11.5 | 14.0 | 43 | 43 | 24.8 | 24.5 | 11.8 | 0.40 (40%) | 14.1 | 14.0 |
| | 25 | 26 | 11.0 | 12.0 | 45 | 46 | 24.3 | 24.0 | 10.3 | 0.42 (42%) | 13.4 | 13.0 |
| | 35 | 36 | — | — | 43 | 42 | 24.2 | 23.8 | — | 0.40 (40%) | 13.8 | 13.8 |
| COMP. EX. D-3 | 3.5 | 10 | — | — | 54 | 50 | 25.5 | 25.2 | — | 0.48 (48%) | 11.7 | 12.6 |
| | 15 | 16 | 12.0 | 12.5 | 56 | 54 | 25.4 | 25.0 | 13.5 | 0.52 (52%) | 11.2 | 11.5 |
| | 25 | 26 | 11.9 | 12.3 | 57 | 56 | 25.3 | 25.0 | 13.0 | 0.53 (53%) | 10.9 | 11.0 |
| | 35 | 36 | 12.3 | 12.6 | 52 | 50 | 25.0 | 24.6 | 13.8 | 0.47 (47%) | 12.0 | 12.3 |
| COMP. EX. D-4 | 3.5 | 10 | 7.1 | 7.3 | 65 | 68 | 19.5 | 19.2 | 7.5 | 0.65 (65%) | 6.8 | 6.1 |
| | 15 | 16 | 9.3 | 9.5 | 64 | 68 | 19.3 | 19.1 | 9.8 | 0.63 (63%) | 6.9 | 6.1 |
| | 25 | 26 | | | | | Unable to Overwrite | | | | | |
| | 35 | 36 | | | | | | | | | | |

As apparently shown in TABLE 11, TABLE 12, and TABLE 13, it was found out that the optical recording medium of the present invention enables overwriting even within a wide range of linear velocity of 3.5 m/s, 15 m/s (16 mW), 25 m/s (26 mW), and 35 m/s (36 mW), and in particular, at the linear velocity over 25 m/s, which was considered to be difficult for overwriting in the related art. In addition, jitter value and degree of modulation of reproduced signal were excellent, archival stability and a repetition property in overwriting were also excellent. On the contrary, as for the optical recording medium of COMPARATIVE EXAMPLE D-1 using eutectic compositions one of Ga50Sb50, overwriting at a high linear velocity could be carried out, but had a poor jitter value, a poor degree of modulation, archival stability and repetition property in overwriting, and also initial crystallization was not easily carried out, comparing to the EXAMPLEs. In addition, as for the material of Ag—In—Sb—Te in COMPARATIVE EXAMPLE D-2, overwriting at linear velocity of 25 m/s and 35 m/s could not be carried out.

According to an aspect of the present invention where the recording layer comprises Ga, Sb, Bi, and Rh, it is possible to provide an optical recording medium having a capacity equivalent to that of DVD-ROM, having a sufficient degree of modulation even at a wide range of recording linear velocity of 3.0 m/s to 35 m/s, excellent in repetition property in overwriting and superior in archival stability. Therefore, the present invention largely contributes to progress in a filed of optical recording.

The following EXAMPLEs E-1 to E-6, and COMPARATIVE EXAMPLEs E-1 and E-2 indicate an aspect of the present invention where the recording layer comprised Ga, Sb, Zr, and Mg.

Ga10Sb87Zr1Mg1Se1 (EXAMPLE E-4)
Ga9Sb87Zr1Mg2N1 (EXAMPLE E-5)
Ga10Sb87Zr1Mg1C1 (EXAMPLE E-6)

TABLE 14 shows, in summary, composition ratio of the material and thickness of each of the layers in EXAMPLES E-2 to E-6.

TABLE 14

|  | First protective layer | | Recording layer | | Second protective layer | | Reflection layer | |
|---|---|---|---|---|---|---|---|---|
|  | Material composition (mol %) | Thickness (Å)/(nm) | Material composition (atm %) | Thickness (Å)/(nm) | Material composition (mol %) | Thickness (Å)/(nm) | Material | Thickness (Å)/(nm) |
| Ex. E-1 | $(ZnS)_{80}(SiO_2)_{20}$ | 750/75 | Ga10Sb88Zr1Mg1 | 150/15 | $(ZnS)_{80}(SiO_2)_{20}$ | 300/30 | Ag alloy | 950/95 |
| Ex. E-2 | $(ZnS)_{80}(SiO_2)_{20}$ | 750/75 | Ga9Sb88Zr1Mg1Al1 | 150/15 | $(ZnS)_{80}(SiO_2)_{20}$ | 300/30 | Ag alloy | 950/95 |
| Ex. E-3 | $(ZnS)_{80}(SiO_2)_{20}$ | 750/75 | Ga9Sb87Zr1Mg1Sn2 | 150/15 | $(ZnS)_{80}(SiO_2)_{20}$ | 300/30 | Ag alloy | 950/95 |
| Ex. E-4 | $(ZnS)_{80}(SiO_2)_{20}$ | 750/75 | Ga10Sb87Zr1Mg1Se1 | 150/15 | $(ZnS)_{80}(SiO_2)_{20}$ | 300/30 | Ag alloy | 950/95 |
| Ex. E-5 | $(ZnS)_{80}(SiO_2)_{20}$ | 750/75 | Ga9Sb87Zr1Mg2N1 | 150/15 | $(ZnS)_{80}(SiO_2)_{20}$ | 300/30 | Ag alloy | 950/95 |
| Ex. E-6 | $(ZnS)_{80}(SiO_2)_{20}$ | 750/75 | Ga10Sb87Zr1Mg1C1 | 150/15 | $(ZnS)_{80}(SiO_2)_{20}$ | 300/30 | Ag alloy | 950/95 |

Example E-1

As shown in FIG. 2, on a 0.6 mm thick polycarbonate substrate having track pitch of 0.7 μm, groove depth of 400 Å (40 nm), diameter of 120 mm, a first protective layer 2(thickness: 750 Å (75 nm)) comprising $(ZnS)_{80}(SiO_2)_{20}$ (mol %), a recording layer (thickness:150 Å (15 nm)) comprising Ga10Sb88Zr1Mg1, a second protective layer 4 (thickness: 300 Å (30 nm)) comprising $(ZnS)_{80}(SiO_2)_{20}$ (mol %) and a reflection layer 5 (thickness: 950 Å (95 nm)) comprising Ag alloy, were sequentially disposed by a sputtering method. On the reflection layer 5, an surrounding protective layer 6(thickness: around 5 nm) comprising an acrylic resin was formed by a spin coating method, whereby a optical recording medium for evaluation having a layer structure as shown in FIG. 2 was manufactured.

TABLE 14 shows composition ratio of the material and thickness of each of the layers.

Examples E-2 to E-6

A optical recording medium for evaluation for use in the EXAMPLES E-2 to E-6 was manufactured in the same manner as in EXAMPLE E-1, except that Ga10Sb88Zr1Mg1, used as material for the recording layer, was replaced by the following materials:

Ga9Sb88Zr1Mg1Al1 (EXAMPLE E-2)
Ga9Sb87Zr1Mg1Sn2 (EXAMPLE E-3)

Comparative Examples E-1 and E-2

An optical recording media for evaluation for use in the COMPARATIVE EXAMPLEs E-1 and E-2 were manufactured in the same manner as described in EXAMPLE E-1, except that the composition ratio of the material in the recording layer and thicknesses were changed as shown in TABLE 15. It should be noted that as shown in TABLE 15, the thicknesses of the recording layer, the second protective layer and reflection layer vary among the COMPARATIVE EXAMPLEs.

TABLE 15

|  | First protective layer | | Recording layer | | Second protective layer | | Reflection layer | |
|---|---|---|---|---|---|---|---|---|
| Comparative examples | Material composition (mol %) | Thickness (Å)/(nm) | Material composition (atm %) | Thickness (Å)/(nm) | Material composition (mol %) | Thickness (Å)/(nm) | Material | Thickness (Å)/(nm) |
| Comp. Ex. E-1 | $(ZnS)_{80}(SiO_2)_{20}$ | 750/75 | Ga50Sb50 | 160/16 | $(ZnS)_{80}(SiO_2)_{20}$ | 200/20 | Ag alloy | 9000/900 |
| Comp. Ex. E-2 | $(ZnS)_{80}(SiO_2)_{20}$ | 750/75 | Ag1In3Sb80Te16 | 160/16 | $(ZnS)_{80}(SiO_2)_{20}$ | 200/20 | Ag alloy | 1000/100 |

The recording layer of the optical recording media manufactured in the EXAMPLES E-1 to E-6 and COMPARATIVE EXAMPLEs E-1 and E-2 was amorphous, and for evaluation, the optical recording media was subjected to initial crystallization (initialization) and rendered in unrecorded state. Here, in the EXAMPLES E-1 to E-6 and COMPARATIVE EXAMPLES E-1 and E-3, high output semiconductor laser was used, and initialization was carried out at 700 mW output. However, as to the COMPARATIVE EXAMPLE E-1, initialization failed with the 700 mW output laser, and thus it was carried out at the condition of 1100 mW output.

After initialization, a reproduced signal property and storage property of each evaluation-purpose optical recording medium (recording medium) were evaluated.

The evaluation was carried out by setting the recording linear velocity and recording power (in parenthesis), 3.5 m/s (10 mW), 15 m/s (16 mW), 25 m/s (26 mW), and 35 m/s (36 mW), respectively. Wavelength of a recording laser beam was 650 nm, overwriting was repeated in EFM (Eight to Fourteen Modulation, 8-14 modulation) random pattern. Evaluation of reproduced signal property was conducted with a jitter value of 3T signal and a degree of modulation of 14T signal. A storage property was evaluated by 3T signal jitter value and 14T signal degree of modulation at the 1000th time of overwriting, as to the optical recording medium, which had been overwritten for 1000 times and maintained for 300 hours at the temperature of 80° C. and humidity of 85%.

The results of evaluation of the EXAMPLEs E-1 to E-6 and COMPARATIVE EXAMPLEs E-1 and E-2 are shown in the following TABLE 16 and TABLE 17.

of the present invention, overwriting can be carried out even within a wide range of linear velocity of 3.5 m/s to 35 m/s, and in particular, at the high linear velocity at 25 m/s or more, which was considered to be difficult for overwriting in the related art. In addition, jitter value and degree of modulation of reproduced signal are excellent, and the optical recording medium had excellent archival stability and a repetition property in overwriting.

On the contrary, as for the optical recording medium in the COMPARATIVE EXAMPLEs E-1 and E-2, using as a recording material, alloy having composition ratio of Ga50Sb50, or alloy having eutectic composition ratio of Ga12Sb88, overwriting at a high linear velocity can be

TABLE 16

| | Recording linear velocity (m/s) | Recording power (mW) | Jitter value (%) after overwriting | | Degree of modulation (%) after overwriting | | Archival stability | |
|---|---|---|---|---|---|---|---|---|
| | | | 1 time | 1,000 times | 1 time | 1,000 times | Jitter value (%) | Degree of modulation (%) |
| Ex. E-1 | 3.5 | 10 | 7.3 | 7.5 | 66 | 68 | 7.6 | 66 |
| | 15 | 16 | 7.3 | 7.5 | 65 | 68 | 7.6 | 65 |
| | 25 | 26 | 7.5 | 7.7 | 65 | 67 | 7.8 | 64 |
| | 35 | 36 | 7.8 | 8.0 | 63 | 65 | 8.1 | 63 |
| Ex. E-2 | 3.5 | 10 | 7.3 | 7.4 | 66 | 68 | 7.5 | 66 |
| | 15 | 16 | 7.3 | 7.5 | 66 | 68 | 7.5 | 66 |
| | 25 | 26 | 7.5 | 7.7 | 65 | 67 | 7.7 | 65 |
| | 35 | 36 | 7.8 | 8.0 | 64 | 66 | 8.0 | 64 |
| Ex. E-3 | 3.5 | 10 | 7.2 | 7.4 | 67 | 69 | 7.6 | 66 |
| | 15 | 16 | 7.2 | 7.4 | 67 | 69 | 7.6 | 66 |
| | 25 | 26 | 7.3 | 7.5 | 67 | 69 | 7.6 | 66 |
| | 35 | 36 | 7.5 | 7.7 | 66 | 68 | 7.9 | 65 |
| Ex. E-4 | 3.5 | 10 | 7.4 | 7.5 | 64 | 66 | 7.6 | 64 |
| | 15 | 16 | 7.4 | 7.5 | 64 | 66 | 7.6 | 64 |
| | 25 | 26 | 7.5 | 7.6 | 64 | 66 | 7.7 | 64 |
| | 35 | 36 | 7.7 | 7.8 | 63 | 65 | 7.9 | 63 |
| Ex. E-5 | 3.5 | 10 | 7.5 | 7.5 | 62 | 64 | 7.6 | 62 |
| | 15 | 16 | 7.5 | 7.6 | 62 | 64 | 7.7 | 62 |
| | 25 | 26 | 7.6 | 7.7 | 62 | 64 | 7.8 | 62 |
| | 35 | 36 | 7.7 | 7.8 | 61 | 63 | 7.9 | 61 |

TABLE 17

| | Recording linear velocity (m/s) | Recording power (mW) | Jitter value (%) after overwriting | | Degree of modulation (%) after overwriting | | Archival stability | |
|---|---|---|---|---|---|---|---|---|
| | | | 1 time | 1,000 times | 1 time | 1,000 times | Jitter value (%) | Degree of modulation (%) |
| Ex. E-6 | 3.5 | 10 | 7.5 | 7.6 | 65 | 66 | 7.7 | 65 |
| | 15 | 16 | 7.5 | 7.6 | 65 | 66 | 7.7 | 65 |
| | 25 | 26 | 7.7 | 7.8 | 64 | 65 | 7.9 | 64 |
| | 35 | 36 | 7.8 | 7.9 | 63 | 64 | 8.0 | 63 |
| Comp. Ex. E-1 | 3.5 | 10 | 9.1 | 9.7 | 52 | 57 | 12.9 | 54 |
| | 15 | 16 | 9.7 | 10.5 | 51 | 55 | 13.8 | 53 |
| | 25 | 26 | 10.8 | 11.6 | 49 | 54 | 14.6 | 52 |
| | 35 | 36 | 11.9 | 12.9 | 48 | 53 | 15.6 | 51 |
| Comp. Ex. E-2 | 3.5 | 10 | 7.1 | 7.3 | 65 | 68 | 7.5 | 65 |
| | 15 | 16 | 9.2 | 9.4 | 64 | 68 | 9.7 | 63 |
| | 25 | 26 | * | * | * | * | * | * |
| | 35 | 36 | * | * | * | * | * | * |

Here, "*" expresses "unable to overwriting."

Obviously from TABLE 16 and TABLE 17, it was found out that the optical recording medium that uses recording materials comprising phase change alloy of the above aspect carried out, but has a poor jitter value, a poor degree of modulation, a poor archival stability and a poor repetition property in overwriting.

Further, Ag—In—Sb—Te alloy in the COMPARATIVE EXAMPLE E-2, overwriting at linear velocity of 25 m/s and 35 m/s could not be carried out.

According to another aspect of the present invention where the recording layer comprises Ga, Sb, Zr, and Mg, the present invention can provide a optical recording medium having a large capacity equivalent to that of DVD-ROM, even at a wide range of recording linear velocity from 3.5 m/s to 35 m/s, including 25 m/s or more, having a sufficient degree of modulation, excellence in repetition property in overwriting and in archival stability.

According to the above aspect of the present invention, when the recording layer further comprises at least one element selected from Al, C, N, Se, and Sn, the present invention can provide an optical recording medium having a further enhanced archival stability or high-speed crystallization.

According to an aspect of the present invention where the optical recording medium further comprises a surrounding protective layer, the present invention can provide a optical recording medium in which, at high speed recording linear velocity, large capacity, a sufficient degree of modulation, maintenance of repetition property in overwriting, and maintenance of archival stability can be attained.

What is claimed is:

1. An optical recording medium comprising:
a substrate; and
a recording layer disposed on the substrate,
wherein the recording layer comprises Ga and Sb, a content of the Sb is 80 atm % to 95 atm % relative to a total content of the Ga and the Sb in the recording layer, and recording and erasing are carried out by a reversible phase change between an amorphous phase and a crystalline phase in the recording layer.

2. An optical recording medium according to claim 1, wherein the recording and the erasing are carried out by the reversible phase change between the amorphous phase and the crystalline phase in the recording layer, when a laser beam having wavelength of 350 nm to 700 nm is irradiated at a linear velocity (V) one of between more than 3 m/s and 40 m/s or less.

3. An optical recording medium according to claim 1, wherein the recording and the erasing are carried out by the reversible phase change between the amorphous phase and the crystalline phase in the recording layer, at a linear velocity of 10 m/s or more.

4. An optical recording medium according to claim 1, wherein the total content of the Ga and the Sb is 90 atm % or more in the recording layer.

5. An optical recording medium according to claim 4, wherein the total content of the Ga and the Sb in the recording layer is 95 atm % or more.

6. An optical recording medium according to claim 1, wherein the content of the Sb is 85 atm % to 95 atm % relative to the total content of the Ga and the Sb in the recording layer.

7. An optical recording medium according to claim 2, wherein the optical recording medium comprises:
the substrate;
a first protective layer;
the recording layer;
a second protective layer; and
a reflection layer,
wherein the first protective layer, the recording layer, the second protective layer, and the reflection layer are disposed on the substrate in this order, and a thickness of the reflection layer satisfies a relation of: $0.10\lambda$ or more, when the "$\lambda$" expresses the wavelength of the laser beam.

8. An optical recording medium according to claim 2, wherein the laser beam has the wavelength of 630 nm to 700 nm.

9. An optical recording medium according to claim 8, wherein the optical recording medium comprises:
the substrate;
a first protective layer;
the recording layer;
a second protective layer; and
a reflection layer,
wherein the first protective layer, the recording layer, the second protective layer, and the reflection layer are disposed on the substrate in this order, and each of a thickness of the first protective layer, a thickness of the recording layer, a thickness of the second protective layer, and a thickness of the reflection layer satisfies the following relations, when "$\lambda$" expresses the wavelength of the laser beam;

$0.070\lambda \leq t_1 \leq 0.16\lambda$ $0.015\lambda \leq t_2 \leq 0.032\lambda$ $0.011\lambda \leq t_3 \leq 0.040\lambda$ $0.10\lambda \leq t_4$;

wherein "$t_1$" expresses the thickness of the first protective layer, "$t_2$" expresses the thickness of the recording layer, "$t_3$" expresses the thickness of the second protective layer, and "$t_4$" expresses the thickness of the reflection layer.

10. An optical recording medium according to claim 8, wherein the thickness of the recording layer is 5 nm to 25 nm.

11. An optical recording medium according to claim 10, wherein the thickness of the recording layer is 8 nm to 20 nm.

12. An optical recording medium according to claim 2, wherein the laser beam has wavelength of 350 nm to 450 nm.

13. An optical recording medium according to claim 12, wherein the optical recording medium comprises:
the substrate;
a first protective layer;
the recording layer;
a second protective layer; and
a reflection layer,
wherein the first protective layer, the recording layer, the second protective layer, and the reflection layer are disposed on the substrate in this order, and each of a thickness of the first protective layer, a thickness of the recording layer, a thickness of the second protective layer, and a thickness of the reflection layer satisfies the following relations, when "$\lambda$" expresses the wavelength of the laser beam;

$0.070\lambda \leq t_1 \leq 0.5\lambda$ $0.015\lambda \leq t_2 \leq 0.05\lambda$ $0.011\lambda \leq t_3 \leq 0.055\lambda$ $0.10\lambda \leq t_4$;

wherein "$t_1$" expresses the thickness of the first protective layer, "$t_2$" expresses the thickness of the recording layer, "$t_3$" expresses the thickness of the second protective layer, and "$t_4$" expresses the thickness of the reflection layer.

14. An optical recording medium according to claim 12, wherein the optical recording medium comprises:
the substrate;
a reflection layer;
a second protective layer;
the recording layer;
a first protective layer; and
a light transmittance layer,
wherein the reflection layer, the second protective layer, the recording layer, the first protective layer, and the light transmittance layer are disposed on the substrate in this order, and each of a thickness of the reflection layer, a thickness of the second protective layer, a thickness of the recording layer, and a thickness of the first protective layer, and a thickness of the light transmittance layer satisfies the following relations, when "$\lambda$" expresses the wavelength of the laser beam;

$0.10\lambda \leq t_4 \leq 0.75\lambda$ $0.011\lambda \leq t_3 \leq 0.055\lambda$ $0.015\lambda \leq t_2 \leq 0.05\lambda$ $0.70\lambda \leq t_1 \leq 0.5\lambda$ $0\lambda \leq t_5 \leq 0.6$ mm, wherein "t₄" expresses the thickness of the reflection layer, "t₃" expresses the thickness of the second protective layer, "t₂" expresses the thickness of the recording layer, "t₁" expresses the thickness of the first protective layer, and "t₅" expresses the thickness of the light transmittance layer.

15. An optical recording medium according to claim 12, further comprising:
one or more of the recording layers.

16. An optical recording medium according to claim 15, wherein the optical recording medium includes a first information layer which has one of the recording layers, and a second information layer which has other one of the recording layers in this order, from a direction that the laser beam is irradiated, and a light transmittance of the first information layer is 40% or more with the wavelength.

17. An optical recording medium according to claim 3, wherein the recording and the erasing are carried out by the reversible phase change between the amorphous phase and the crystalline phase in the recording layer, at a linear velocity of 14 m/s or more.

18. An optical recording medium according to claim 17, wherein the recording and the erasing are carried out by the reversible phase change between the amorphous phase and the crystalline phase in the recording layer, at a linear velocity of 28 m/s or more.

19. An optical recording medium according to claim 1, wherein a reflectance (Rg) at an unrecorded space part satisfies a relation of 12%≦Rg≦30%, when a laser beam having wavelength between 350 nm and 700 nm is irradiated.

20. An optical recording medium according to claim 1, wherein the optical recording medium has a degree of modulation (M) of 0.4 or more, when the recording is carried out at a linear velocity (V) one of between more than 3 m/s and 40 m/s or less and at wavelength of a laser beam of between 350 nm and 700 nm, and the degree of modulation (M) satisfies a relation of:

$$M=(Rg-Rb)/Rg:$$

where "M" expresses the degree of modulation, "Rb" expresses a reflectance at a recording mark of the optical recording medium, and "Rg" expresses a reflectance at an unrecorded space part of the optical recording medium.

21. An optical recording medium according to claim 20, wherein the optical recording medium has the degree of modulation (M) of 0.4 or more, when the recording is carried out by an optical lens having NA of 0.60 or more.

22. An optical recording medium according to claim 20, wherein the optical recording medium has the degree of modulation (M) of 0.6 or more.

23. An optical recording medium according to claim 20, wherein the optical recording medium has the degree of modulation (M) of 0.4 or more, when the recording is carried out at any linear velocity (V) between 10 m/s and 35 m/s.

24. An optical recording medium according to claim 23, wherein the optical recording medium has a jitter value of 10% or less, when the recording is carried out at any linear velocity (V) between 10 m/s and 35 m/s.

25. An optical recording medium according to claim 1, wherein the recording layer further comprises at least one element selected from Ag, Au, Cu, Zn, B, Al, In, Si, Ge, Sn, Pb, N, P, Bi, La, Ce, Gd, Th, Mg, Co, Mn, Zr, Rh, Se, Fe, and Ir.

26. An optical recording medium according to claim 25, wherein the element is at least one selected from Ag, Au, Cu, B, Al, In, Mn, Sn, Zn, Bi, Pb, Ge, Si., and N.

27. An optical recording medium according to claim 1, wherein the recording layer comprises an alloy expressed by the following Formula (1);

$$Ga\alpha Sb\beta X\gamma \qquad \text{Formula (1)}$$

where "X" expresses one of an element and a mixture of elements excluding Ga and Sb, "α," "β," and "γ" are each expressed in atm %, and each satisfy relations of: "α+β+γ=100," "5≦α≦20," "80≦β≦95," and "0<γ≦10."

28. An optical recording medium according to claim 27, wherein the "X" comprises one of a single element and a mixture selected from Ag, Au, Cu, Zn, B, Al, In, Si, Ge, Sn, Pb, N, P, Bi, La, Ce, Gd, Tb, Mg, Co, Mn, Zr, Rh, Se, Fe, and Ir.

29. An optical recording medium according to claim 25, wherein the recording layer comprises Ga, Sb, Bi, and Rh.

30. An optical recording medium according to claim 29, wherein the recording layer further comprises one element selected from Cu, B, N, Ge, Fe, and Ir.

31. An optical recording medium according to claim 25, wherein the recording layer comprises Ga, Sb, Zr, and Mg.

32. An optical recording medium according to claim 31, wherein the recording layer further comprises one element selected from Al, C, N, Se, and Sn.

33. An optical recording medium according to claim 1, wherein the optical recording medium comprises:
the substrate;
a first protective layer;
the recording layer;
a second protective layer;
a reflection layer; and
a surrounding protective layer,
wherein the first protective layer, the recording layer, the second protective layer, and the reflection layer are disposed on the substrate in this order, and the surrounding protective layer is disposed on a surface of the reflection layer.

34. A process for manufacturing an optical recording medium comprising the steps of:
disposing a first protective layer, a recording layer, a second protective layer, a reflection layer in this order on a substrate, so as to manufacture an optical recording medium prior to initial crystallization;
irradiating a laser beam having a power density of 5 mW/μm² to 50 mW/μm² to the optical recording medium prior to initial crystallization, while rotating the optical recording medium prior to initial crystallization and radially moving the laser beam at a constant linear velocity for initial crystallization of 3 m/s to 18 m/s, so as to initially crystallize the optical recording medium prior to initial crystallization and manufacture an optical recording medium, wherein the optical recording medium comprises:
a substrate; and
the recording layer disposed on the substrate, wherein the recording layer comprises Ga and Sb, a content of the Sb is 80 atm % to 95 atm % relative to a total content of the Ga and the Sb in the recording layer, and recording and erasing are carried out by a reversible phase change between an amorphous phase and a crystalline phase in the recording layer.

35. A process for manufacturing an optical recording medium according to claim 34, wherein the laser beam has the power density of 15 mW/μm² to 40 mW/μm², and the constant linear velocity for initial crystallization is 6 m/s to 14 m/s.

36. An optical recording process comprising the steps of:
  forming a laser beam which reversibly phase changes between an amorphous phase and a crystalline phase in a recording layer which is disposed on a substrate of an optical recording medium, so as to have one of a single pulse and a plurality of pulses; and
  irradiating the laser beam to the optical recording medium at a linear velocity (V) one of between more than 3 m/s and 40 m/s or less, and at a recording power (Pw) having a power density of 20 mW/µm$^2$ or more, so as to record in the recording layer,
wherein the optical recording medium comprises:
  the substrate; and
  the recording layer disposed on the substrate, wherein the recording layer comprises Ga and Sb, a content of the Sb is 80 atm % to 95 atm % relative to a total content of the Ga and the Sb in the recording layer, and recording and erasing are carried out by a reversible phase change between an amorphous phase and a crystalline phase in the recording layer.

37. An optical recording process according to claim 36, wherein the linear velocity (V) is one of between 10 m/s and 35 m/s.

38. An optical recording process according to claim 37, wherein the laser beam is irradiated, so that a ratio of an erasing power (Pe) to the recording power (Pw) satisfies a relation of:

$$0.10 \leq Pe/Pw \leq 0.65:$$

where "Pe" expresses the erasing power and "Pw" expresses the recording power.

39. An optical recording process according to claim 38, wherein the laser beam is irradiated so as to have a ratio of an erasing power (Pe) to the recording power (Pw) which satisfies a relation of:

$$0.13 \leq Pe/Pw \leq 0.6:$$

where "Pe" expresses the erasing power and "Pw" expresses the recording power.

* * * * *